(12) United States Patent
Remijan

(10) Patent No.: US 10,146,050 B1
(45) Date of Patent: Dec. 4, 2018

(54) UNDERWATER IMAGING SYSTEMS HAVING PANORAMIC CONVERTERS

(71) Applicant: Paul Remijan, Brimfield, MA (US)

(72) Inventor: Paul Remijan, Brimfield, MA (US)

(73) Assignee: Fathom Imaging Inc., Brimfield, MA (US)

( * ) Notice: Subject to any disclaimer, the term of this patent is extended or adjusted under 35 U.S.C. 154(b) by 0 days.

(21) Appl. No.: 15/375,672

(22) Filed: Dec. 12, 2016

Related U.S. Application Data

(60) Provisional application No. 62/266,322, filed on Dec. 11, 2015.

(51) Int. Cl.
| | |
|---|---|
| G02B 27/00 | (2006.01) |
| G02B 13/06 | (2006.01) |
| H04N 5/225 | (2006.01) |
| H04N 5/341 | (2011.01) |
| G03B 17/08 | (2006.01) |

(52) U.S. Cl.
CPC ......... G02B 27/0025 (2013.01); G02B 13/06 (2013.01); H04N 5/2252 (2013.01); H04N 5/2254 (2013.01); H04N 5/3415 (2013.01); G03B 17/08 (2013.01)

(58) Field of Classification Search
CPC .... G02B 13/06; G02B 27/0025; G02B 15/02; G02B 15/10; H04N 5/2252; H04N 5/2254; H04N 5/3415; G03B 17/08
See application file for complete search history.

(56) References Cited

U.S. PATENT DOCUMENTS

| | | | |
|---|---|---|---|
| 2,001,683 A | 5/1935 | Jackman | |
| 2,730,014 A | 1/1956 | Ivanoff et al. | |
| 3,175,037 A | 3/1965 | Padgitt | |
| 3,209,649 A | 10/1965 | Macher | |
| 3,227,041 A | 1/1966 | Muszumanski | |
| 3,320,018 A * | 5/1967 | Pepke | G03B 17/08 351/43 |
| 5,596,455 A * | 1/1997 | Eckhardt | G02B 9/16 359/785 |
| 6,654,179 B2 | 11/2003 | Inoue | |

(Continued)

OTHER PUBLICATIONS

JP2017-009977 A document with English abstract.*

(Continued)

*Primary Examiner* — William R Alexander
*Assistant Examiner* — Ephrem Mebrahtu
(74) *Attorney, Agent, or Firm* — Fish & Richardson P.C.

(57) ABSTRACT

A photography or videography imaging system includes a panoramic converter that can be used with a user-selected camera lens. The panoramic converter includes a dome port and a corrector group of lenses that corrects the aberrations caused by the dome port when the imaging system is placed in a liquid. The corrector group compensates a field curvature produced by dome port while preserving the angles, relative to an optical axis of the panoramic converter, of propagation paths of light rays entering the dome port. The angle, relative to the optical axis, of the propagation path of a light ray in the liquid prior to entering the dome port is approximately the same as the angle, relative to the optical axis, of the propagation path of the light ray propagating toward the camera lens after exiting the corrector group of lenses.

86 Claims, 67 Drawing Sheets

(56) References Cited

U.S. PATENT DOCUMENTS

| | | | | |
|---|---|---|---|---|
| 2002/0063847 | A1* | 5/2002 | Kranhouse | B63C 11/12 351/43 |
| 2003/0133199 | A1* | 7/2003 | Inoue | G02B 9/34 359/673 |
| 2009/0002823 | A1* | 1/2009 | Law | G03B 11/06 359/511 |
| 2010/0194853 | A1* | 8/2010 | Matsusaka | G02B 13/004 348/36 |
| 2011/0279898 | A1* | 11/2011 | Takemoto | G02B 15/173 359/557 |
| 2013/0265662 | A1* | 10/2013 | Araie | G02B 7/02 359/827 |
| 2015/0124341 | A1* | 5/2015 | Lai | G02B 15/10 359/784 |
| 2015/0138336 | A1* | 5/2015 | Ueno | H04N 5/2252 348/81 |
| 2015/0370037 | A1* | 12/2015 | Ishihara | G02B 9/60 348/294 |
| 2016/0205299 | A1* | 7/2016 | Imaoka | G02B 13/00 348/151 |
| 2016/0373734 | A1* | 12/2016 | Cole | H04N 17/002 |

OTHER PUBLICATIONS

Fischer et al., *Optical System Design*, McGraw-Hill, Chapter 5, pp. 78-89 (2000).

Jenkins et al., *Fundamentals of Optics*, Third Edition, McGraw-Hill, pp. 150-155 (1957).

Kingslake, *Lens Design Fundamentals*, Academic Press, Inc., New York, NY, pp. 130-133; 166-171; 196-201; 334-345 (1978).

Kingslake, *Optical System Design*, Academic Press, Inc., Orlando, FL, pp. 73-74; 211-212; 221-223 (1983).

Longhurst, *Geometrical and Physical Optics*, Second Edition, John Wiley & Sons Inc., New York, NY, pp. 386-405 (1967).

W. Mandler, "Design Considerations for Underwater Lenses With Water Contact Elements Concentric With The Entrance Pupil," Proc. SPIE 0012, Underwater Photo-Optical Instrumentation Applications II (Aug. 1, 1968).

Slater, "A focal viewport optics for underwater imaging", *Proc. of SPIE*, vol. 9192, pp. 91920P-1-91920P-13 (2014).

\* cited by examiner

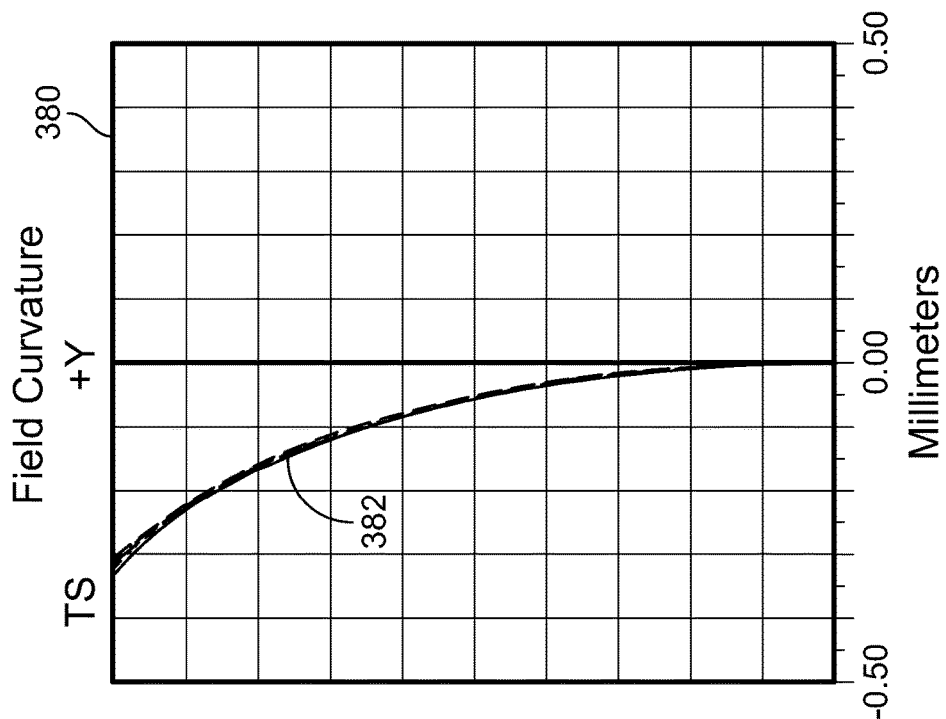
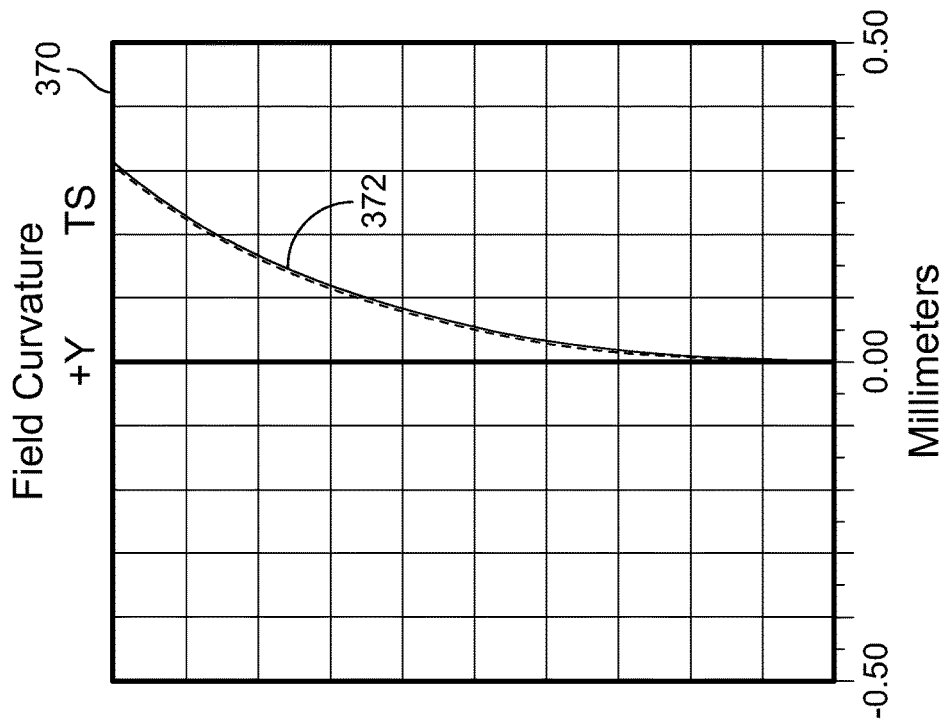
FIG. 19C

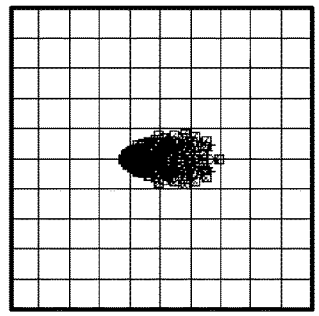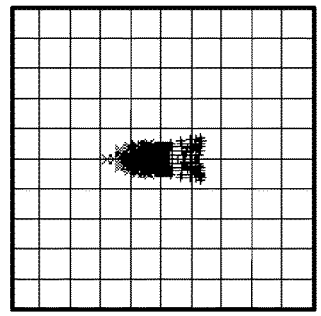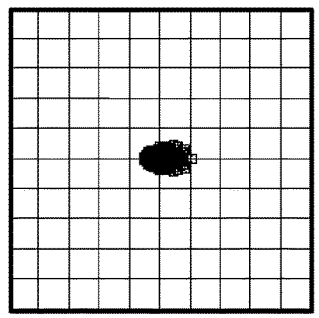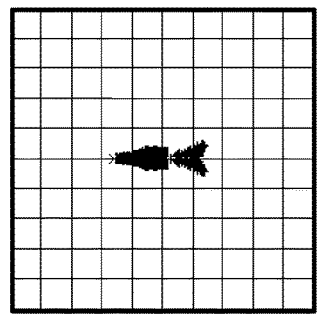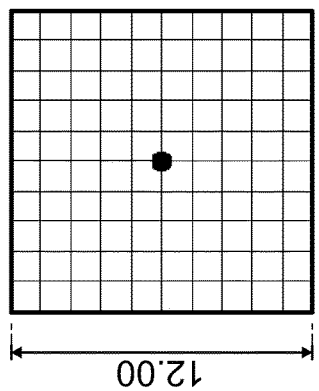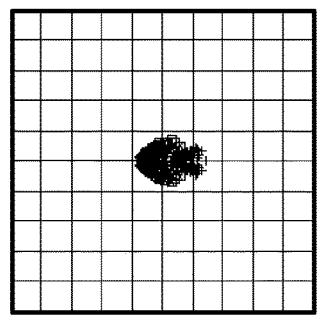
FIG. 20B

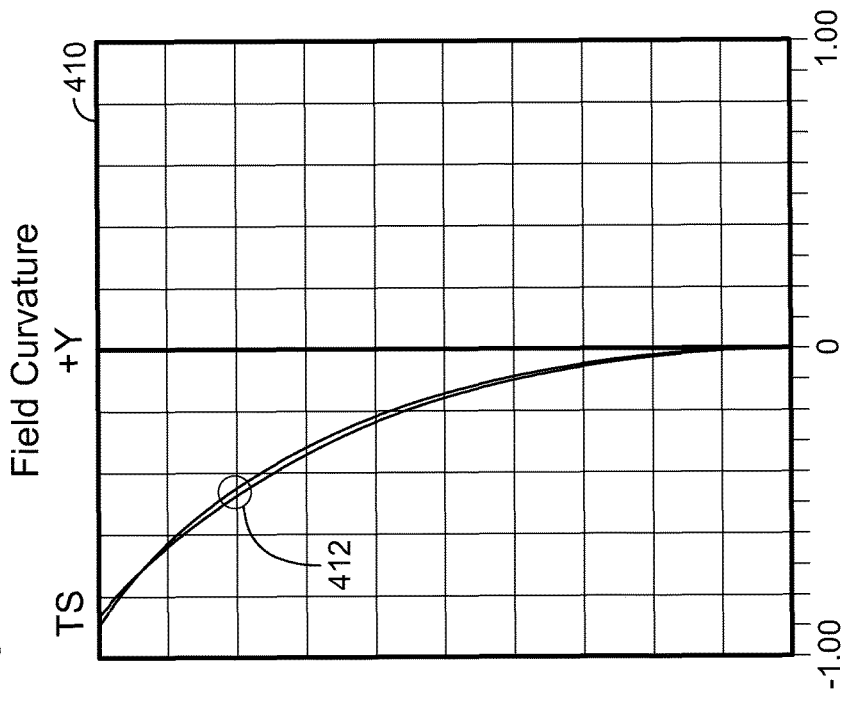
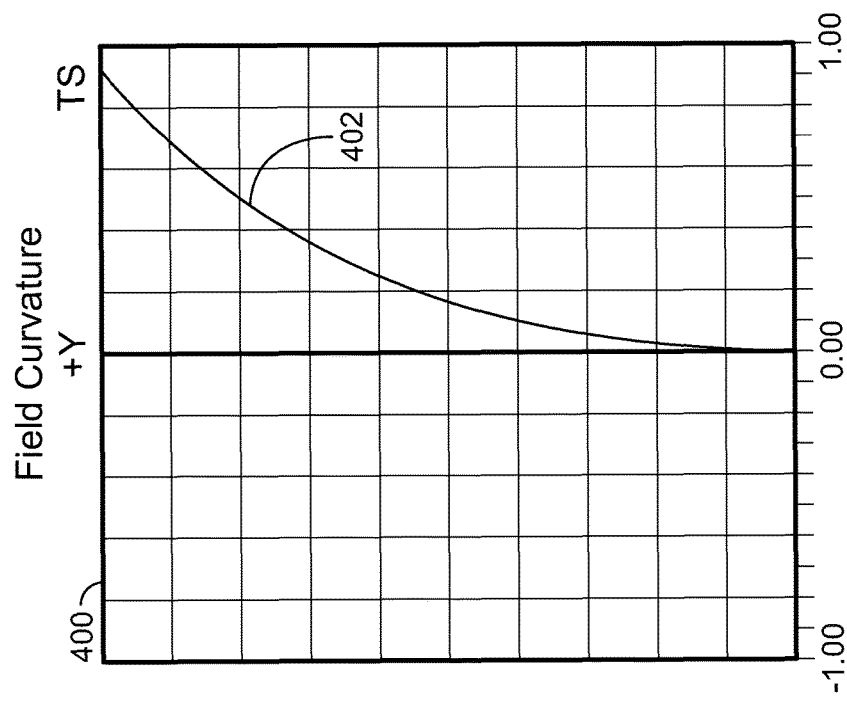
Field Curvature of 10-Inch Diameter Dome Port and Compensating Field Curvature of Matched Corrector Group, When Used with Rodenstock 28 mm Apo-Sironar Lens, and Medium Format Image Sensor
FIG. 21B
FIG. 21C

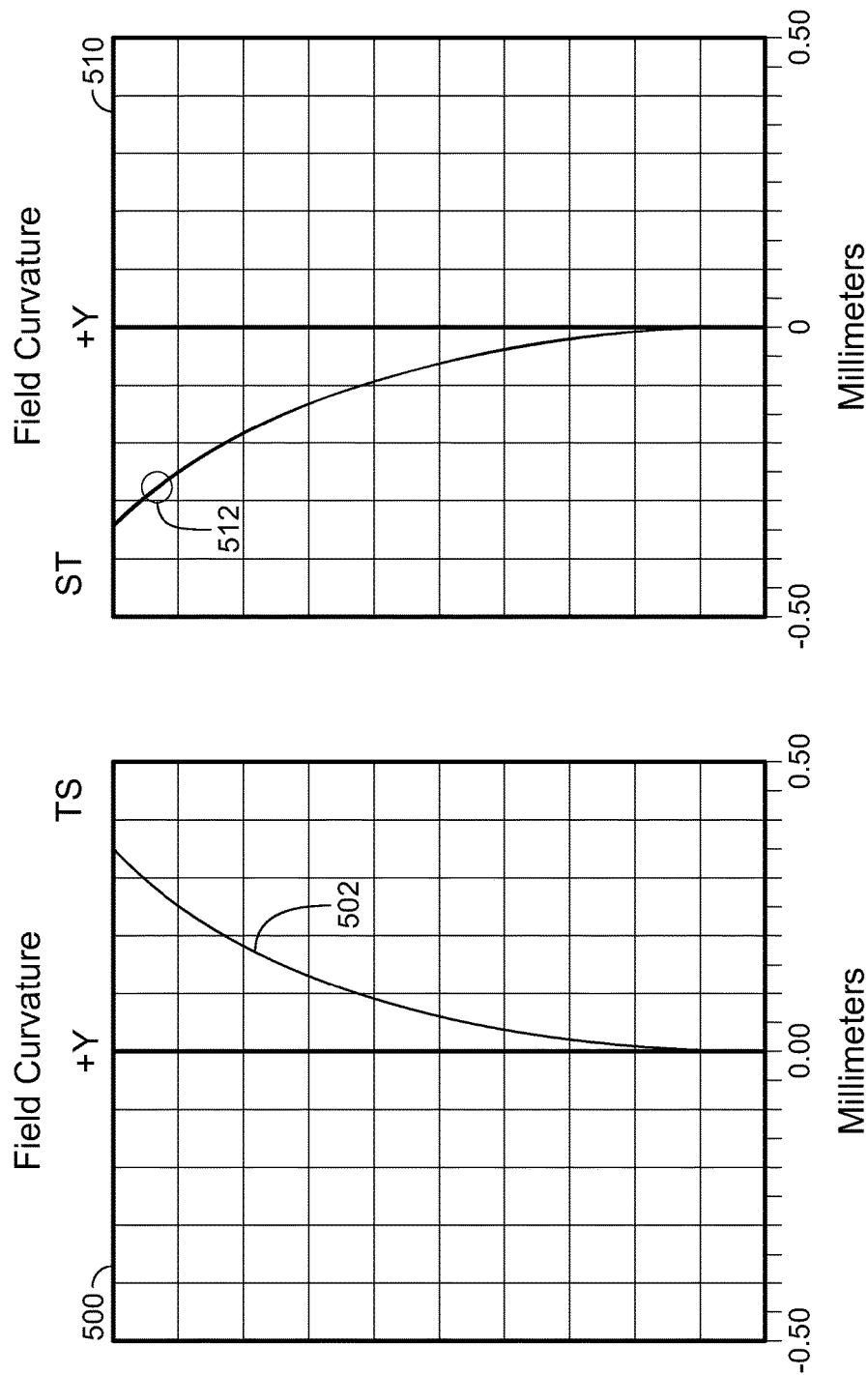

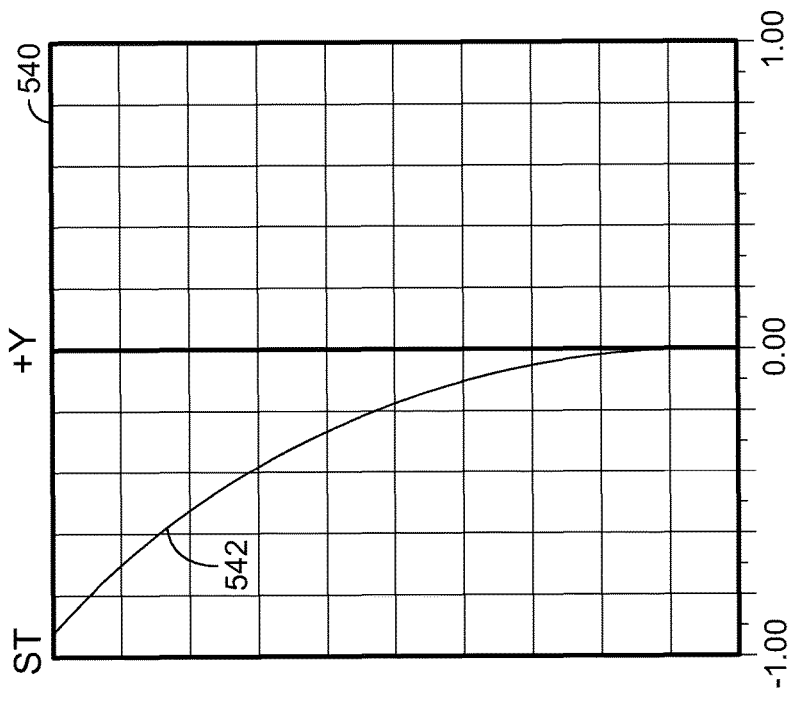
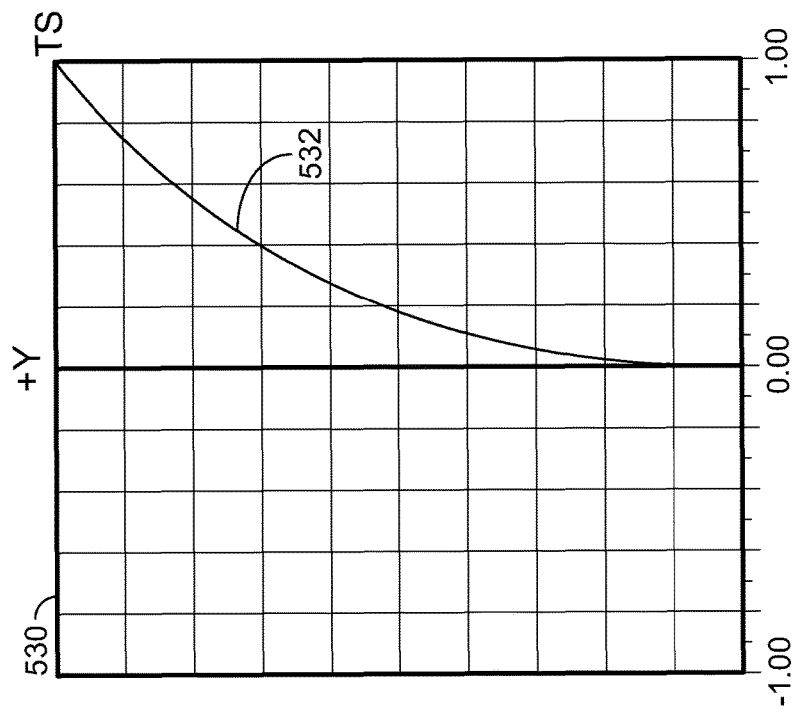

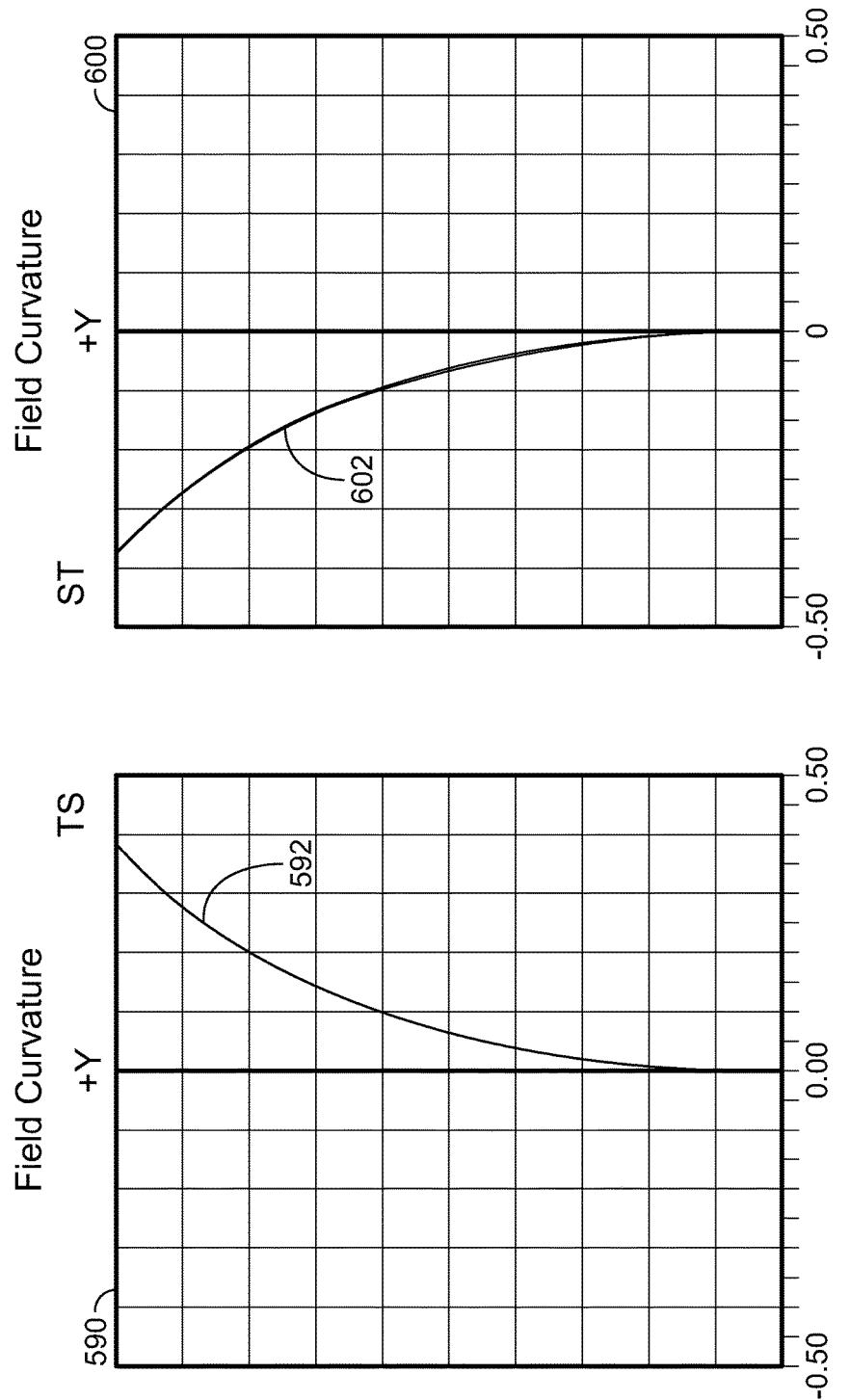

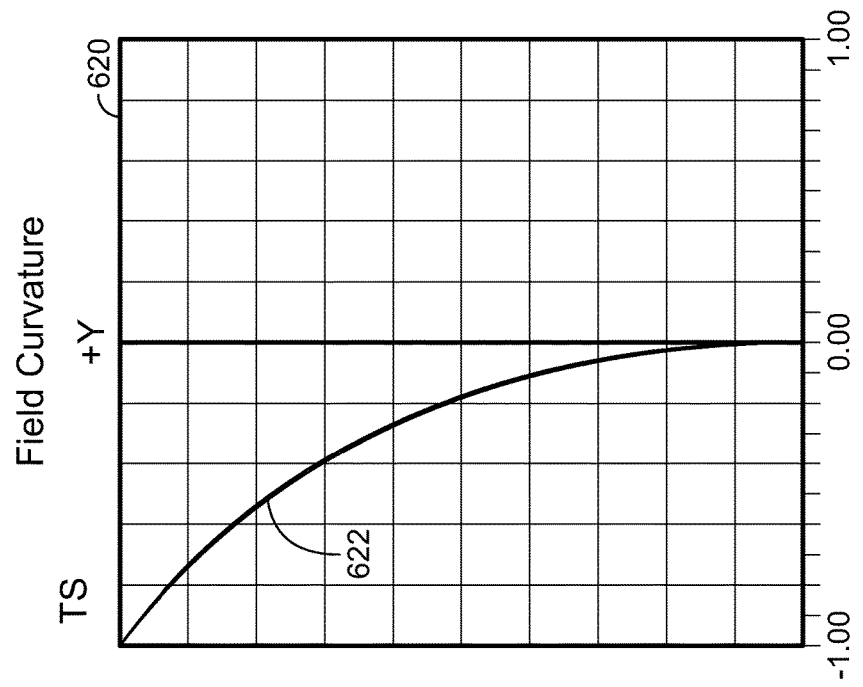
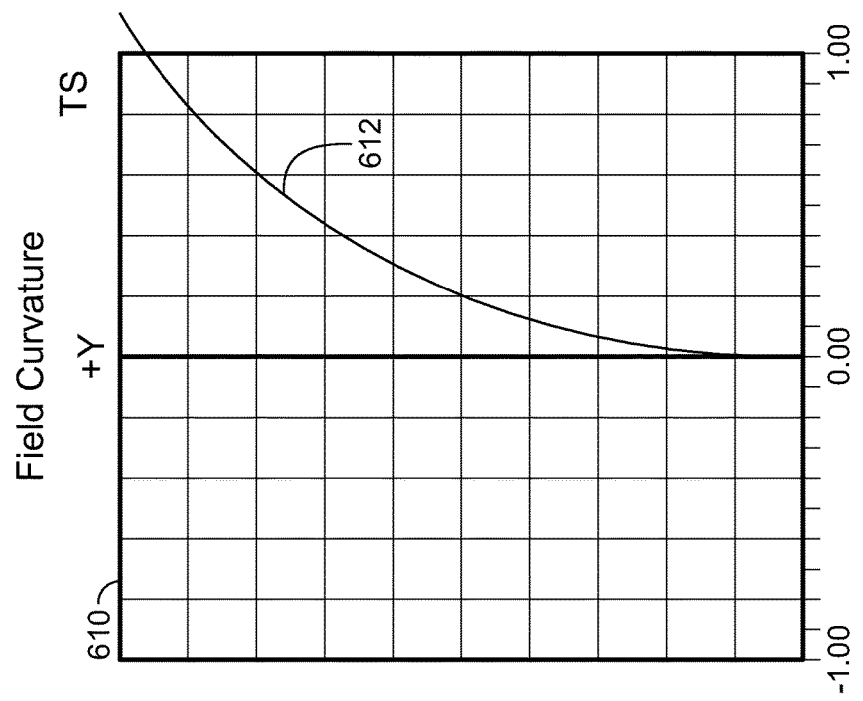
FIG. 34A
FIG. 34B

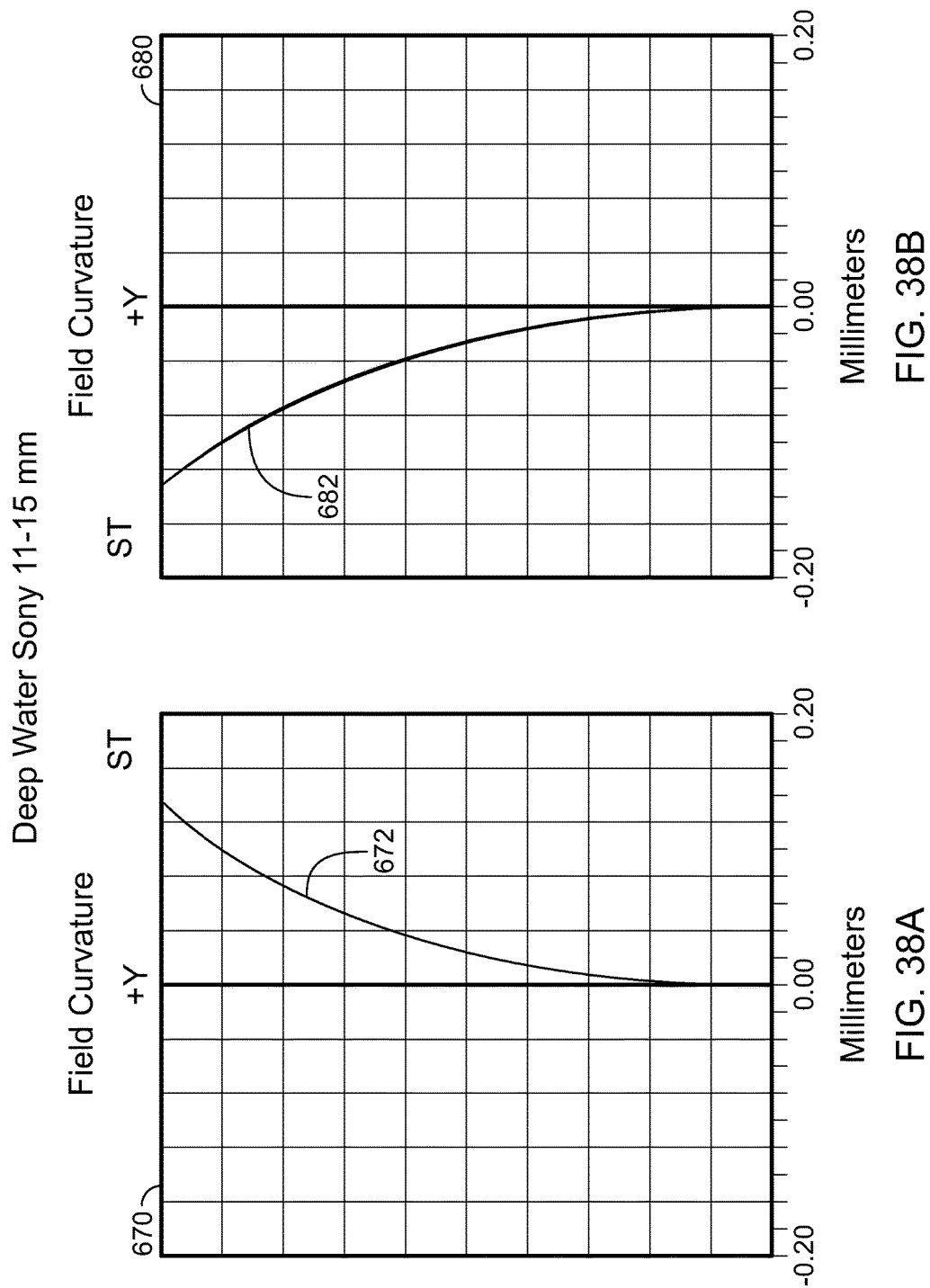

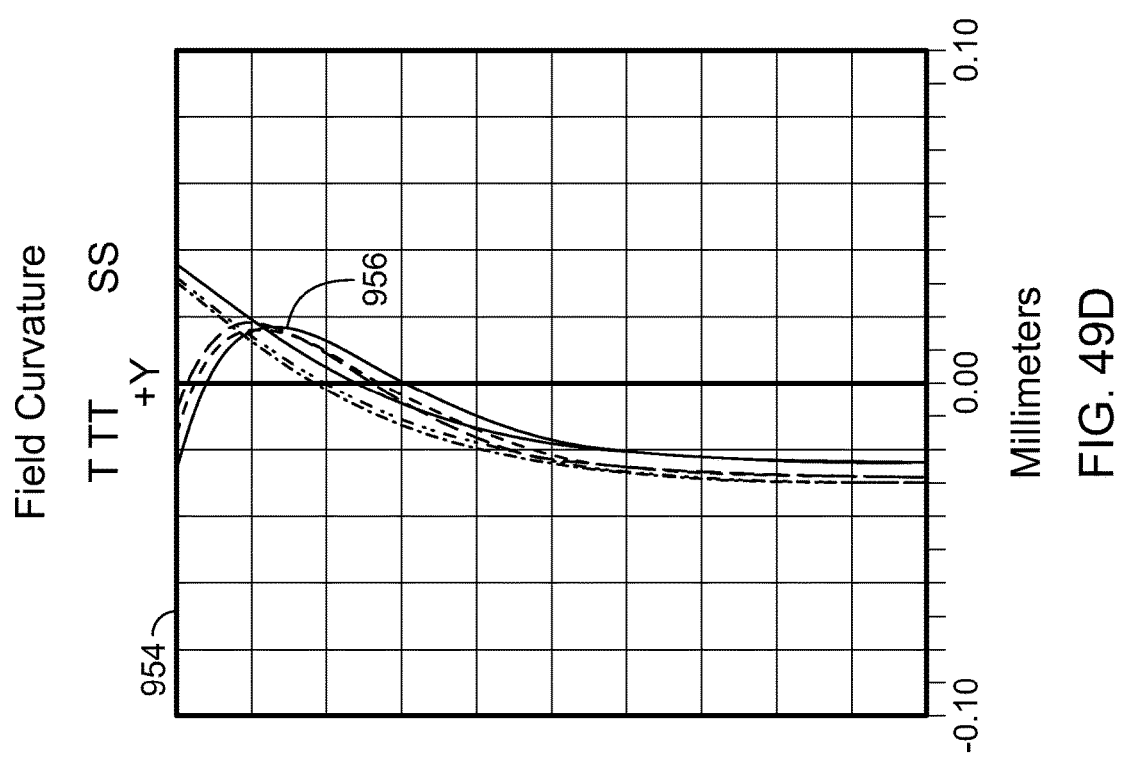

UNDERWATER IMAGING SYSTEMS HAVING PANORAMIC CONVERTERS

CROSS-REFERENCE TO RELATED APPLICATION

This application claims priority to U.S. provisional application 62/266,322, filed on Dec. 11, 2015. The entire contents of the above application are incorporated by reference.

TECHNICAL FIELD

This disclosure relates to underwater imaging systems having panoramic converters.

BACKGROUND

In some examples, an underwater video and photography equipment includes a camcorder or a camera that is enclosed in a waterproof housing. The housing includes an optical component, sometimes referred to as a ""dome port,"" mounted in front of the camcorder or camera lens. The dome port provides a reasonable image quality when used with digital cameras and camcorders having modest field of view (FOV) lenses and image sensors having small image areas (e.g., having a diagonal size smaller than 20 mm). When used with larger field of view camera lenses and large format image sensors (e.g., having an image height larger than 10 mm), the native aberrations of the dome port increase significantly. When the dome port is used with photo and video cameras that have large field of view lenses and large format image sensors, e.g., capable of recording high-definition and high resolution 4K images, the aberrations caused by the dome optical element reduces image quality significantly.

SUMMARY

In general, in one aspect, an underwater imaging system includes a novel panoramic converter that has a dome port lens and a corrector group of lenses configured to correct aberrations caused by the dome port lens. The dome port diameter and centers of curvature associated with dome port optical surfaces define the maximum field of view for the underwater imaging system. The aberration correction provided by the panoramic converter is uniformly accurate over the entire region defined by the panoramic converter maximum field of view. As a result of the smooth aberration correction over entire field of view, the panoramic converter is compatible with a wide variety of camera lenses having fields of view equal to or less than the maximum field of view defined by the panoramic converter. Because the panoramic converter eliminates the aberrations of ""water to air"" interface encountered in underwater imaging, the compatibility of third party camera lenses with a wide variety of image sensors is transferred to the panoramic converter. ""In air"" imaging performance of each camera lens/image sensor combination is transferred without degradation to image formation of objects submerged in water.

In general, in another aspect, an apparatus for underwater videography and photography includes a panoramic converter that has a first meniscus lens and a corrector group of lenses. The first meniscus lens has a first field of view, a convex surface being distal to a camera lens, and a concave surface being proximal to the camera lens when the panoramic converter is used to project light rays toward the camera lens. The camera lens has a second field of view. The corrector group of lenses includes three or more lenses configured to correct aberrations caused by the first meniscus lens when the panoramic converter is placed in a liquid having a refractive index greater than 1 in which the convex surface of the first meniscus lens is in contact with the liquid, and the corrector group of lenses is disposed between the first meniscus lens and the camera lens. The corrector group of lenses is configured to compensate a field curvature produced by the first meniscus lens while preserving the angles, relative to an optical axis of the panoramic converter, of propagation paths of light rays entering the first meniscus lens for light rays that have propagation paths within the second field of view of the camera lens. The angle, relative to the optical axis, of the propagation path of a light ray in the liquid prior to entering the first meniscus lens is approximately the same as the angle, relative to the optical axis, of the propagation path of the light ray propagating toward the camera lens after exiting the corrector group of lenses.

In another general aspect, an apparatus for photography or videography is provided. The apparatus includes a housing to provide an enclosure for a camera or camcorder, and a panoramic converter. The panoramic converter includes a first meniscus lens and a corrector group of lenses. The first meniscus lens has a first field of view, a convex surface being distal to a camera lens, and a concave surface being proximal to the camera lens when the panoramic converter is used to project light rays toward the camera lens. The camera lens has a second field of view. The corrector group of lenses includes three or more lenses configured to correct aberrations caused by the first meniscus lens when the panoramic converter is placed in a liquid having a refractive index greater than 1 in which the convex surface of the first meniscus lens is in contact with the liquid, and the corrector group of lenses is disposed between the first meniscus lens and the camera lens. The corrector group of lenses is configured to compensate a field curvature caused by the first meniscus lens while preserving the angles, relative to an optical axis of the panoramic converter, of propagation paths of light rays that propagate from the liquid to the camera lens through the panoramic converter, in which the angle, relative to the optical axis, of the propagation path of a light ray in the liquid prior to entering the first the meniscus lens is substantially the same as the angle, relative to the optical axis, of the propagation path of the light ray propagating toward the camera lens after passing the corrector group of lenses. At least one of the first meniscus lens or the corrector group of lenses is attached to the housing.

In another general aspect, a method for photography or videography includes capturing an image of one or more objects in a liquid having a refractive index greater than 1 by a process that includes: passing light rays from the liquid through a first meniscus lens having a first field of view, the first meniscus lens having a convex surface being distal to a camera lens and a concave surface being proximal to the camera lens when the panoramic converter is used with the camera lens, the convex surface of the first meniscus lens being in contact with the liquid; passing the light rays through a corrector group of lenses comprising three or more lenses; passing the light rays through the camera lens having a second field of view; focusing, using the camera lens, the light rays onto an image sensor; and compensating, using the corrector group of lenses, a field curvature caused by the first meniscus lens while preserving angles, relative to an optical axis of the camera lens, of light rays passing the first meniscus lens and the corrector group of lenses for light rays that have propagation paths within the second field of view of the camera lens. The angle relative to the optical axis of"

a light ray in the liquid prior to entering the first meniscus lens is substantially the same as the angle relative to the optical axis of the light ray when the light ray propagates toward the camera lens after passing the collector group of lenses.

Implementations of the apparatus may include one or more of the following features. The camera lens can be a photography lens or a videography lens. The first meniscus lens can cause a first field of curvature in which if an image of an on-axis object is projected by the first meniscus lens to form on a surface of an image sensor disposed behind the camera lens, an image of an off-axis object is projected by the first meniscus lens to form behind the surface of the image sensor. The corrector group of lenses can cause a second field of curvature such that if an image of an on-axis object is projected by the corrector group of lenses to form on the surface of the image sensor, an image of an off-axis object is projected by the corrector group of lenses to form in front of the surface of the image sensor, the second field of curvature offsetting the first field of curvature.

In some examples, when a full-frame image sensor is used to capture an image produced by the light rays focused by the camera lens, a maximum image sag produced by the first meniscus lens at maximum image height relative to the center of the image sensor can have an absolute value greater than 0.25 mm, and the corrector group of lenses can correct the field curvature in which, after correction, the maximum residual image sag at the image plane sensor can have an absolute value less than 0.010 mm. In some examples, when a full-frame image sensor is used, a maximum image sag produced by the first meniscus lens at maximum image height relative to the center of the image sensor can have an absolute value greater than 0.35 mm, and the corrector group of lenses corrects the field curvature in which, after correction, the maximum residual image sag at the image plane sensor can have an absolute value less than 0.020 mm. In some examples, when a medium format sensor is used, a maximum image sag produced by the first meniscus lens at maximum image height relative to the center of the image sensor can have an absolute value greater than 0.80 mm, and the corrector group of lenses corrects the field curvature in which, after correction, the maximum residual image sag at the image plane sensor can have an absolute value less than 0.020 mm. In some examples, when a medium format sensor is used, a maximum image sag produced by the first meniscus lens at maximum image height relative to the center of the image sensor can have an absolute value greater than 1 mm, and the corrector group of lenses corrects the field curvature in which, after correction, the maximum residual image sag at the image plane sensor can have an absolute value less than 0.045 mm. The second field of view can be at least 90°, at least 100°, or at least 110°. The first meniscus lens can have a diameter of at least 7 inches. The first meniscus lens can be a concentric dome port lens or a non-concentric dome port lens. When the first meniscus lens is a non-concentric lens, the axial locations of the centers of curvature of the surfaces of the first meniscus lens can be separated by up to three times the center thickness of the first meniscus lens. The first meniscus lens can be made of glass or plastic.

Other aspects include other combinations of the features recited above and other features, expressed as methods, apparatus, systems, program products, and in other ways. Advantages of the aspects and implementations may include one or more of the following. Aberrations (e.g., field curvatures, astigmatism, and lateral color aberrations) caused by the dome port may be eliminated or significantly reduced. The panoramic converter can be used with a wide variety of user-selected camera lenses and image sensors. The quality of high resolution underwater photos and videos can be significantly improved.

DESCRIPTION OF DRAWINGS

FIGS. 3A to 5 are graphs that show exemplary characteristics of the imaging system of FIG. 2.

FIG. 19C shows a comparison of the field curvatures of FIGS. 19A and 19B.

FIG. 20B shows an exemplary spot diagram of the imaging system of FIG. 18A.

FIGS. 21B and 21C are graphs showing exemplary field curvatures of the dome port and the corrector group, respectively, of the imaging system of FIG. 21A.

FIG. 27A is a graph showing exemplary field curvatures of the dome port of the imaging system of FIG. 26 on a full frame image sensor.

FIG. 27B is a graph showing exemplary compensating field curvature of the corrector group of the imaging system of FIG. 26.

FIG. 29A is a graph showing exemplary field curvatures of the dome port of the imaging system of FIG. 28.

FIG. 29B is a graph showing exemplary compensating field curvatures of the corrector group of the imaging system of FIG. 28.

FIG. 33A is a graph showing exemplary field curvatures of the dome port of the imaging system of FIG. 32.

FIG. 33B is a graph showing exemplary compensating field curvatures of the corrector group of the imaging system of FIG. 32.

FIG. 34A is a graph showing exemplary field curvatures of the dome port of the imaging system of FIG. 32 when used with a Rodenstock 28 mm Apo-Sironar lens.

FIG. 34B is a graph showing exemplary compensating field curvatures of the corrector group of the imaging system of FIG. 32 when used with the Rodenstock 28 mm Apo-Sironar lens.

FIG. 38A is a graph showing exemplary field curvatures of the dome port of the imaging system of FIG. 37.

FIG. 38B is a graph showing exemplary compensating field curvatures of the corrector group of the imaging system of FIG. 37.

FIG. 49D is a plot of the residual field curvature at the image plane when the dome port and the corrector group of FIG. 49A are used with the 28 mm Apo-Sironar lens set at best focus.

Like reference symbols in the various drawings indicate like elements.

DETAILED DESCRIPTION

This disclosure describes a novel optical system that provides superior images for underwater photography and videography. A panoramic converter (PC) is placed between the underwater environment and a user-selected camera to eliminate significant aberrations of "water-to-air" transition encountered in underwater imaging. The panoramic converter allows the user to generate high resolution images of objects in an underwater environment. The panoramic converter can operate with a wide variety of camera lenses used for photography and videography.

Figure 1:
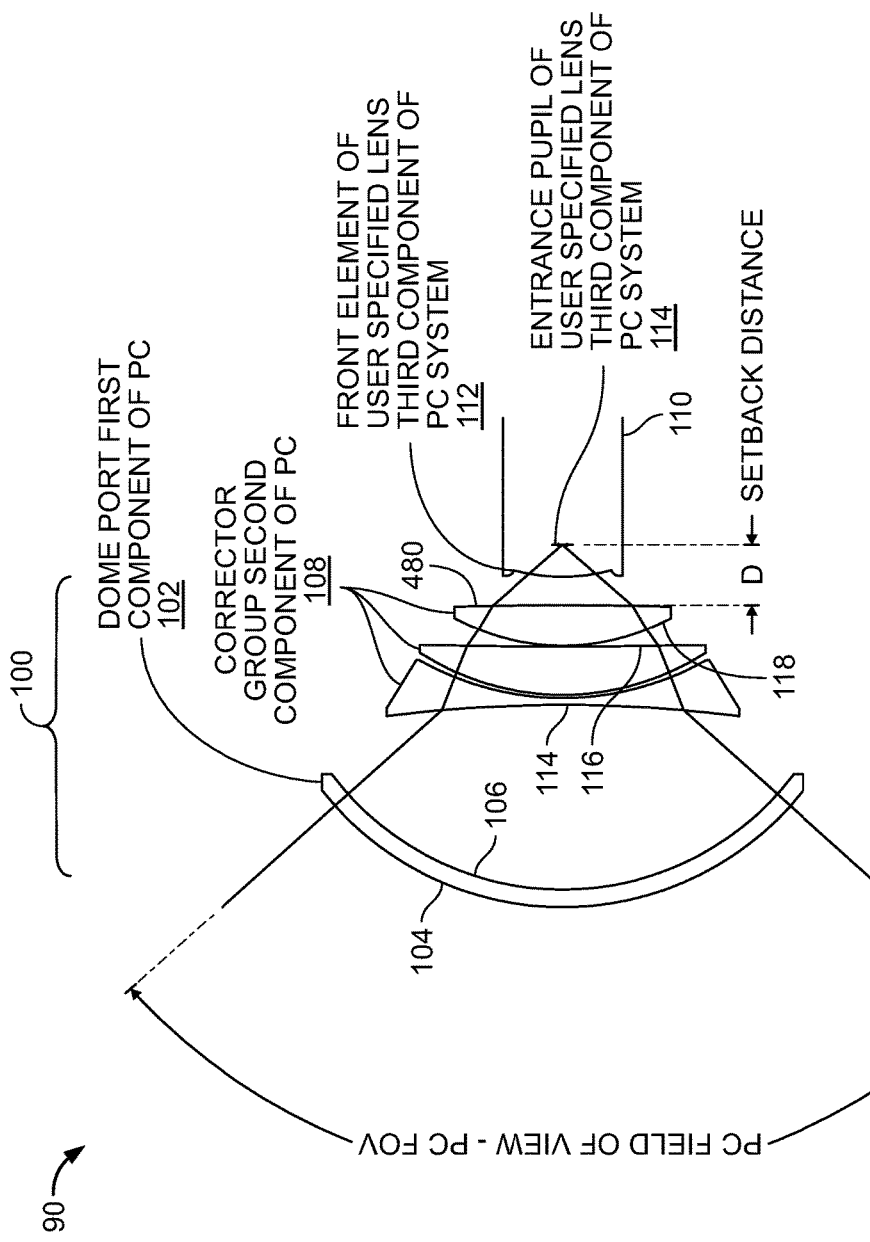
FIG. 1 is a diagram of an exemplary imaging system that includes a panoramic converter.

Referring to FIG. 1, in some implementations, an imaging system 90 includes a panoramic converter 100, a camera lens 110, and an image sensor (not shown in the figure). The panoramic converter 100 includes a meniscus lens 102 (also referred to as a "dome port"). Optical surfaces 104 and 106 of the dome port 102 can be either concentric or non-concentric. The panoramic converter 100 further includes a "corrector group" of lenses 108, which is a lens assembly that corrects aberrations of the dome port 102 when its convex surface is in contact with water and its concave surface is in contact with air or faces vacuum. The camera lens 110 can be a photography lens or a videography lens. The camera lens 110 has a front element 112 and an entrance pupil 114 located on the optical axis of the panoramic converter 100 at a "setback distance" D relative to a surface 480 of a third element 118 of the corrector group of lenses 108. When the entrance pupil 114 of the camera lens 110 is placed at the "setback position" (which is at the setback distance relative to the last lens surface of the corrector group 108) the aberrations of the "water-to-air" transition are corrected and the camera lens 110 operates as it would in an "in air" environment.

Imaging performance of the panoramic converter 100 can be determined by using various image analyses, such as spot diagrams, field curvature/distortion diagrams, and encircled/ensquared energy diagrams. In the following, aberrations caused by the dome port 102 is first described, followed by an explanation of how the aberrations are corrected by using the corrector group of lenses 108.

Figure 2:
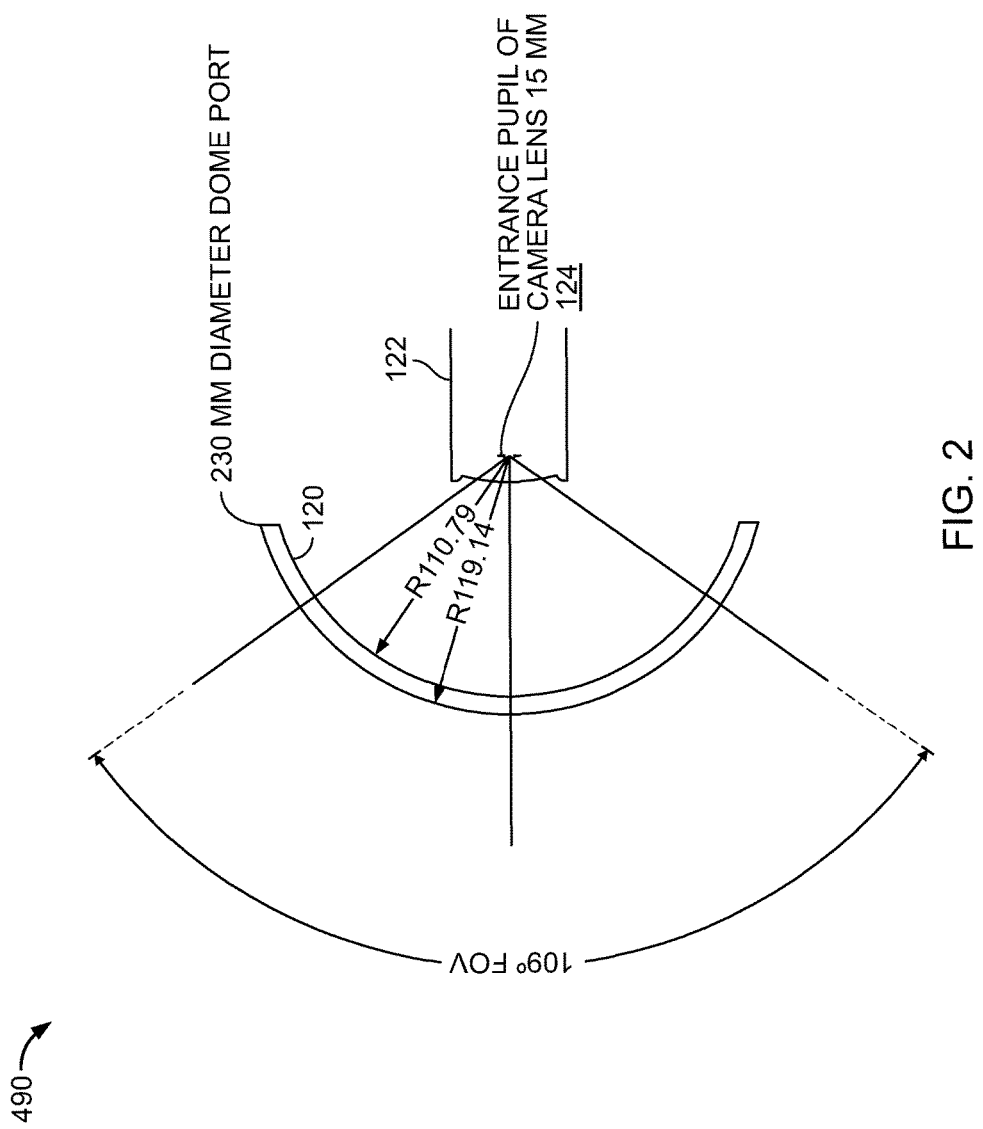
FIG. 2 is a diagram of an exemplary imaging system that does not have a panoramic converter.
Figure 3:
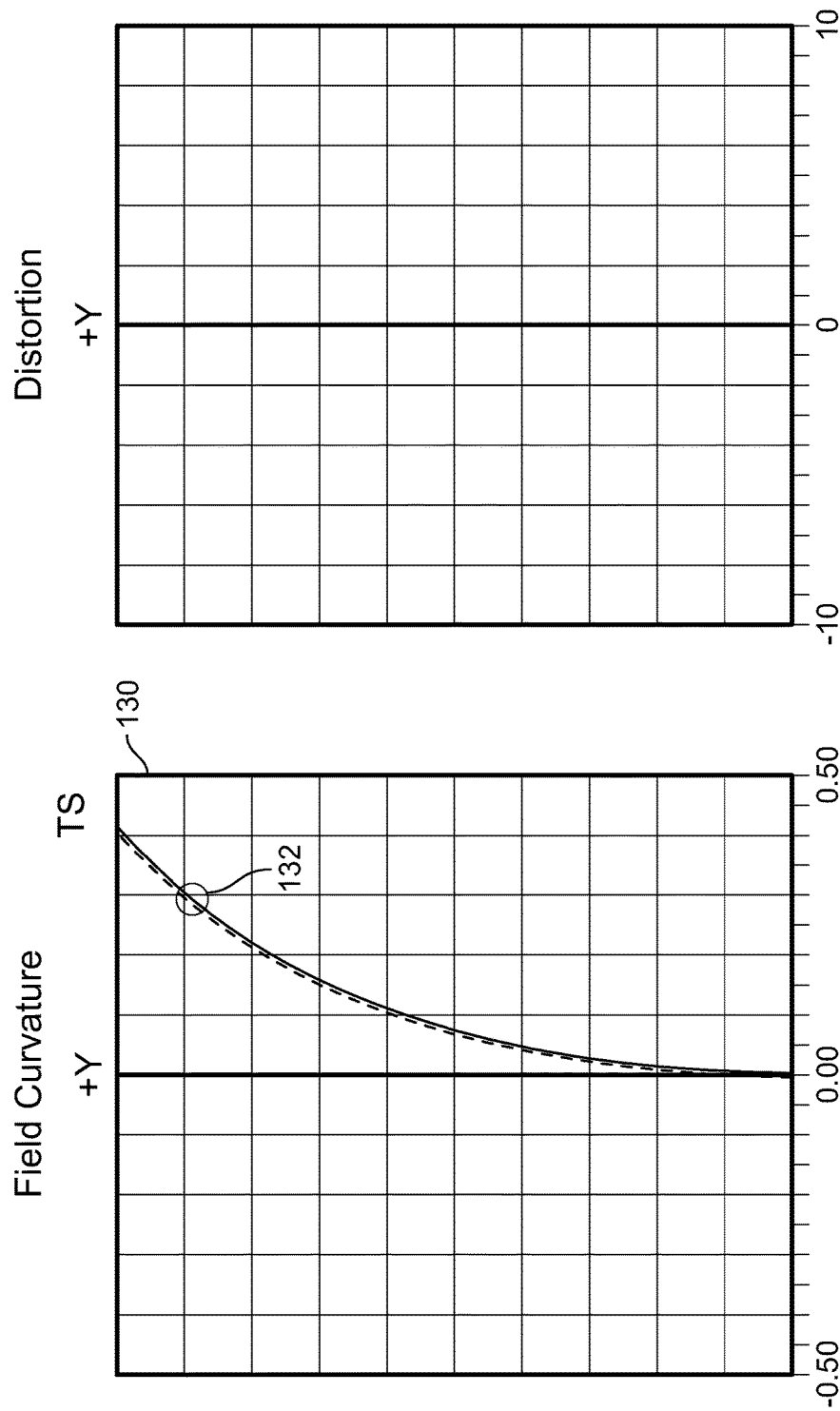

FIG. 2 is a diagram of an exemplary imaging system 490 without a panoramic converter. FIGS. 3A to 5 show the distortions of the imaging system 490. The imaging system 490 includes a 230 mm diameter dome port 120, a camera lens 122, and a full frame image sensor (not shown in the figure). Here, the "full frame image sensor" refers to an image sensor having the same dimensions as 35 mm format (36 mm×24 mm) film, with a diagonal size of 43.3 mm and a maximum image height of 21.63 mm. In this example, the camera lens is a Zeiss Distagon lens having a focal length of 15.4 mm. For convenience, this lens will be referred to as the Zeiss 15 mm Distagon lens. The dome port 120 is a concentric meniscus lens in which the convex surface has a curvature radius equal to 119.14 mm and the concave surface has a curvature radius equal to 110.79 mm. The entrance pupil 124 of the camera lens 122 is placed at the center of curvature of the dome port lens surfaces.

Referring to FIG. 3A, a graph 130 shows the field curvatures generated by the dome port 120 when the image is focused on the image sensor at the optical axis, referred to as "on-axis focus." In the graph 130, the horizontal axis represents the optical axis that passes through the center of the dome port 120 and the center of the image sensor. The vertical axis lies on the flat surface of the image sensor. The simulation used light with the following wavelengths: blue light 0.486 μm, green light 0.588 μm, and red light 0.656 μm. Curved lines 132 show the surface where the sharpest image is formed for the blue, green, and red light. Curved lines 132 indicate that if the lens focus is adjusted to allow the image surface to intersect the central area of the image sensor, the off-axis areas of the image lie significantly behind the image sensor. FIG. 3B shows that the distortion is negligible.

Figure 4:
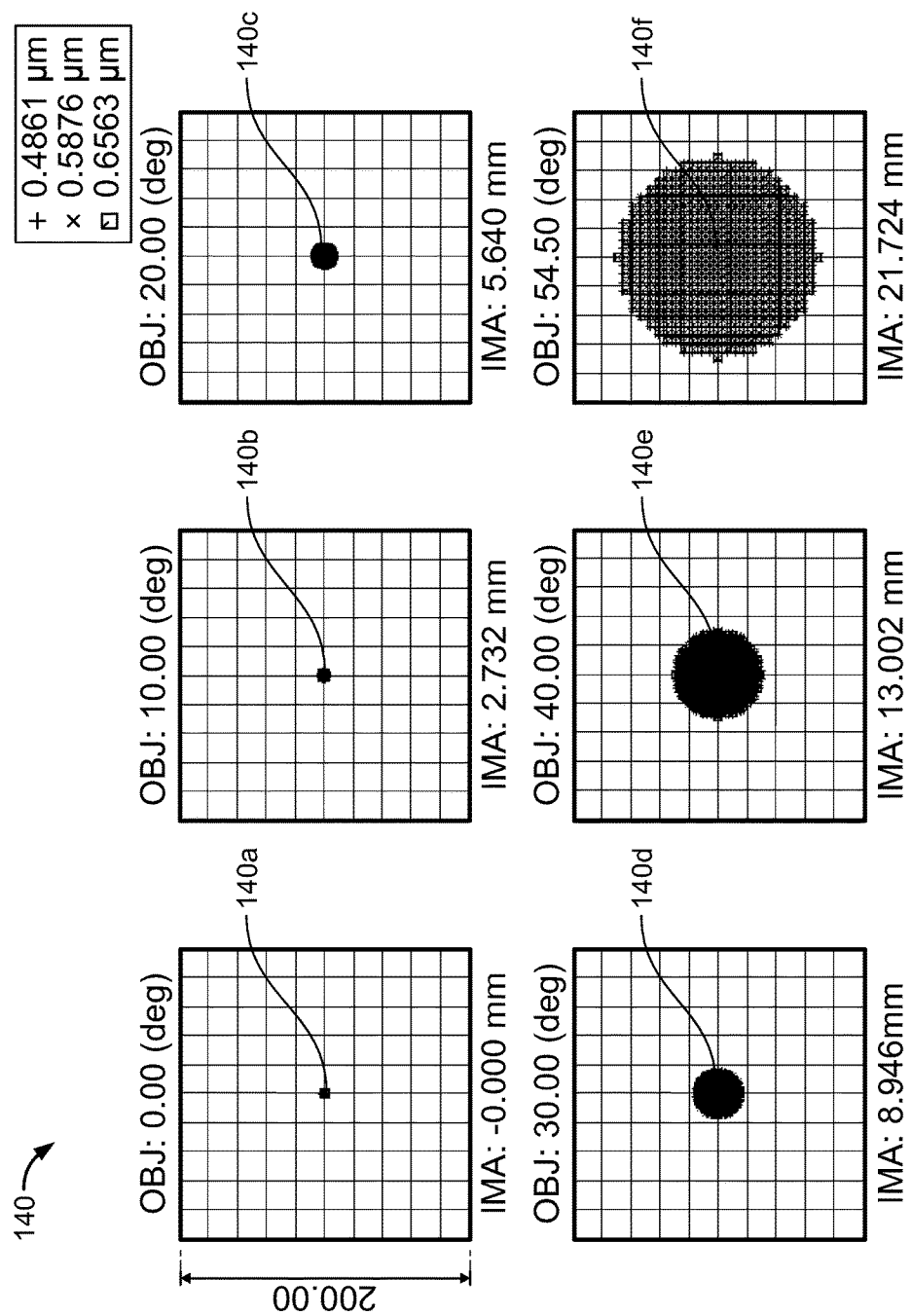

Referring to FIG. 4, spot diagram 140 is collection of image spots 140A to 140F that show how the image of a sharp point spreads into blurred and defocused light at locations away from the center of the image sensor. The spot diagram 140 was calculated for the imaging system 490 of FIG. 2, in which the imaging system includes a concentric dome port 120 and a 15 mm Zeiss Distagon lens 122. In the spot diagram 140, the scale bar is 200 μm. The spot 140*a* shows that at the center of the image sensor, the image of a sharp point is a small, tightly focused, spot of light.

Spots 140*b* to 140*f* show that, as the off-axis distance increases, the image blur increases. For larger image sensors, the blur associated with field curvature results in a significant loss of resolution. The spots 140*a* to 140*f* show the images of a point object on the surface of the image sensor, in which the direction from the point object to the center of the image sensor is at 0, 10, 20, 30, 40, and 54.5 degrees, respectively, with respect to the optical axis. Spots 140*a* to 140*f* show the image of a point object formed at distances of 0, 2.732 mm, 5.640 mm, 8.946 mm, 13.002 mm, and 21.724 mm, respectively, from the center of the image sensor. The wavelengths used for the calculation are: blue light 0.4861 μm, green light 0.5876 μm, and red light 0.6563 μm. In the spot diagram 140, the root-mean-square (RMS) radii of the spots 140*a* to 140*f* on the image sensor are 0.331 μm, 1.095 μm, 4.348 μm, 10.454 μm, 20.629 μm, and 48.764 μm, respectively. In spot diagram 140, the geometric radii of the spots 140A to 140F are 0.646 μm, 2.149 μm, 6.899 μm, 15.719 μm, 30.403 μm, and 70.999 μm, respectively.

Figure 5:
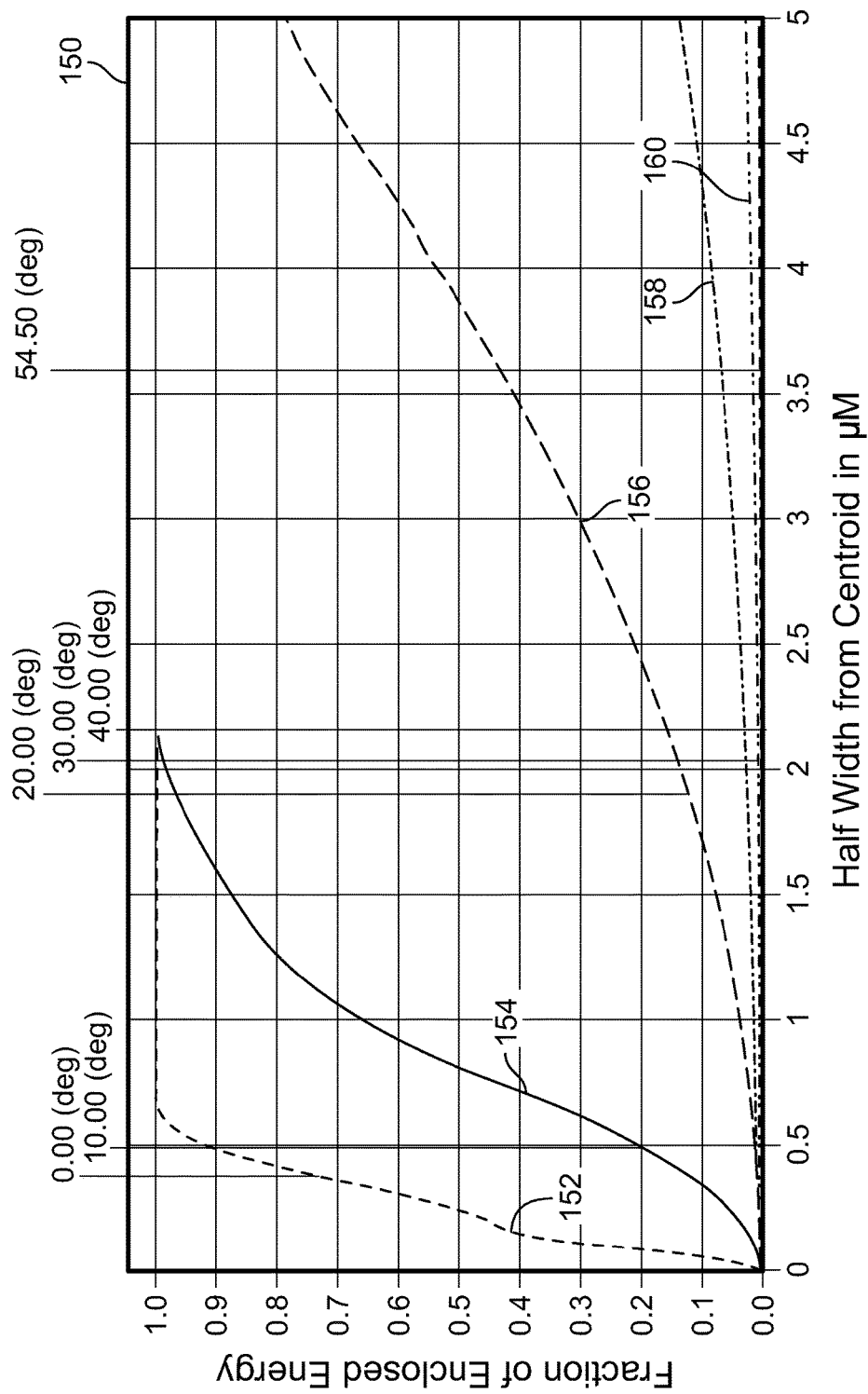

FIG. 5 is a graph 150 showing ensquared energy values at the image sensor plane. A curve 152 shows the relationship between the fraction of enclosed energy and the half width from centroid for incoming light rays at 0 degree angle relative to the optical axis of the dome port lens 120. Similarly, curves 154, 156, 158, and 160 show the relationship between the fraction of enclosed energy and the half width from centroid for incoming light rays at 10, 20, 30, 40, and 54.5 degree angle, respectively, relative to the optical axis of the dome port lens 120. Curves 154 to 160 show that the ensquared energy values at the image sensor plane for incoming light rays at 20 degrees or more relative to the optical axis are quite poor.

By using the corrector group of lenses 108 (FIG. 1), the field curvatures caused by the dome port 102 can be reduced significantly. For example, FIGS. 6A, 6B, 7, and 8 provide information about the performance of the imaging system 90 in FIG. 1 in which a 15 mm Zeiss Distagon camera lens and a full frame image sensor are used.

Figures 6A, 6B:
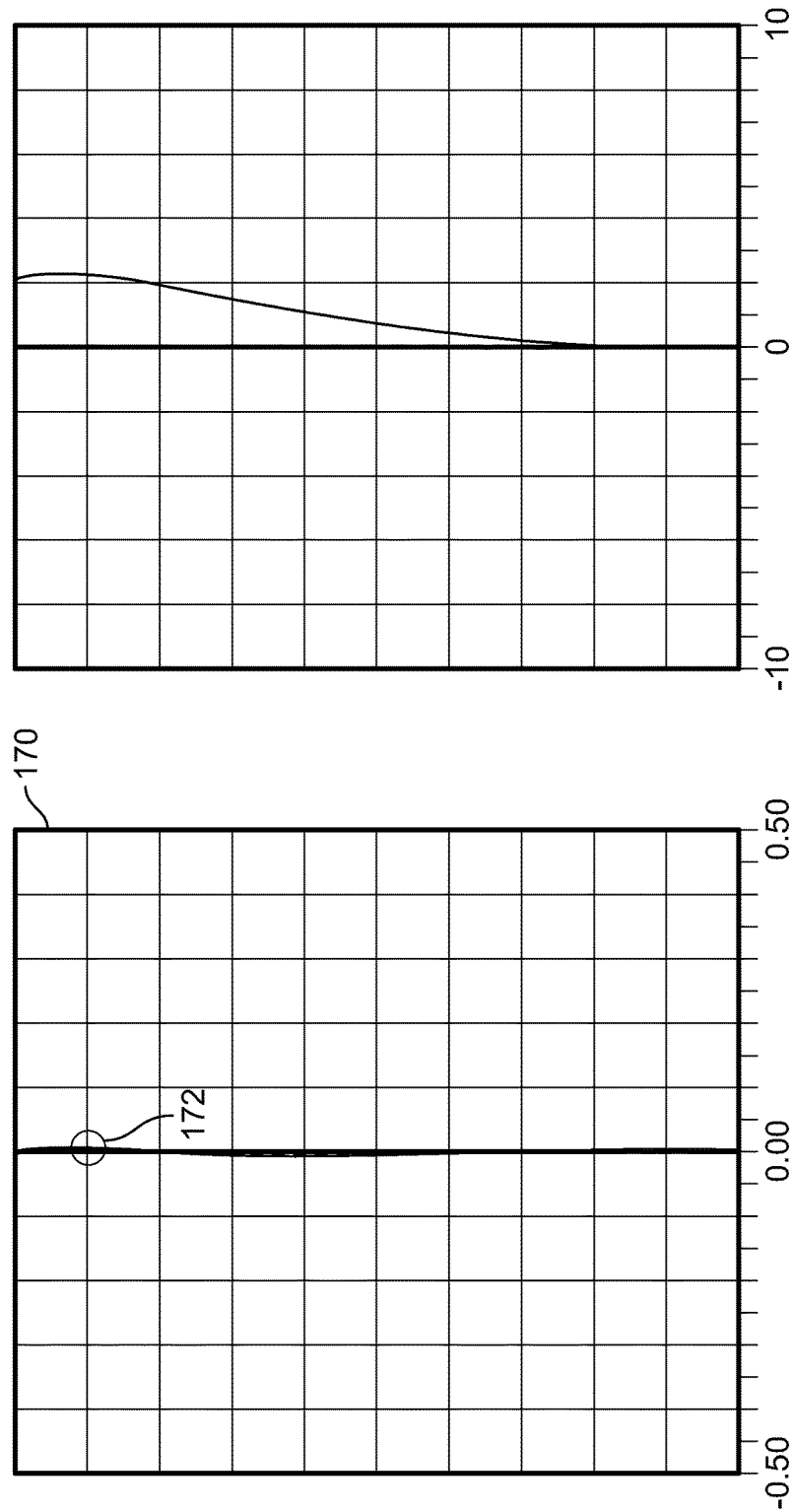
FIG. 6A is a graph showing exemplary field curvatures generated by the imaging system of FIG. 1.
FIG. 6B is a graph showing exemplary distortion associated with the imaging system of FIG. 1.

FIG. 6A is a graph 170 having curves 172 indicating that the focused image substantially coincides with the surface of the image sensor, eliminating the excessive field curvature aberration. FIG. 6B shows that distortion is increased slightly, as compared to the distortion shown in FIG. 3B.

Figure 7:
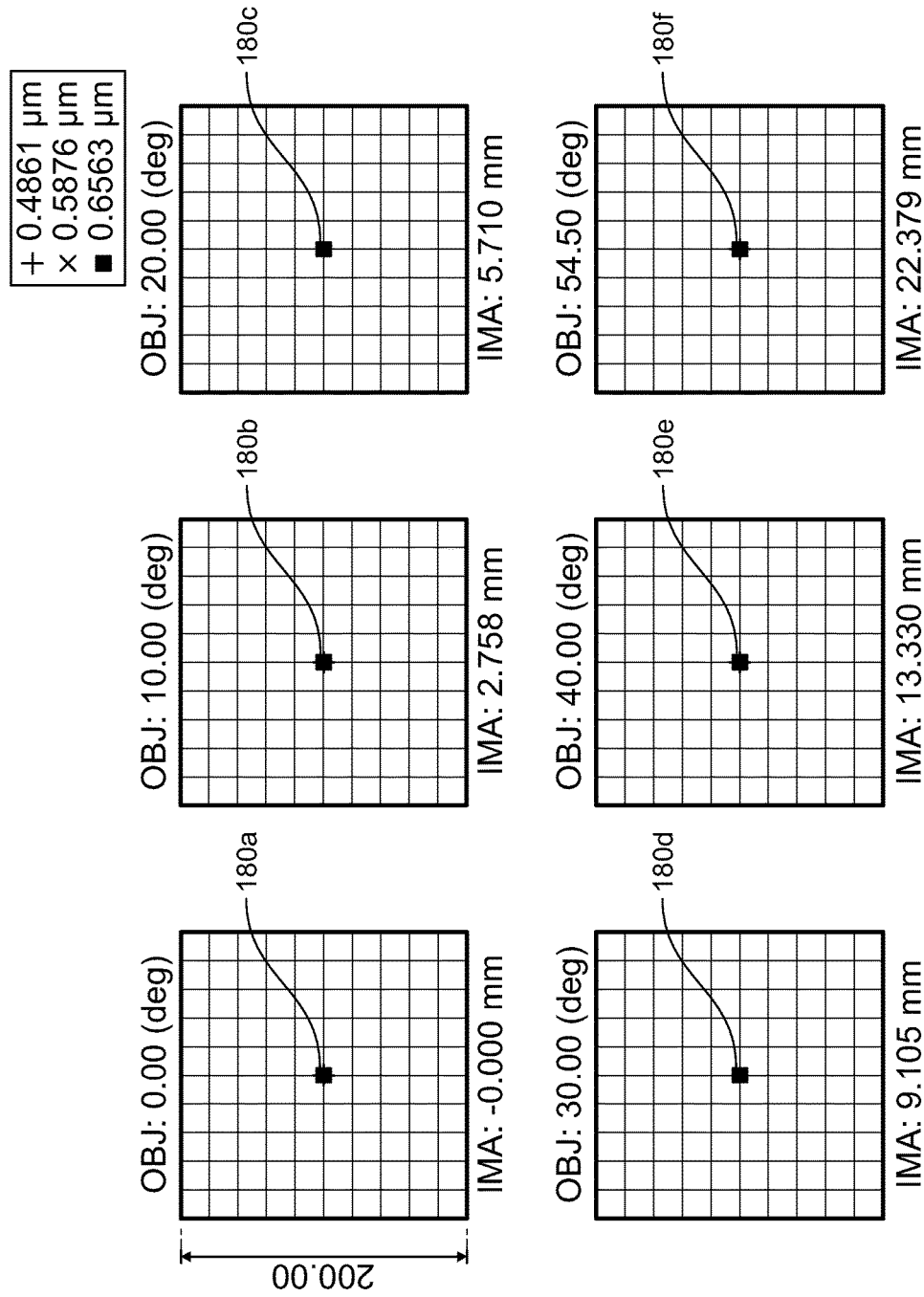
FIG. 7 shows an exemplary spot diagram for the imaging system of FIG. 1.

FIG. 7 shows a spot diagram 180, a collection of "diffraction limited" image spots, 180a to 180f, in which the direction from the point object to the center of the image sensor is at 0, 10, 20, 30, 40, and 54.5 degrees, respectively, with respect to the optical axis, and the image of the point object is formed at a distances 0, 2.732 mm, 5.640 mm, 8.946 mm, 13.002 mm, and 21.724 mm, respectively, from the center of the image sensor. A comparison of image spots 180b to 180f with image spots 140b to 140f (FIG. 4) shows that the imaging system 90 having the panoramic converter 100 produces tight focus or negligible image blur across the entire image sensor, even near the edges of image sensor, as compared to the imaging system 490 that does not use a panoramic converter.

Figure 8:
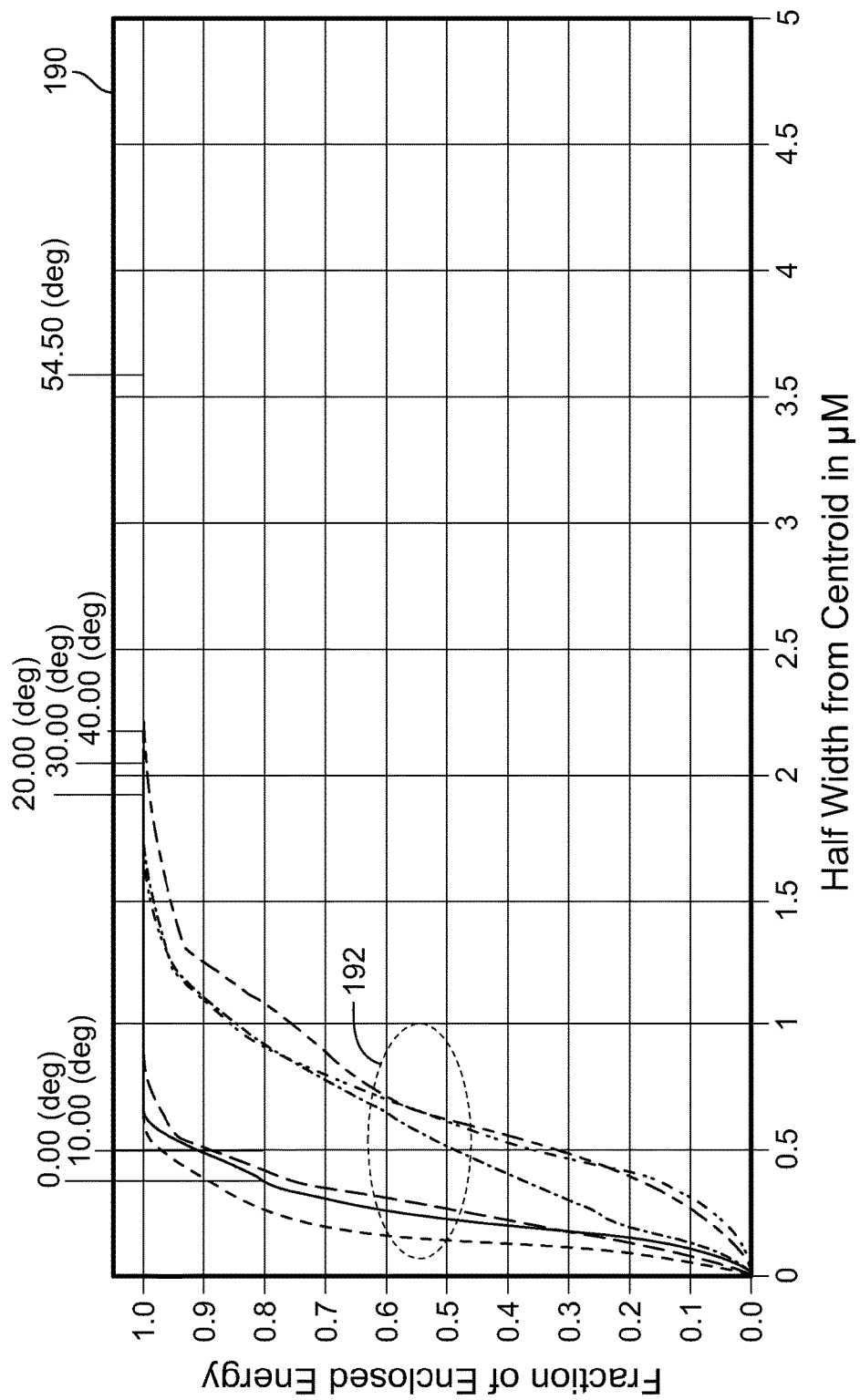
FIG. 8 is a graph showing an ensquared energy analysis for the imaging system of FIG. 1.

FIG. 8 is a graph 190 showing ensquared energy values at the image sensor plane. Curves 192 indicate "diffraction limited" ensquared energy at the image sensor plane. The graph 190 shows that the images generated by the imaging system 90 (FIG. 1) is much more tightly focused on the image sensor compared to those of the imaging system 490 (FIG. 2).

FIGS. 3A, 3B, 4, and 5 show that a dome port by itself when used with a wide angle lens and a large image sensor may not be able to form sharp high-definition and 4K images. By comparison, imaging systems that use panoramic converters configured according to this disclosure provide superior image formation compatible with modern high-definition and 4K (or higher resolution) cameras and camcorders.

In some implementations, a process for configuring panoramic converters includes the following steps. The first step in the panoramic converter configuration process includes specifying the maximum panoramic converter field of view required for specific underwater imaging tasks. A panoramic converter configured to operate at a larger field of view can also be used at a smaller field of view. Increasing the dome port diameter is a convenient method of increasing the panoramic converter's field of view, but the maximum panoramic converter field of view should be reasonably specified to reduce the weight of the panoramic converter dome port. For example, some rectilinear lenses offer a field of view of about 109 degrees. Specifying a reasonable maximum panoramic converter field of view at 115 to 118 degrees will achieve a reasonably sized panoramic converter that maintains compatibility with a wide range of camera lenses.

The second step of the panoramic converter configuration process includes an initial selection of dome port parameters to meet the maximum panoramic converter field of view specification and operating depth requirements. The dome port parameters include, e.g., the dome port diameter, the optical surface radii, and the dome port center thickness.

Figure 9:
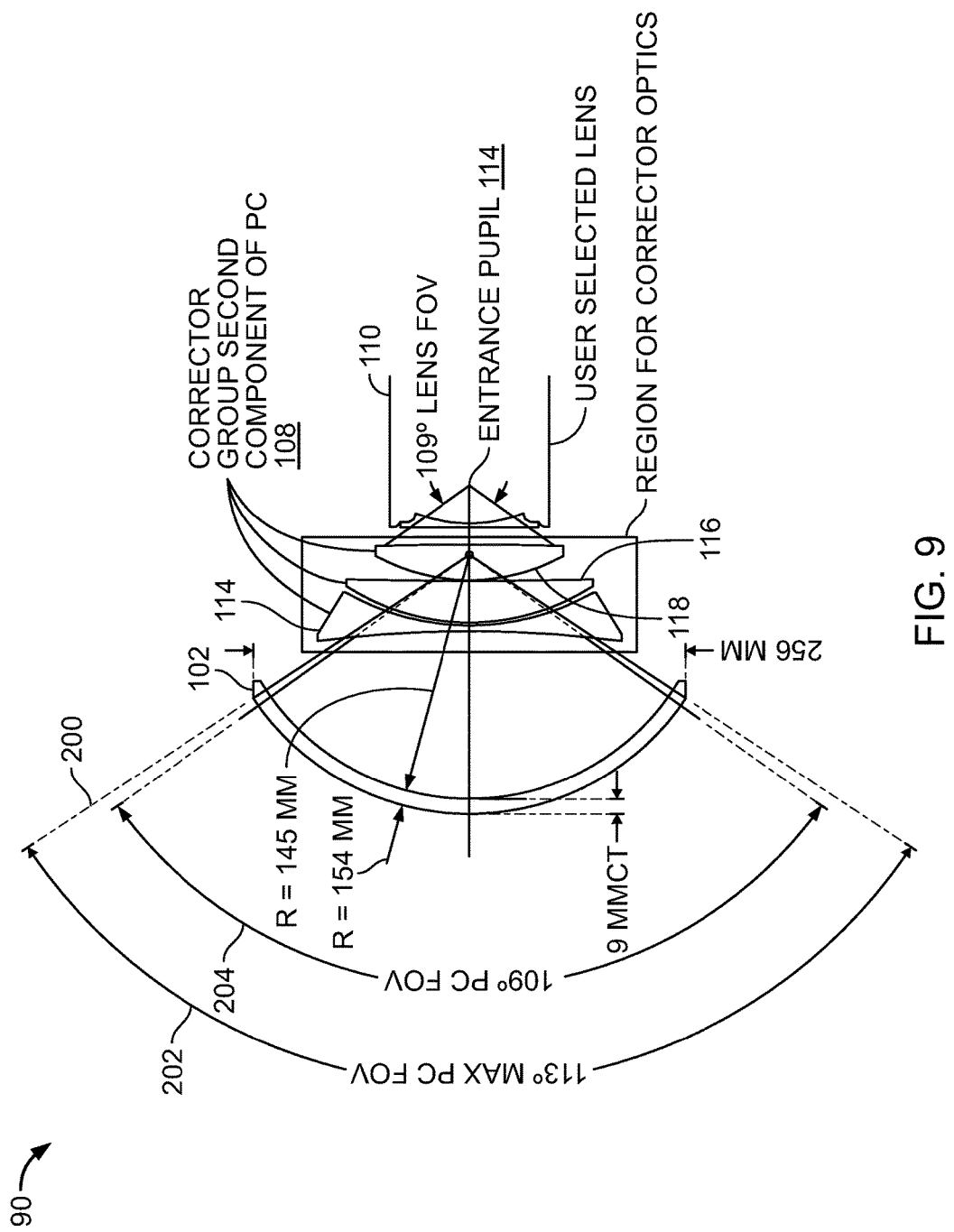
FIG. 9 is a diagram showing an exemplary layout of an imaging system that has a panoramic converter.

FIG. 9 shows the relationship between the maximum panoramic converter field of view, the dome port diameter, and the optical surface radii. The center thickness of the dome port 102 is determined based on whether the imaging system is intended to be used in a shallow water environment or a deep water environment. A dome port center thickness of about 7 to 9 mm is usually adequate for operations at depths up to about 100 meters. A dome port center thickness of about 20 to 25 mm can be used in deep water at depths approaching about 1500 meters.

The third step of the configuration process includes designing the corrector group of lens 108, taking into account an optical model of the camera lens to be used with the corrector group 108. Since a panoramic converter having a large field of view is downward compatible with camera lenses having smaller field of views, it is preferable to design the panoramic converter to be compatible with a camera lens having a large field of view and a full frame or medium format image sensor. The following are examples of camera lenses that have large field of views and associated image sensors:

1. Zeiss 15 mm Distagon
   a. FOV=109 degrees
   b. Sensor imaging diagonal is 43.3 mm (full frame sensor)
2. Rodenstock 28 mm Apo-Sironar
   a. FOV=101 degrees
   b. Sensor imaging diagonal is 70.0 mm (medium format sensor)
3. Sony 11-15 mm SCL-P11×15
   a. FOV=102 degrees
   b. Sensor imaging diagonal is 27.1 mm (Super 35 sensor)

FIG. 9 shows a general layout of the panoramic converter system 90. The various components of the system 90, such as the surface radii of each lens in the corrector group of lenses 108, are designed to eliminate the field curvature aberration generated by the dome port 102 while maintaining the imaging system field of view and the specified dome port parameters. In some implementations, the design of the components of the system 90 can be performed using an iterative process with an optical design software program, such as Zemax, Zemax OpticStudio, available from Zemax, Kirkland, Wash., or CODE V®, available from Synopsys' Optical Solutions Group, Marlborough, Mass.

A final step of the panoramic converter configuration process includes refining the optical prescription of the corrector group 108, adjusting the dome port radii, and modifying the setback distance D to provide a sufficient gap for inserting the camera lens 110.

The following describes properties of the components of a panoramic converter and techniques for configuring an imaging system that includes the panoramic converter. After determining the panoramic converter specifications (e.g., specifying the maximum panoramic converter field of view), the second and third steps of the panoramic converter configuration process are based on the optical properties of the dome port and optical components of the corrector group. The process for configuring the panoramic converter takes into account relationships between optical parameters of the dome port and the corrector group optics that interact to achieve the overall aberration correction provided by the panoramic converter.

The following describes characteristics of the dome port 102 in FIG. 1. The dome port 102, which is the first component of the panoramic converter 100, provides a system portal that passes light from an object in water to the camera lens and the image sensor. The dome port 102 establishes a watertight physical barrier between fresh water or seawater and the internal region of the housing that contains other components of the imaging system 90. For example, a large field of view offered by some rectilinear camera lenses is about 110 degrees. To avoid vignetting, the panoramic converter used with such wide angle lenses can be configured to have a field of view equal to or larger than the native field of view of the camera lens. As an approximation, the panoramic converter field of view (PC FOV) is defined by the dome port diameter and the entrance pupil location of the camera lens.

Referring to FIG. 9, light rays that are normal to the concentric dome port surfaces propagate toward the center of curvature, pass through the region containing the corrector group optics 108, and enter the entrance pupil of the camera lens 110, which in this example is a Zeiss 15 mm Distagon lens. The envelope of the light rays 200 shown in FIG. 9 defines the panoramic converter field of view 202 that matches (or is larger than) the field of view 204 of the camera lens 110. In the example of FIG. 9, the maximum panoramic converter field of view is 113 degrees, which is defined by the 256 mm clear aperture diameter of the dome port 102. The operating field of view is 109 degrees, which is defined by the field of view of the camera lens.

The following describes the field curvature and optical surfaces of the concentric dome port 102. Referring back to FIG. 2, when the optical system entrance pupil 124 is located at the center of curvature of the concentric dome port surfaces, the image is formed on a spherical surface known as the Petzval surface. See, e.g., "Fundamentals of Optics" by Francis A. Jenkins and Harvey E. White, third edition (1957), McGraw Hill, page 150, and "Optical System Design" by Robert E. Fischer & Biljana Tadic-Galeb (2000), McGraw hill, pages 78. In most electronic imaging implementations, the image sensor surface is flat and the inability to form an image on a flat surface is the reason why dome ports used with cameras and camcorders produce poor quality images. A discussion of the entrance pupil location and concentric dome port aberrations can be found in, e.g., "Design Considerations for Underwater Lenses with Water Contact Elements Concentric with the Entrance Pupil" by W. Mandler, Ernst Leitz Canada Limited, pages 167-174.

Figure 10:
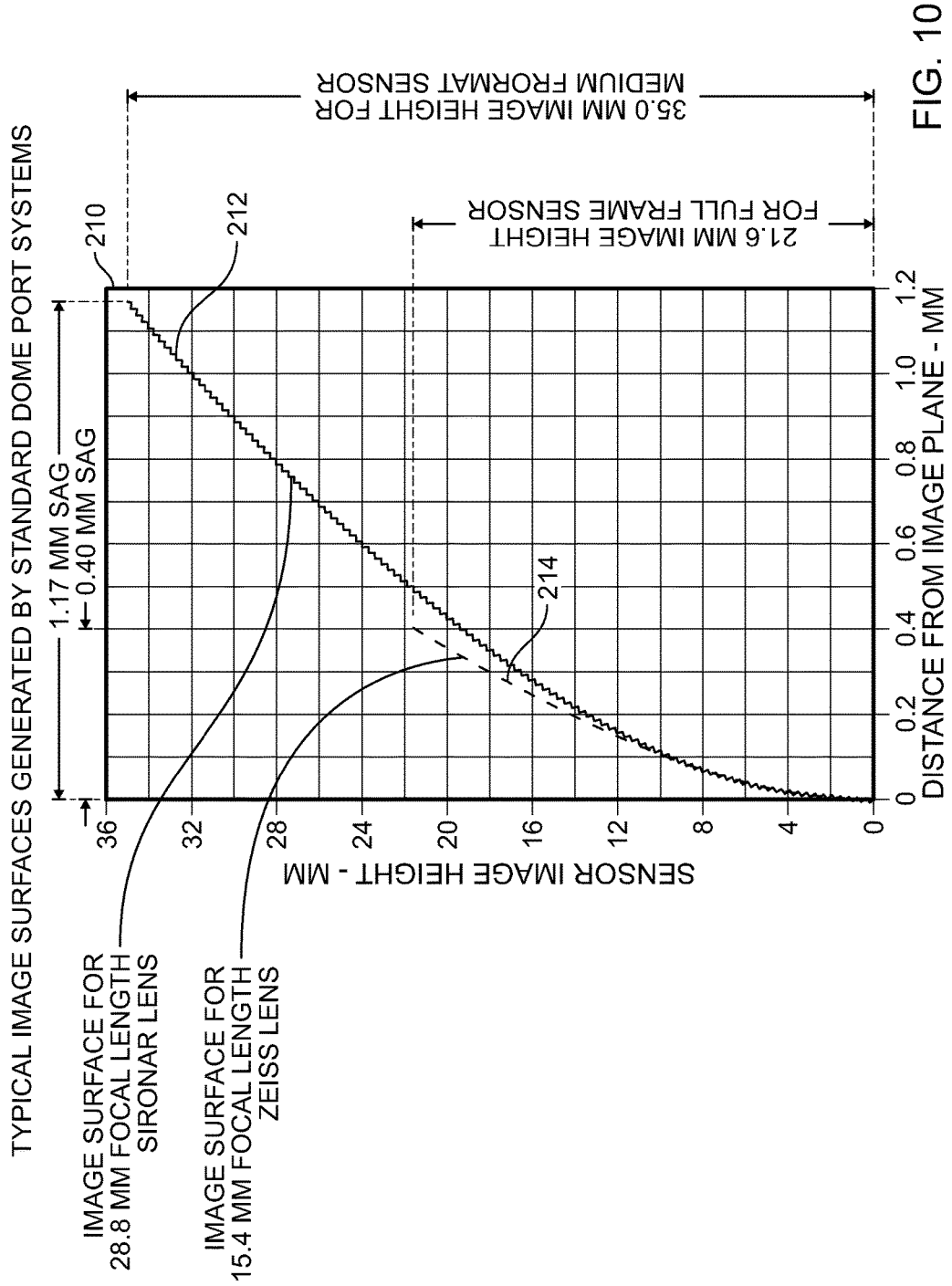
FIG. 10 is a diagram showing exemplary curved image surfaces generated by the dome port of FIG. 2.

The amount of field curvature aberration, also referred to as "sag," is determined by the curved image surface and the image height at the image sensor plane. For example, referring to FIG. 10, a diagram 210 shows two curved image surfaces (represented by the curved lines 212 and 214) generated by a dome port available from Reef Photo & Video, Ft. Lauderdale, Fla. The horizontal axis represents the distance from the image sensor surface, and the vertical axis represents the image height on the sensor surface relative to the center of the image sensor. The curve 212 represents the curved image surface that is generated when the dome port is used with a Rodenstock 28 mm Apo-Sironar lens and a medium format image sensor having a 35 mm image height. The curve 212 indicates a maximum field curvature of about 1.17 mm. The curve 214 represents the curved image surface that is generated when the dome port is used with a 15.4 mm focal length Zeiss Distagon lens and a full frame image sensor having a 21.6 mm image height. The curve 214 indicates a maximum field curvature of about 0.40 mm. For a given field of view value, the image surface sag is greater for longer focal length lenses used with large image sensors. A dome port having highly curved surfaces produces a more highly curved image surface, while a dome port having shallower (less curved) surfaces produces an image surface with less curvature.

In the panoramic converter 100, using a dome port 102 with highly curved surfaces may produce more field curvature aberration, requiring a larger compensating correction by the corrector group 108. Using shallow dome port surfaces may produce less aberration, but they provide less protection from high underwater pressures. In addition, the geometry of the exemplary system in FIG. 9 indicates that using shallow dome port radii would require a larger dome port diameter to accommodate a wider maximum panoramic converter field of view. While maintaining the maximum field of view and the maximum dome port diameter specifications, the dome port radii are adjusted to produce an amount of field curvature that can be effectively corrected by the corrector group 108.

The dome port 102 can have various diameters and surface radii. For example, the choices of the diameter and the surface radii can be affected by whether a concentric dome port or a non-concentric dome port is used. A panoramic converter 100 can have either a concentric dome port or a non-concentric dome port. The concentric dome port has concentric optical surfaces, whereas the non-concentric dome port has optical surfaces that are not concentric, usually with a more highly curved concave surface. The following is a comparison of the features of a non-concentric dome port versus those of a concentric dome port, assuming they have the same diameter, the same convex surface curvature radius, and the same dome center thickness.

Compared to the concentric dome port, the non-concentric dome port may generate a larger field curvature and increased amounts of astigmatism and lateral color aberration. For the non-concentric dome port, the overall aberration correction by the corrector group may be diminished if the additional astigmatism and lateral color aberration remain uncorrected.

A significantly non-concentric dome port with a steeper concave surface contains a larger volume of optical material and can be heavy and difficult to maneuver under water.

For a given center thickness, a non-concentric dome port with a steeper concave surface results in a larger meniscus lens edge thickness. For shallow water applications with a reduced meniscus lens center thickness, a slightly non-concentric form provides an increased edge thickness and greater mechanical design flexibility for water-tight mounting.

The concentric dome port may provide an angular magnification of about 1.0, whereas the non-concentric dome port (having a steeper concave surface curvature) may provide an angular magnification that results in an increased object space field of view. However, the non-concentric dome port may have increased image aberrations, e.g., astigmatism, and may need more powerful correction by the corrector group of lenses. Thus, it may be better to use a camera lens having a larger native field of view to achieve a larger panoramic converter field of view, instead of using a camera lens having a smaller field of view and using the non-concentric dome port to increase the field of view.

Based on the above comparison of the optical performance and physical features of concentric and non-concentric dome ports, the selection of a slightly non-concentric or concentric dome port is based on a tradeoff between slightly reduced optical performance and flexibility of mechanical mounting options. When designing an imaging system specified with a smaller maximum field of view, a dome port with smaller diameter and reduced center thickness might be preferred. In such a situation, a slightly non-concentric dome port can be used because it has a greater edge thickness. A dome port having a larger edge thickness is more compatible with a "double O-ring seal," which may have better protection against leaking and may provide more uniform side pressure on the outer diameter of the dome port lens to balance stress forces caused by pressure on the convex surface of the dome port. In some examples, for deep water applications, a vent may be drilled in the lens cell that allows seawater to flow into the region around the edge of port lens. As depth increases, pressure increases on the port outer diameter edge surface and the dome port is able to withstand more pressure on the convex surface.

When designing an imaging system having a larger maximum field of view and a larger diameter dome port having a larger center thickness, a concentric dome port can be used because the dome port will already have an adequate edge thickness, and the concentric dome port configuration may produce higher quality images.

After a determination is made as to whether to use a concentric dome port or a non-concentric dome port, the diameter and surface radii of the dome port can be determined. The dome port generates more field curvature aberration when the surface radii are smaller (higher curvature). The dome port radii should be small enough to achieve structural integrity in high pressure underwater environment, but not too small as to generate excessive amounts of field curvature. The diameter of the dome port is chosen to provide the desired field of view for the panoramic converter. The diameter of the dome port convex surface (e.g., 104) is the "field stop" aperture for the panoramic converter.

The following describes the features of the corrector group of lenses 108. The corrector group of lenses 108 is designed to compensate for aberrations and residual optical power of the dome port 102. The corrector group of lenses 108 is positioned between the dome port 102 and the entrance pupil 114 of the camera lens 110. In the examples of FIGS. 1 and 9, the corrector group 108 includes three lenses. However, the corrector group 108 can also include additional lenses.

In some implementations, the lenses within the corrector group 108 may have the following properties. The first lens (the lens closest to the dome port 102) is a double concave lens that is fabricated using dense lanthanum flint glass. The bi-concave lens 114 compensates for aberrations of astigmatism and lateral color associated with the second lens 116 and the third lens 118 of the corrector group 108. The second lens 116 is a double convex lens or a meniscus lens that is fabricated using light flint glass. The third lens 118 is a double convex lens (or a plano-convex lens) that is fabricated using fused silica or light crown glass. The second and third lenses 116, 118 of the corrector group 108, acting in conjunction with the bi-concave lens 114, compensate for the large amount of field curvature generated by the dome port 102. The surface radii and glass properties of the second and third lenses 116, 118 are chosen to generate a panoramic converter 100 that is aplanatic (i.e., free of third order spherical aberration and coma).

For example, using an optical design software such as Zemax or CODE V®, the dome port 102 radii are configured along with the radii of the lenses in the corrector group 108 to eliminate the primary field curvature aberration generated by the dome port 102. The parameters of the lenses of the corrector group of lenses 108 depend on the specified dome port diameter and the maximum panoramic converter field of view. The specified panoramic converter field of view and the dome port diameter can be used to determine a preliminary value for the radii of the surfaces of the dome port 102, which in turn determines the amount of field curvature aberration, which in turn determines the amount of field curvature correction, which in turn determines the parameters of the lenses of the corrector group 108. The corrector group 108 has an overall positive power that compensates for the negative optical power of the meniscus shape of the dome port surfaces. The overall power of the panoramic converter 100 is zero, thus generating what is known as an "afocal" system.

Figure 12:
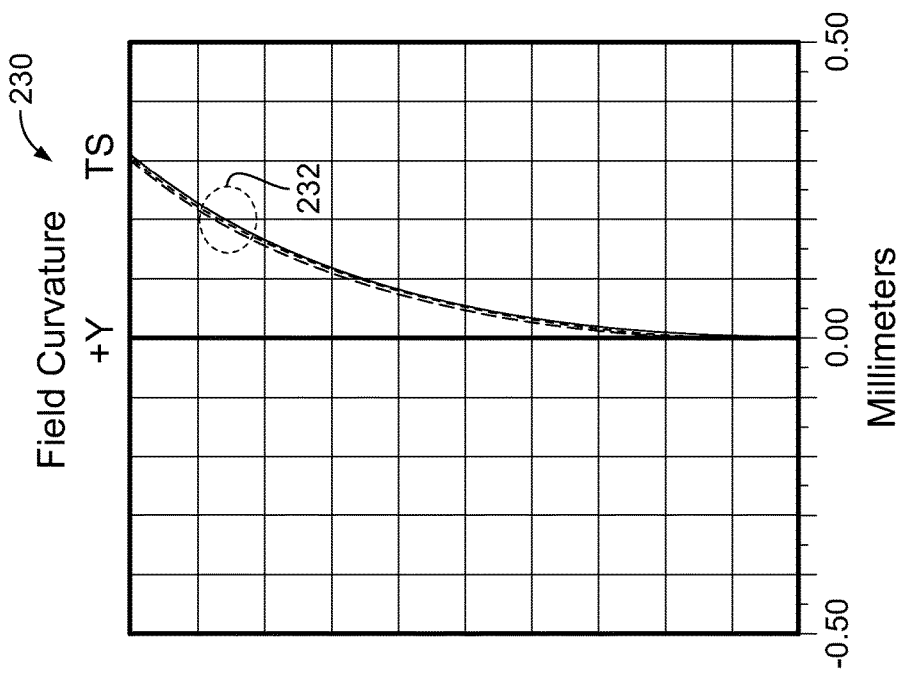
FIG. 12 is a graph showing exemplary field curvatures generated by a 10-inch dome port.
Figure 11:
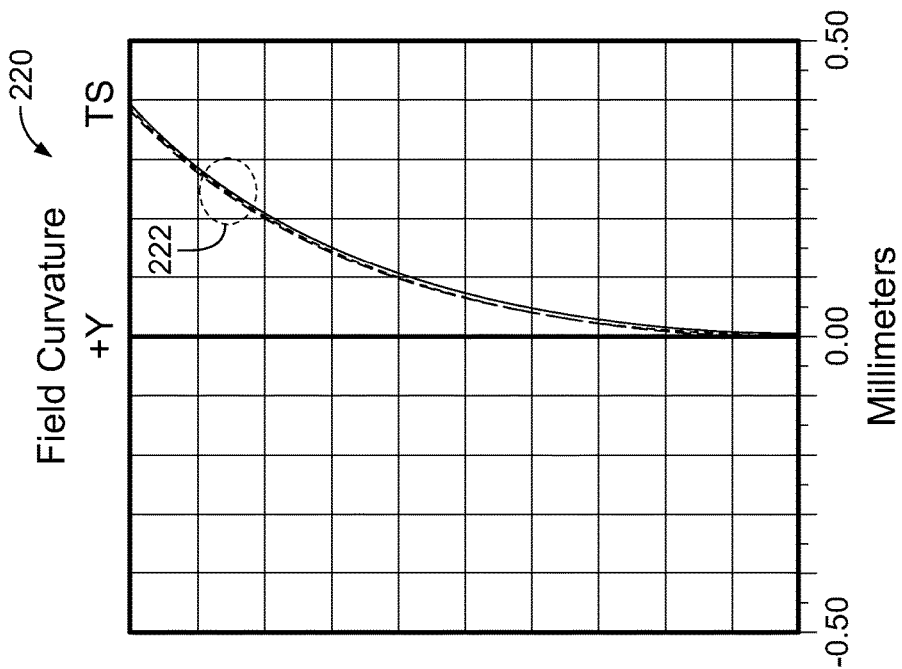
FIG. 11 is a graph showing exemplary field curvatures generated by an 8-inch dome port.

FIG. 11 is a graph 220 having curves 222 that show the tangential and sagittal field curvatures generated by a dome port having a diameter of 8 inches. FIG. 12 is a graph 230 having curves 232 that show the tangential and sagittal field curvatures generated by a dome port having a diameter of 10 inches. Because the amount of field curvature varies with the dome port surface radii, the amount of compensating field curvature provided by corrector group of lenses is selected to match a specific dome port. After inserting a paraxial model of a third party lens into the panoramic converter system, the optical parameters of the dome port and the corrector group of lenses are adjusted using an optical design software program, such as Zemax, Zemax OpticStudio, or CODE V®. See, e.g., "Afocal Viewport Optics for Underwater Imaging" by Dan Slater, Proc. of SPIE Vol. 9192 91920P, page 7 for a description about how the design of dome port and corrector group optics are influenced by the paraxial model. The paraxial models of the camera lenses used in a panoramic converter system can be constructed from the paraxial parameters provided by lens manufacturers. The corrector group of lenses can have the configuration shown in FIG. 9 and can be fabricated using the glass types described above. The radii and the center thicknesses of the lenses in the corrector group 108 may vary slightly from one system to another to produce the correct amount of compensating field curvature for a matched dome port. The paraxial model parameters, especially the chief ray angle in the image space and the exit pupil position, are used to refine the optical prescription of the corrector group optics and specify best setback distance, D.

Figure 13:
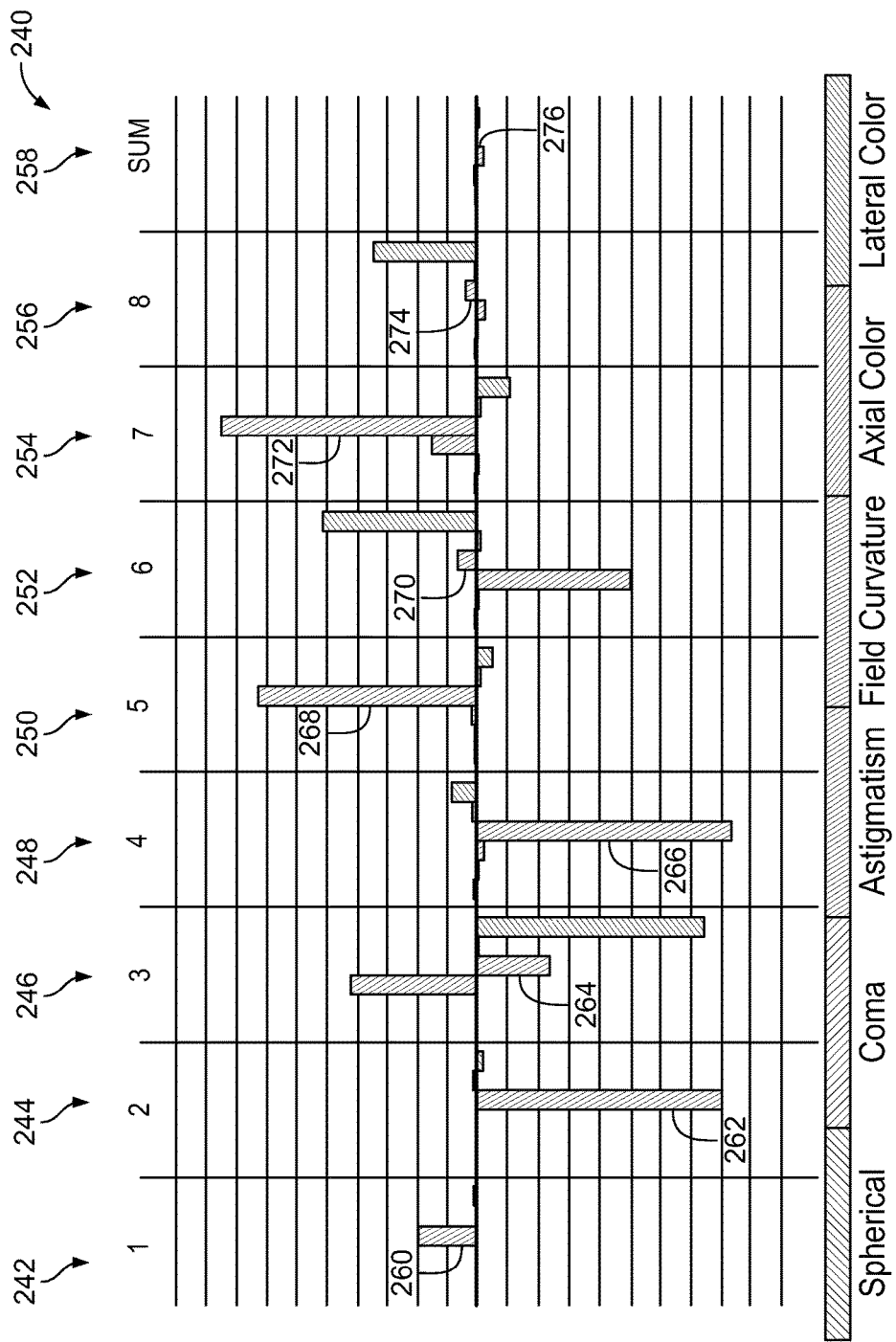
FIG. 13 is an exemplary Seidel diagram for a panoramic converter system using the 8-inch dome port.

FIG. 13 is a Seidel diagram 240 that shows the aberration contributions from each surface of the lenses in the panoramic converter 100, in which the 8-inch diameter dome port having the field curvature shown in FIG. 11 is used.

Figure 14:
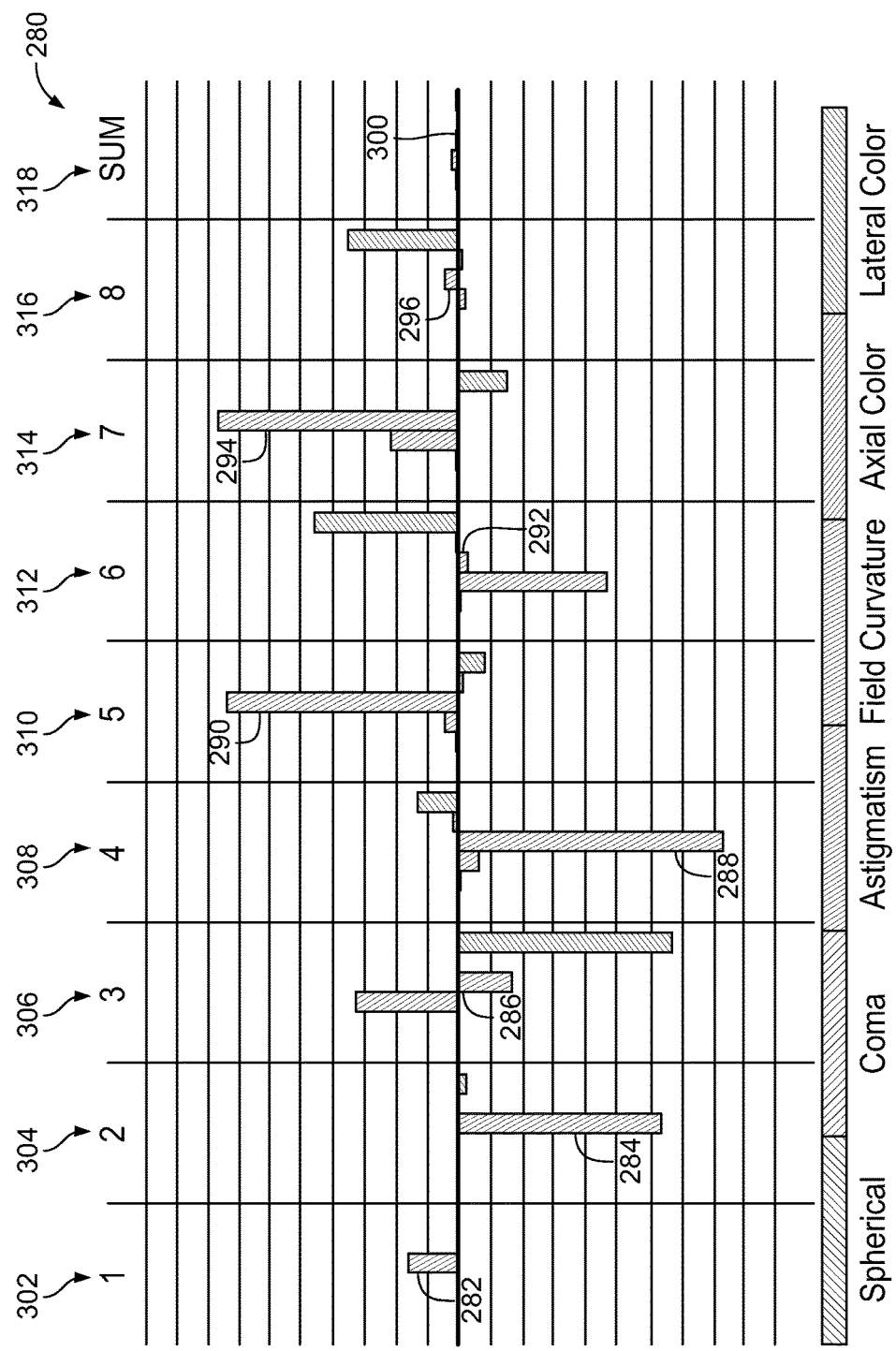
FIG. 14 is an exemplary Seidel diagram for a panoramic converter system using the 10-inch dome port.

FIG. 14 is a Seidel diagram 280 that shows the aberration contributions from each surface of the lenses in the panoramic converter 100, in which the 10-inch diameter dome port having the field curvature shown in FIG. 12 is used.

Referring to FIG. 13, a section 242 of the diagram 240 shows the aberrations generated by the first surface (which is a convex surface) of the 8-inch diameter dome port 102. A bar 260 indicates that the convex surface of the 8-inch dome port 102 generates a positive field curvature. A section 244 shows the aberrations generated by the second surface (which is a concave surface) of the 8-inch dome port 102. A bar 262 indicates that the concave surface of the 8-inch dome port 102 generates a negative field curvature. Sections 246 and 248 show the aberrations generated by the first and second surfaces of the first optical element, i.e., the bi-concave lens 114, of the corrector group 108. Sections 250 and 252 show the aberrations generated by the first and second surfaces of the second optical element, i.e., the lens 116, of the corrector group 108. Sections 254 and 256 show the aberrations generated by the first and second surfaces of the third optical element, i.e., the lens 118, of the corrector group 108. Section 258 shows the sum of the aberrations produced by the 8-inch dome port 102 and the corrector group of lenses 108.

Bars 264 and 266 indicate that the two concave surfaces of the bi-concave lens 114 produce negative field curvatures. Bars 268 and 270 indicate that the two surfaces of the lens 116 produce positive field curvatures. Bars 272 and 274 indicate that the two surfaces of the lens 118 produce positive field curvatures. The negative field curvatures produced by the bi-concave lens 114 and the positive field curvatures produced by the lenses 116 and 118 produce a net positive field curvature that compensates the overall negative field curvature produced by the surfaces of the dome port 102. A bar 276 shows that the final field curvature is small.

Referring to FIG. 14, sections 302 and 304 of the diagram 280 show the aberrations generated by the surfaces of the 10-inch diameter dome port 102. Bars 282 and 284 indicate that surfaces of the 10-inch dome port 102 generate an overall negative field curvature. Sections 306 and 308 show the aberrations generated by the first and second surfaces of the first optical element, i.e., the bi-concave lens 114, of the corrector group 108. Sections 310 and 312 show the aberrations generated by the first and second surfaces of the second optical element, i.e., the lens 116, of the corrector group 108. Sections 314 and 316 show the aberrations generated by the first and second surfaces of the third optical element, i.e., the lens 118, of the corrector group 108. Section 318 shows the sum of the aberrations generated by the 10-inch dome port 102 and the corrector group 108.

Bars 286 and 288 indicate that the two concave surfaces of the bi-concave lens 114 produce negative field curvatures. Bars 290 and 292 indicate that the two surfaces of the lens 116 produce positive field curvatures. Bars 294 and 296 indicate that the two surfaces of the lens 118 produce positive field curvatures. The negative field curvatures produced by the bi-concave lens 114 and the positive field curvatures produced by the lens 116 and 118 produce a net positive field curvature that compensates the overall negative field curvature produced by the surfaces of the 10-inch dome port 102. A bar 300 shows that the final field curvature is small.

Slight variations in the parameters of the corrector group of lenses 108 compensate for different amounts of field curvatures generated by the 8-inch or 10-inch diameter dome ports. Data presented in FIGS. 13 and 14 show that matched corrector group of lenses 108 compensate for large amounts of dome port field curvature without adding significant other aberrations to the panoramic converter 100.

The panoramic converter 100 can use dome ports having radii and diameters that differ substantially from the 8-inch and 10-inch dome ports described above whose field curvatures are shown in FIGS. 11 and 12, respectively. If the aberration compensation of the corrector group is incomplete, the adjustments to the dome port diameter and radii are implemented and the panoramic converter configuration process is repeated to design a panoramic converter system with acceptable aberration compensation. Specific corrector group prescriptions matched to a wide range of dome port optical parameters can achieve a high level of aberration correction.

The following describes the setback distance D (FIG. 1). The entrance pupil location in the paraxial model of the camera lens 110 is used to determine a nominal setback distance. Depending on the chief ray angle in the image space and the exit pupil location in the paraxial model, a "smoother," slightly more uniform aberration correction over the entire field of view, may be achieved by small adjustments to the nominal setback distance. For a wide variety of camera lenses, the variation in the setback distance from the nominal value is usually less than 5%.

The following describes various ways to couple the panoramic converter to other components, such as a waterproof housing. The position of the panoramic converter and the third party lens attached to the underwater housing influences the buoyancy and balance of the submerged equipment package, (e.g., waterproof enclosure, video camera/photo camera, underwater lights, battery pack, etc.). Having an imaging system that includes the dome port, the corrector group of lenses, and the camera lens allows for multiple deployment configurations that can complement the overall buoyancy and balance of the submerged equipment package.

Figure 15:
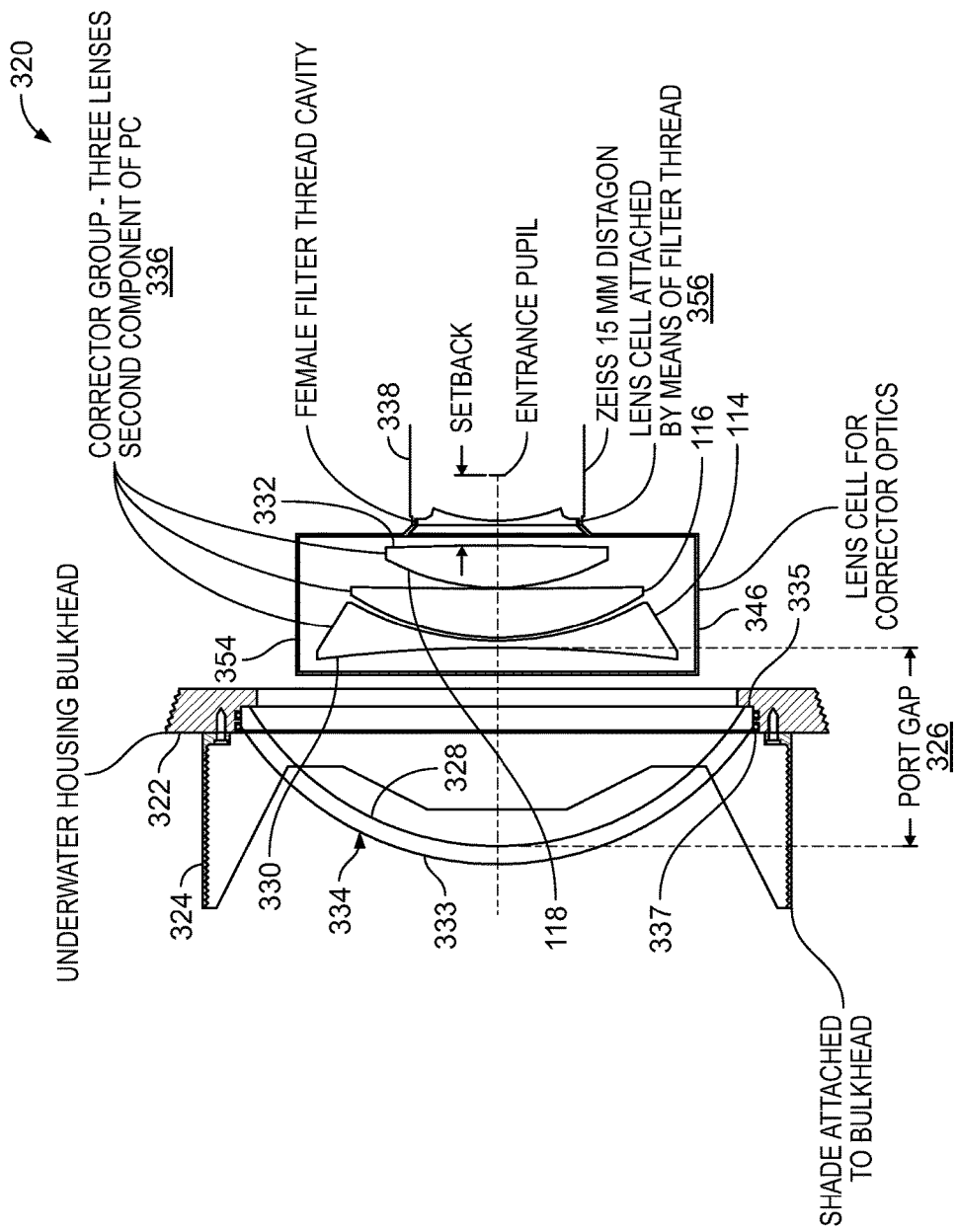
FIG. 15 is a diagram that illustrates an exemplary configuration of a dome port mounted to an underwater housing.

Referring to FIG. 15, in some implementations, an imaging system 320 includes a dome port 334 that is mounted directly to an underwater housing bulkhead 322. The "bulkhead" refers to the rugged front surface of a housing that contains the opening for allowing light to pass to the image sensor. The bulkhead provides mechanical support for large underwater pressure generated at the convex surface 333 of dome port 334. This arrangement minimizes the volume of water displaced by the panoramic converter and eliminates the need for additional dome port mounting hardware. However, the bulkhead opening should be large enough to accommodate the dome port diameter and machined to form pressure seat 335 and watertight seal using O-ring glands 337. The corrector group 336 is a stack of lenses and lens spacers which is inserted into a cylindrical tube or "lens cell" 346. In some implementations, the lens cell 346 can be attached to the camera lens 338 by using a filter thread 356 commonly found on camcorder and camera lenses. A scalloped panoramic converter lens shade or circular shade 324 can be attached to the housing bulkhead 322. The port gap 326 (which is the distance between the center of the second surface 328 of the dome port 334 and the center of the first surface 330 of the first element 114 of the corrector group 336) and the setback distance (which is the distance between the center of the second surface 332 of the third element 118 of the corrector group 336 and the entrance pupil of the camera lens 338) are set according to the panoramic converter system optical prescription.

The length of the threaded male sleeve on the corrector group lens cell 346 is used to control the setback distance. The port gap 326 is controlled by positioning the camera lens 338 with the attached corrector group lens cell 346 deeper or shallower into the underwater housing. An advantage of mounting the dome port directly to the housing bulkhead is that no port ring is required. The bulkhead is rugged and thick. One can counterbore a hole into the bulkhead, add O-ring grooves, and mount the dome port without extra machined parts.

Figure 16:
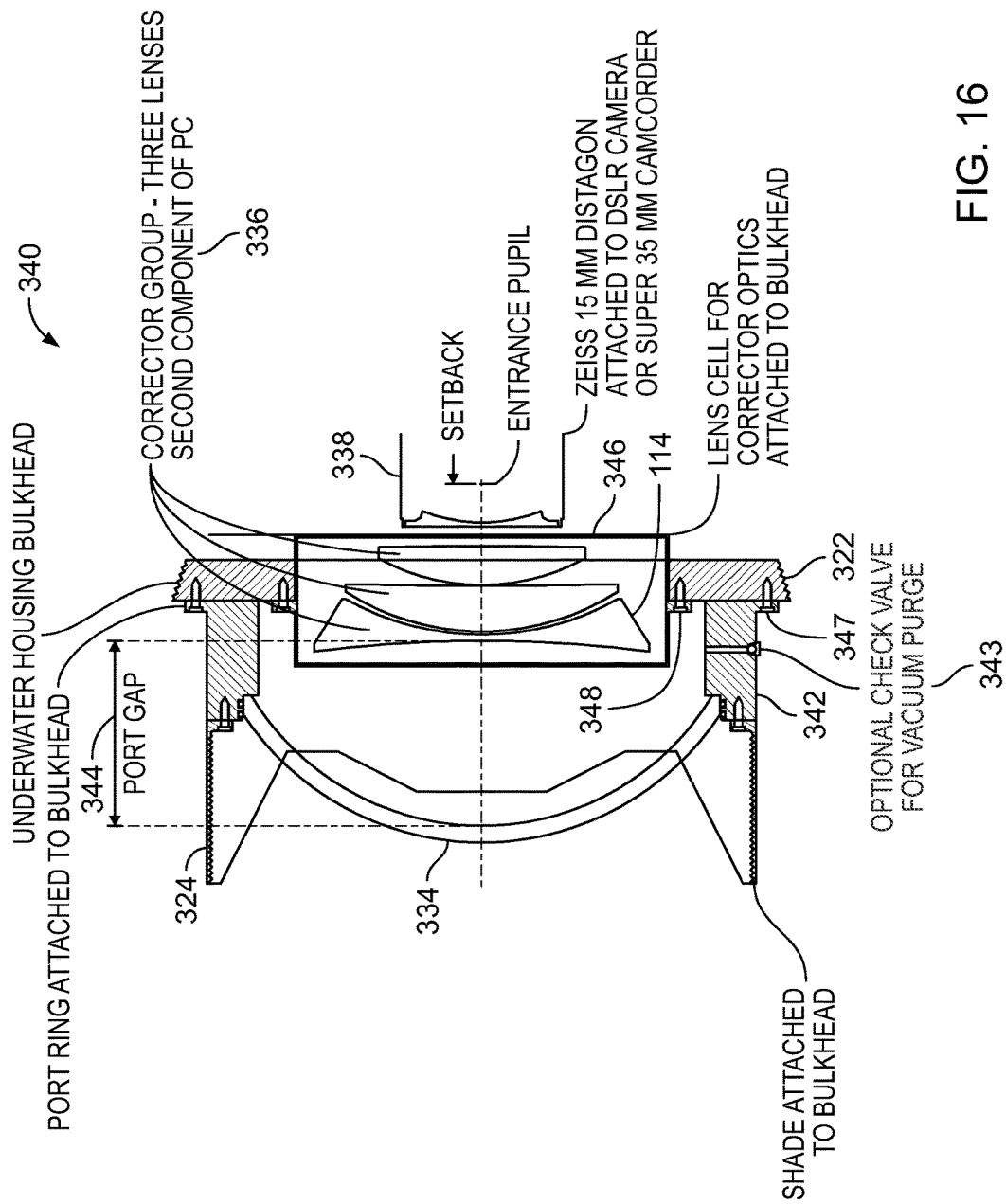
FIG. 16 is a diagram of an exemplary imaging system that includes a dome port mounted in a port ring attached to an underwater housing.

Referring to FIG. 16, in some implementations, an imaging system 340 includes a dome port 334 that is mounted into a watertight dome port ring 342, which is attached to the underwater housing bulkhead 322 via a watertight connection, such as a flange 347. In some implementations, the corrector group lens cell 346 can include a flange 348 to achieve a watertight or vacuum seal mounting onto the housing bulkhead. A scalloped panoramic converter lens shade or circular shade 324 can be attached to the port ring 342. The port gap 344 is controlled by the thickness of the port ring 342 and the location of mounting flange 348 on the corrector group lens cell 346. The arrangement shown in FIG. 16 increases the amount of displaced water and provides greater buoyancy to the front end of the equipment package. Dimensions of the bulkhead mounting surface should be large enough to accommodate the diameter of the dome port mounting ring 342. The opening in the bulkhead 322 is sized to accommodate the diameter of the corrector group lens cell 346. The port gap 344 and the setback distance are set according to the panoramic converter system optical prescription.

In the example shown in FIG. 16, the corrector group lens cell 346 is attached to the underwater housing bulkhead 322 by a mounting flange 348. The location of the mounting flange 348 is chosen to maintain the correct setback distance to the camera lens 338 in the underwater housing. The port ring 342, which is attached to the exterior face of the underwater housing bulkhead 322, is designed to maintain the correct port gap 344.

In some implementations, the corrector group lens cell 346 is attached to the underwater housing bulkhead 322 by a watertight mounting flange 348. The port ring 342 is attached to the corrector group lens cell 346 by a watertight mounting flange 347. The location of the mounting flanges 348 and 347 are chosen to maintain the correct port gap and setback distance to the camera lens 338 in the underwater housing. This arrangement requires a smaller mounting surface. For example, a DSLR camera housings can have a smaller "front face" mounting surface, and the arrangement described here is well suited for DSLR camera housings. In some examples, a DSLR camera housing may have a coarse, watertight screw thread machined into the "front face" mounting surface, and the corrector group lens cell can use the watertight mounting thread instead of the mounting flange.

In the example shown in FIG. 15, the method for mounting the dome port 334 and the corrector group lens cell 346 is simple, but precludes the option of purging the region between the dome port 334 and the first lens 114 of the corrector group 336. In the example shown in FIG. 16 (and also the example in which the port ring is attached to the corrector group lens cell by a watertight mounting flange), an optional check valve 343 inserted into dome port mounting ring 342 can be used to purge the region between the dome port 334 and the first lens 114 of the corrector group 336.

Various connection methods can be used based upon the configuration of the underwater equipment housing. For example, the connections among components of the panoramic converter and the connection between the panoramic converter to the housing can be watertight and include radial or axial seals by use of O-rings. A flange seal is an example of an axial seal. A counterbore with O-ring glands in the wall of the counterbore is an example of a radial seal. A watertight thread with an O-ring can use axial or radial compression of the O-ring depending upon the design of the thread relief. For example, a DSLR camera housing can use a watertight thread to connect a dome port ring to the main body of the housing. There are many connection and mounting configurations that can be used to provide a watertight seal, a few examples have been provided above, but the invention is not limited to those examples.

Figure 17:
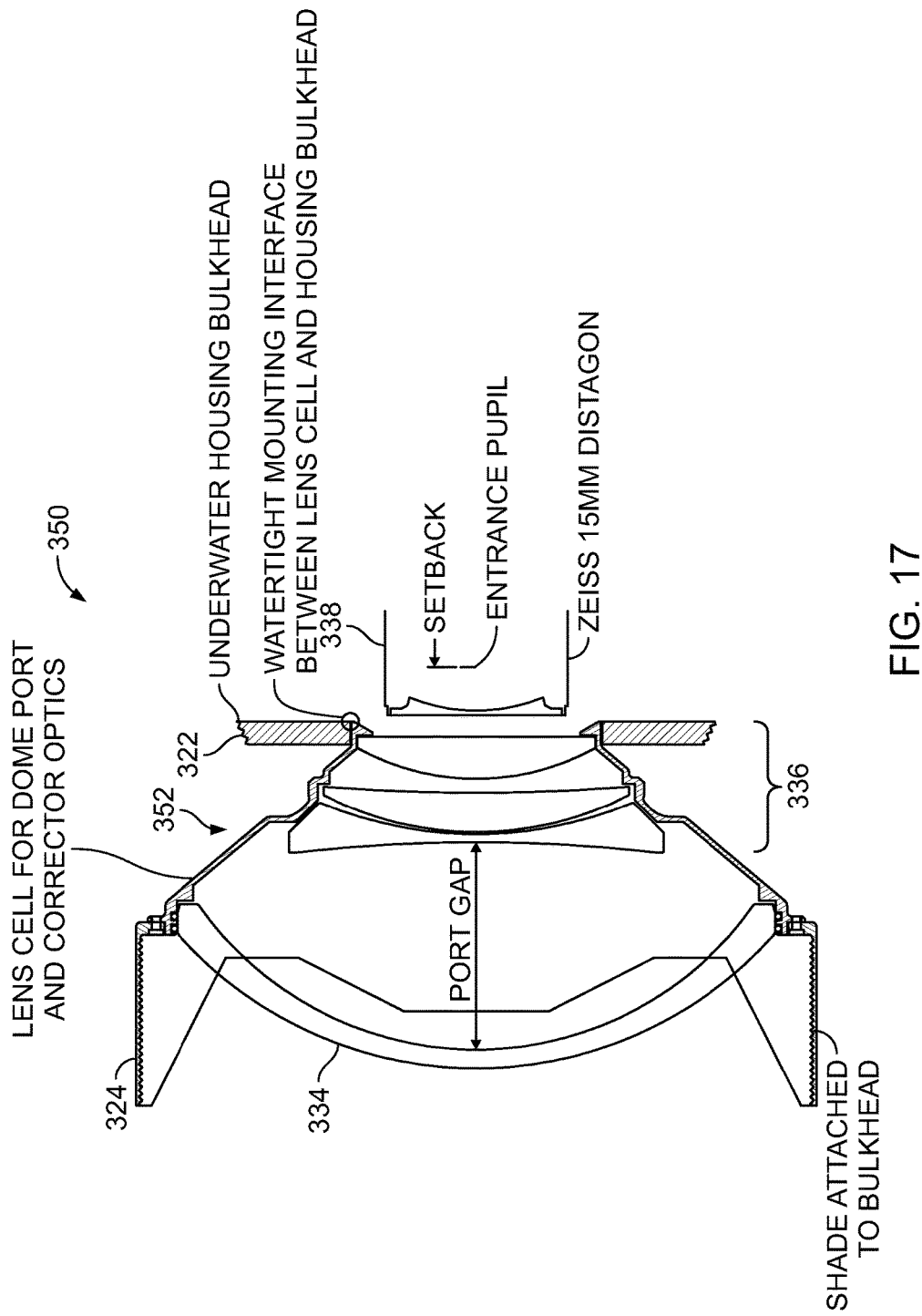
FIG. 17 is a diagram of an exemplary imaging system that includes a dome port and a corrector group that are assembled in a single vacuum sealed lens cell.

The following describes a panoramic converter lens cell. Referring to FIG. 17, in some implementations, an imaging system 350 includes a dome port 334 and a corrector group 336 that are assembled in a single vacuum sealed lens cell, referred to as the panoramic converter lens cell 352. The panoramic converter lens cell 352 is attached to the bulkhead 322 of the underwater housing. A scalloped lens shade 324 can be integrated into or attached to the panoramic converter lens cell 352. The correct setback distance is achieved by properly positioning the camera lens 338 within the underwater housing. In some examples, to maintain the correct orientation of the scalloped lens shade 324, a bayonet mount is used at the housing bulkhead 322. If screw thread mounting to the bulkhead 322 is chosen, a circular lens shade can be used. An advantage of the imaging system 350 is that mounting the dome port 334 and the corrector group 336 within a vacuum sealed lens cell 352 eliminates exposure of all internal optical surfaces to dirt, dust and moisture condensation.

The following describes several examples of panoramic converter systems using dome port lenses of various sizes and various types of camera lenses and image sensors.

Figure 18A:
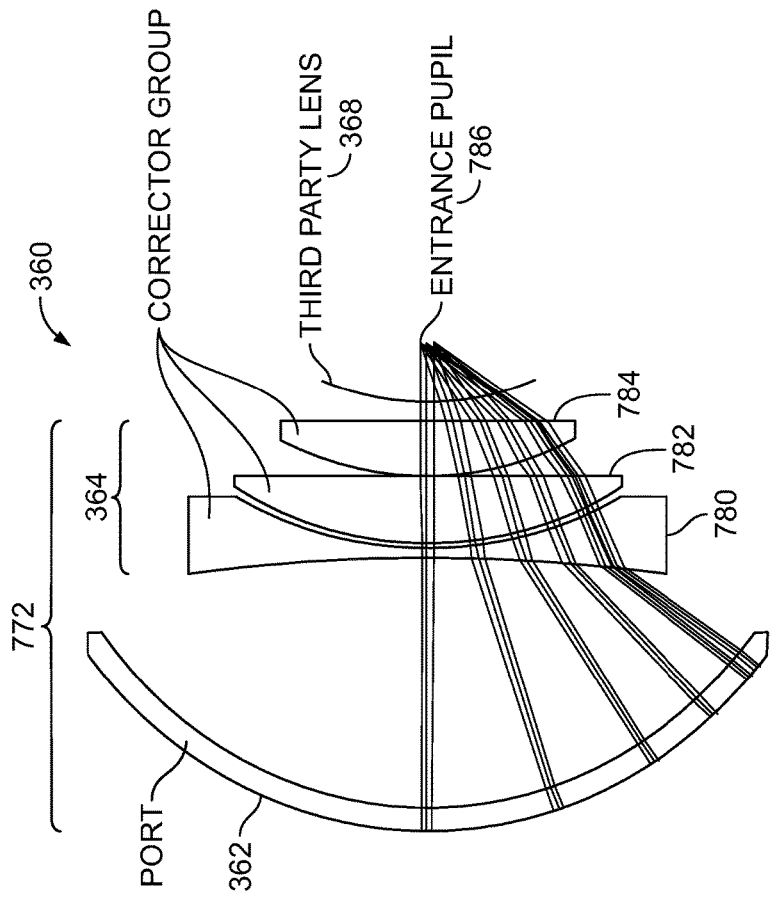
FIGS. 18A and 18B are diagrams of an exemplary imaging system that includes a 10-inch dome port and a Zeiss 15 mm Distagon lens.
Figure 18B:
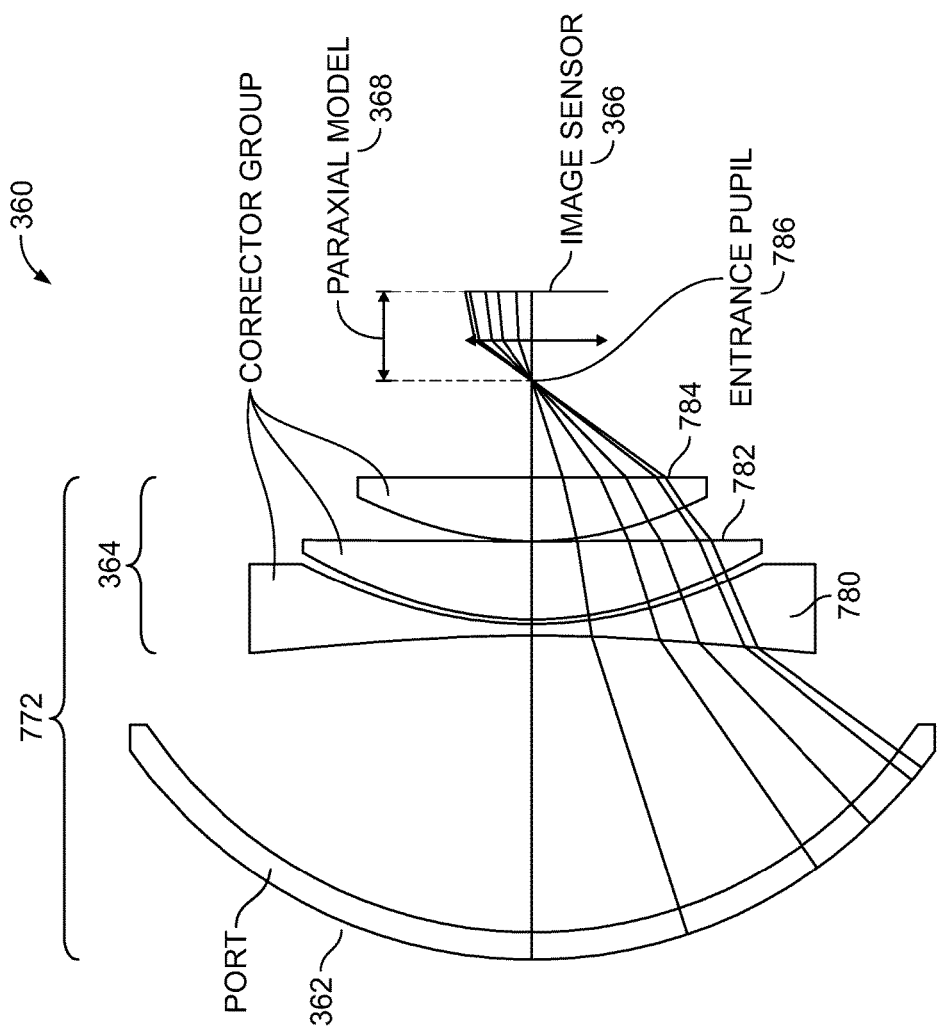

Referring to FIGS. 18A and 18B, in some implementations, an imaging system 360 includes a 10-inch diameter dome port 362 having a 9 mm center thickness, a matched corrector group 364, a Zeiss 15 mm Distagon lens 368, and a full frame image sensor 366. FIGS. 18A and 18B represent the same system 360, except that in FIG. 18B the lens 368 is represented by a paraxial model, and the full frame image sensor 366 is shown in FIG. 18B but not in FIG. 18A. The dome port 362 and the corrector group 364 together form a panoramic converter 772. The imaging system 360 provides a 109-degree field of view. In this example, the dome port radii are 156.55 mm (convex surface) and 147.55 mm (concave surface). The port gap is 94.34 mm and the setback distance is 29.79 mm. The total axial length is 184.38 mm. Here, the "total axial length" refers to the distance from the center of the convex surface of the dome port to the center of the entrance pupil 786 of the lens 368.

The corrector group 364 includes a first lens 780, a second lens 782, and a third lens 784. The first lens 780 is a bi-concave lens, the second lens 782 is a meniscus lens, and the third lens 784 is a bi-convex lens. Table 1 below shows various parameters of the first, second, and third lenses 780, 782, and 784. In Table 1, the $1^{st}$, $2^{nd}$, $3^{rd}$, $4^{th}$, $5^{th}$, and $6^{th}$ surfaces refer to the first and second surfaces of the lens 780, the first and second surfaces of the lens 782, and the first and second surfaces of the lens 784, respectively.

TABLE 1

| Surface | Radius | Thickness | Diameter | Glass |
| --- | --- | --- | --- | --- |
| 1 | −705.2 | 3.5 | 180 | H-ZLAF5OD (dense |
| 2 | 148.2 | 1.65 | | lanthanum flint) |
| 3 | 134.8 | 24.7 | 146 | QF1 (short flint) |
| 4 | 3530 | 0.4 | | |
| 5 | 115 | 21 | 111 | F_SILICA (fused |
| 6 | −1995 | | | silica) |

Figure 19A:
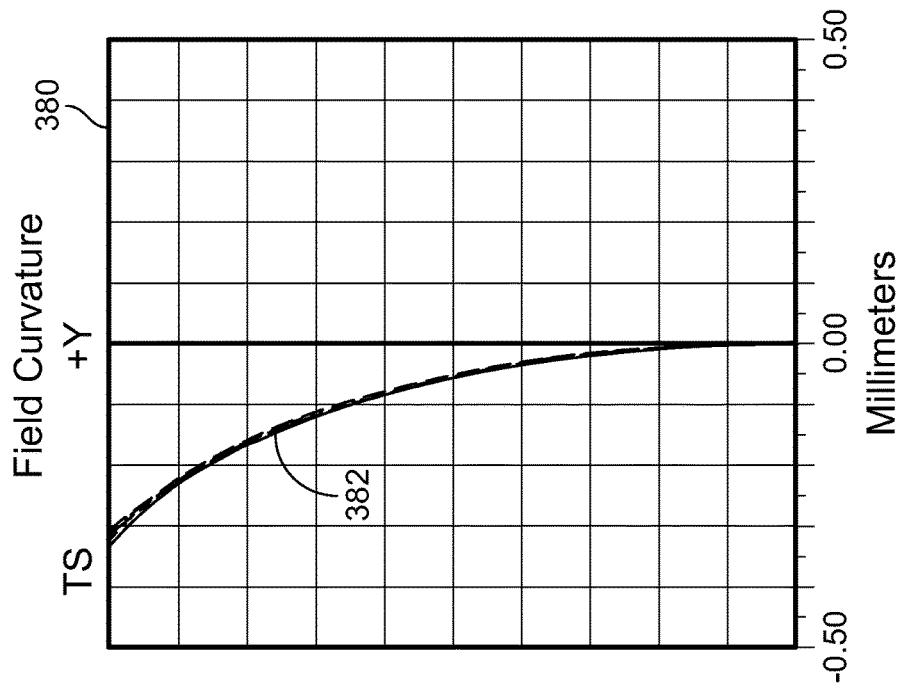
FIGS. 19A and 19B are graph showing exemplary field curvatures of the dome port and the corrector group, respectively, of the imaging system of FIG. 18A.
Figure 19B:
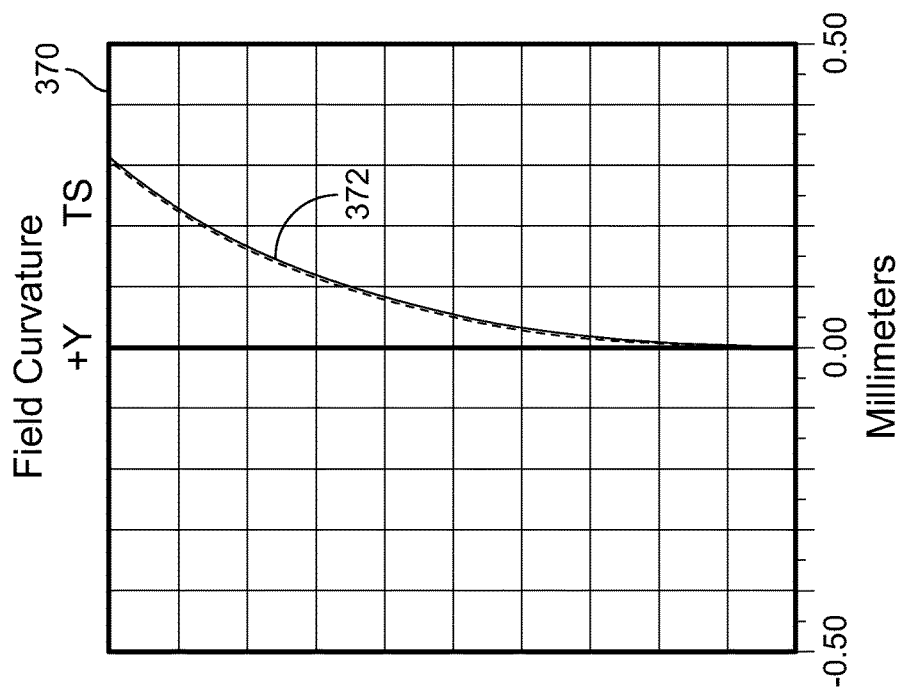
Figure 19D:
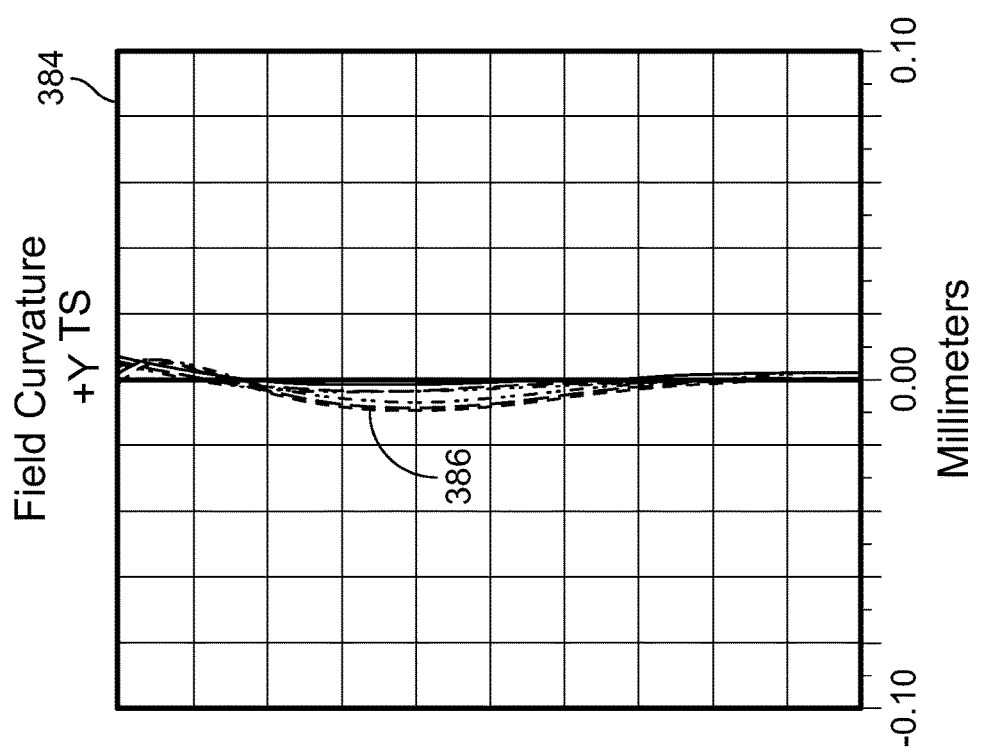
FIG. 19D is a plot of the residual field curvature at the image plane when the dome port and the corrector group of FIG. 18A are combined and the lens is set at best focus.

Referring to FIG. 19A, a graph 370 includes curves 372 representing the field curvature of the dome port 362 for light rays of three different visible wavelengths, red, green and blue light. Referring to FIG. 19B, a graph 380 includes curves 382 representing the compensating field curvatures of the corrector group 364 for light rays of three different wavelengths. The same wavelengths used for calculating data in the graph 370 were used for the graph 380. The image sag, (green light), produced by the dome port 362 at the maximum image height of 21.63 mm (relative to the center of the image sensor) is +0.31 mm. The compensating image sag, (green light), generated by the corrector group 364 at the maximum image height of 21.63 mm (relative to the center of the image sensor) is −0.31 mm. The curves 382 are substantially mirror images of the curves 372. As shown in FIG. 19C, a comparison of the curves 372 and 382 shows that, when used with the Zeiss 15 mm Distagon lens and the full frame image sensor 366, the corrector group 364 can substantially compensate the field curvature generated by the dome port 362. FIG. 19D is a plot 384 of residual field curvature 386 for the imaging system 360 of FIG. 18A. The maximum residual field curvature at the best focus image plane (three colors) is 0.008 mm.

Figure 20A:
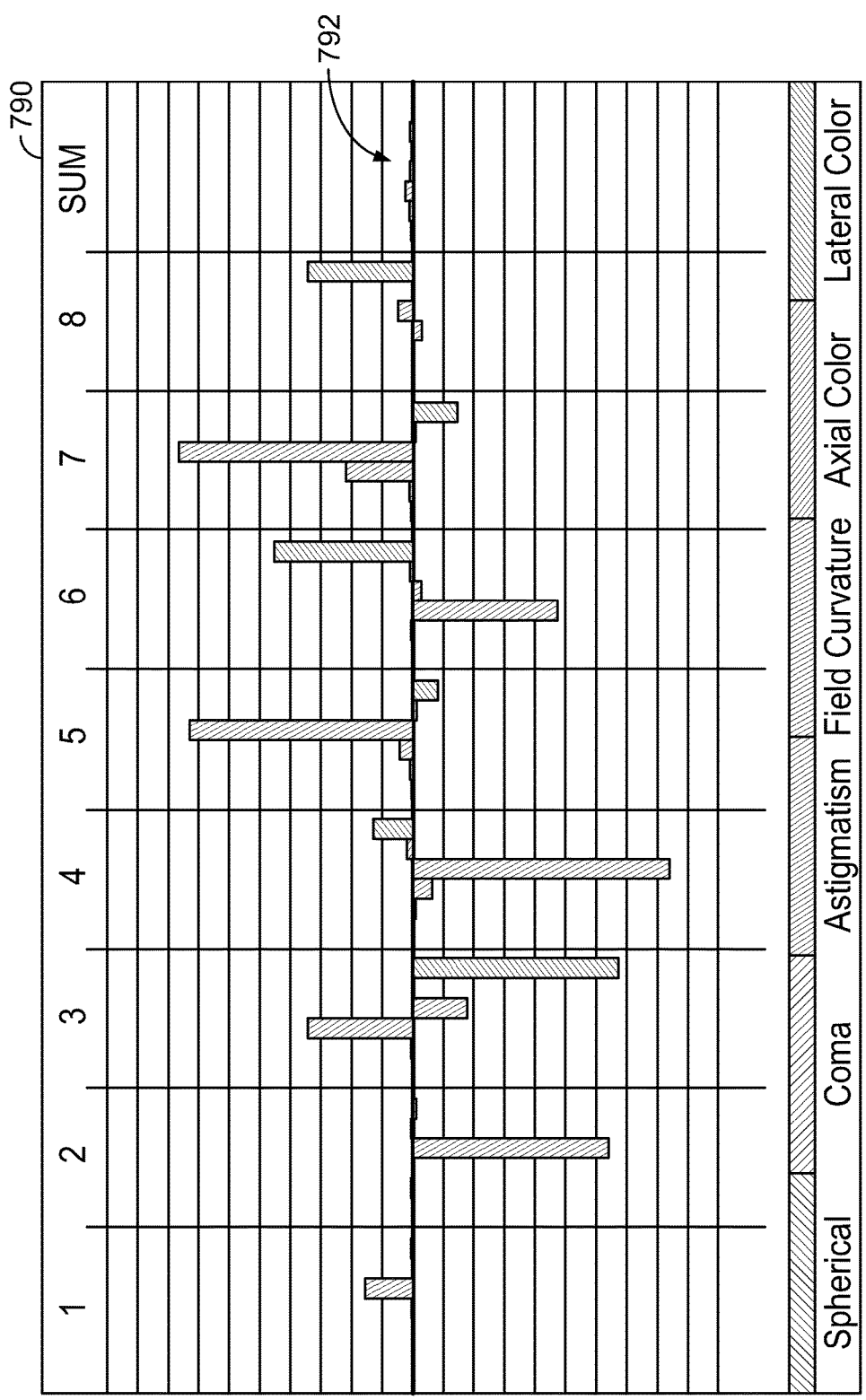
FIG. 20A is a Seidel diagram that shows exemplary aberrations and aberration corrections associated with each optical surface of the panoramic converter of FIG. 18A.

FIG. 20A is a Seidel diagram 790 that shows the aberrations and aberration corrections associated with each optical surface of the panoramic converter 772 (FIG. 18A). The Seidel aberration data is generated by Zemax optical design software. In the calculations, it is assumed that the camera lens 368 does not contribute any aberration. Although the Seidel aberration data represent only third order aberrations calculated from paraxial rays, they provide an accurate breakdown of how each lens surface of the panoramic converter 772 is involved with the overall aberration compensation. Bars 792 show that the final aberrations, such as spherical aberration, coma aberration, astigmatism, field curvature, axial color aberration, and lateral color aberration are small.

FIG. 20B shows a spot diagram 800 of the imaging system 360 (FIG. 18A).

Figure 20C:
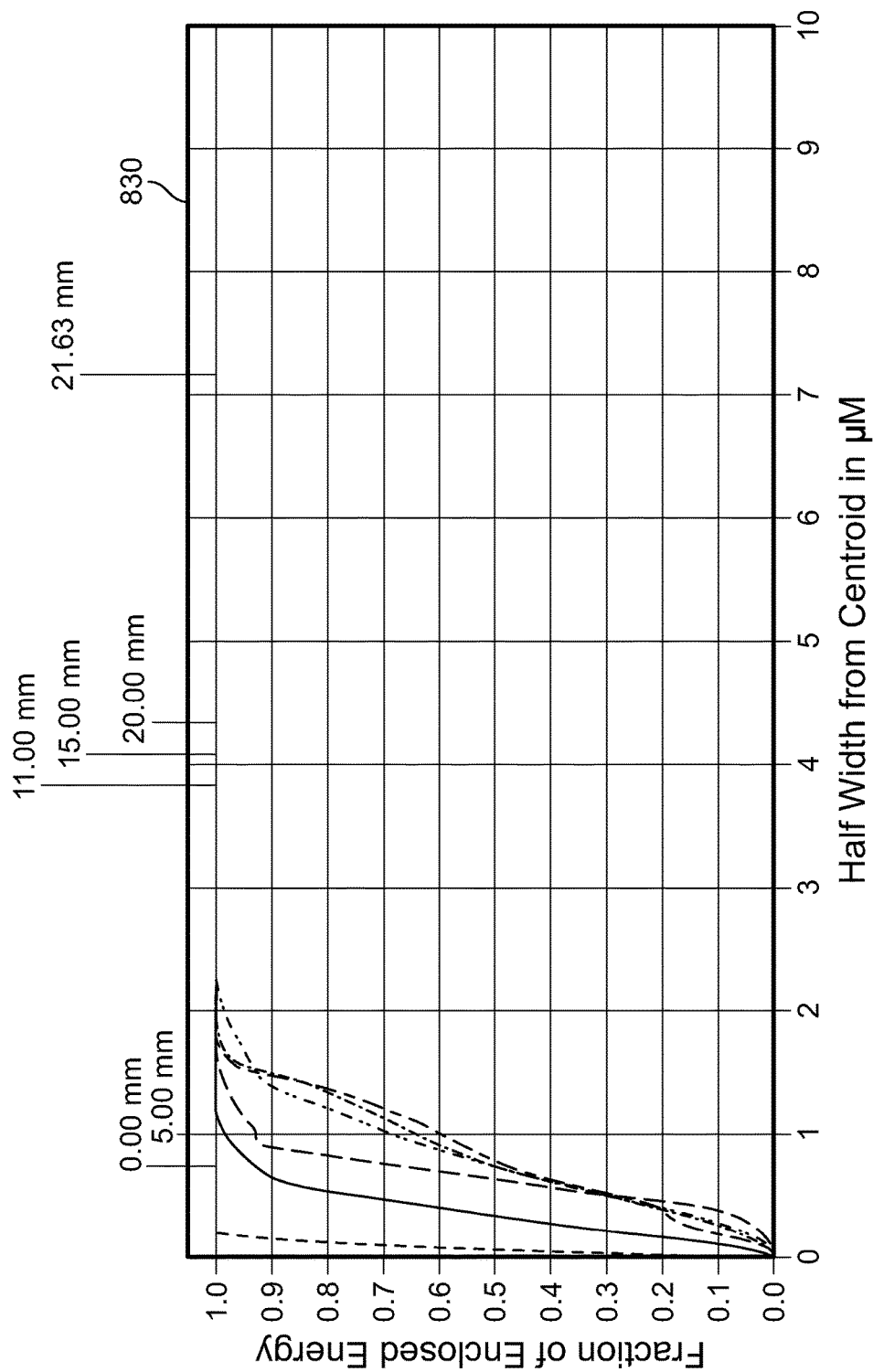
FIG. 20C is a graph showing an exemplary ensquared energy analysis for the imaging system of FIG. 18A.

FIG. 20C is a graph 830 showing an ensquared energy analysis for the imaging system 360 (FIG. 18A).

The camera lens 368 and the image sensor 366 can be other types of lenses and sensors. The following are examples of combinations of the camera lens 368 and the image sensor 366.

An Arri ultra Prime 14 mm and 12 mm lenses used with a Super 35 sensor.
A Cooke S4 lens used with a Super 35 sensor.
A Cooke S5 lens used with a Super 35 sensor.
A Canon 11-24 mm zoom lens used with 35 mm full frame or Super 35 sensor.
A Canon 15.5-47 mm zoom lens used with a Super 35 sensor.
A Nikon 14-24 mm zoom lens used with 35 mm full frame or Super 35 sensor.
A Zeiss 15 mm Distagon lens used with a 35 mm full frame sensor.
A Zeiss compact prime 15 mm lens used with a 35 mm full frame sensor.
A Zeiss 21 mm Distagon lens used with a 35 mm full frame sensor.
A Zeiss Touit lens used with a Super 35 sensor or an APS-C sensor.
A Zeiss DigiPrime 3.9 mm lens used with a ⅔ inch format sensor.
A Sony/Tokina 11-16 mm lens used with a Super 35 sensor.
A Rodenstock Apo-Sironar lens used with a Phase One medium format sensor, 70 mm image height.
A Rodenstock 32 mm HR Digaron-W lens used with Phase One medium format CCD sensor, 67.2 mm image height.

Figure 21A:
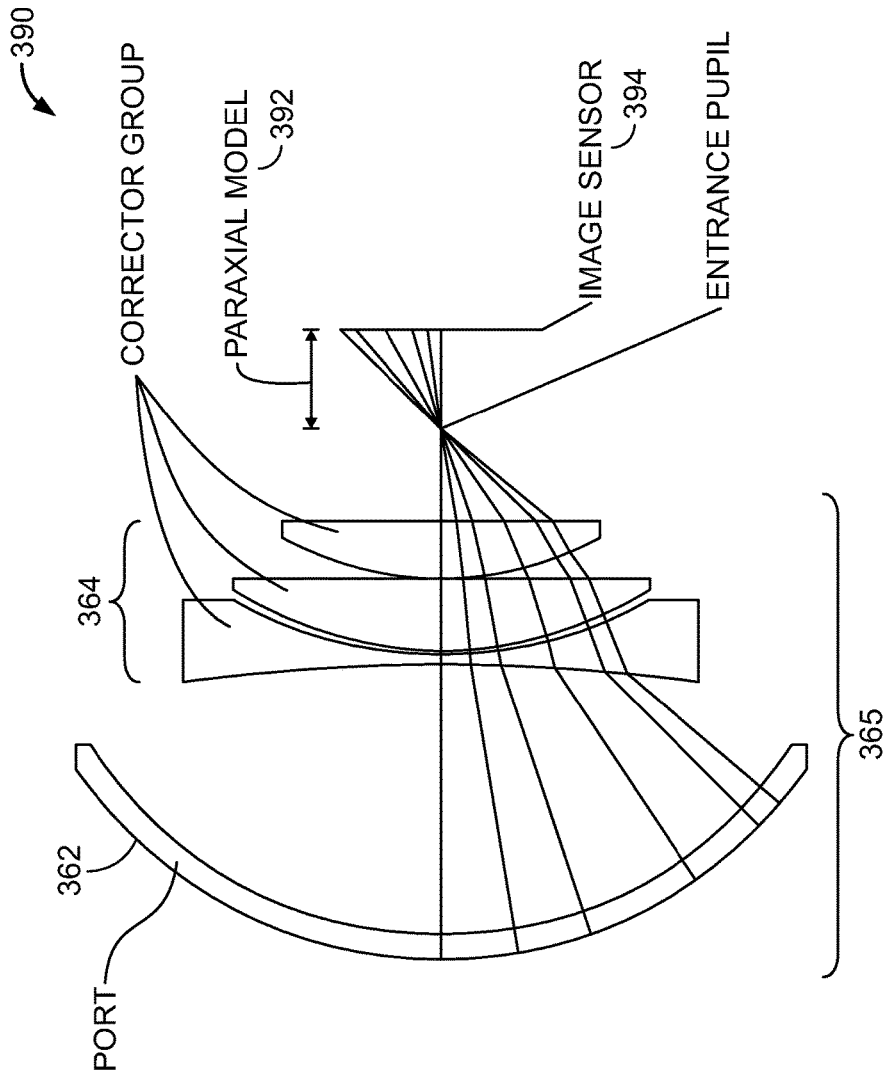
FIG. 21A is a diagram of an exemplary imaging system that includes a 10-inch dome port and a Rodenstock 28 mm Apo-Sironar lens.

Referring to FIG. 21A, in some implementations, an imaging system 390 includes the 10-inch dome port 362, the matched corrector group 364, a Rodenstock 28 mm Apo-Sironar lens 392 (represented by a paraxial model in the figure), and a medium format image sensor 394. The dome port 362 and the corrector group 364 together form a panoramic converter 365. In this example, the port gap is 94.34 mm and the setback distance is 31.6 mm. The total axial length is 220.83550 mm. The exemplary systems 360 (FIG. 18A) and 390 illustrate the universal compatibility of the dome port 362 and the matched corrector group 364, showing that they can be used with a variety of camera lenses and image sensors and still produce high quality images.

Figure 21D:
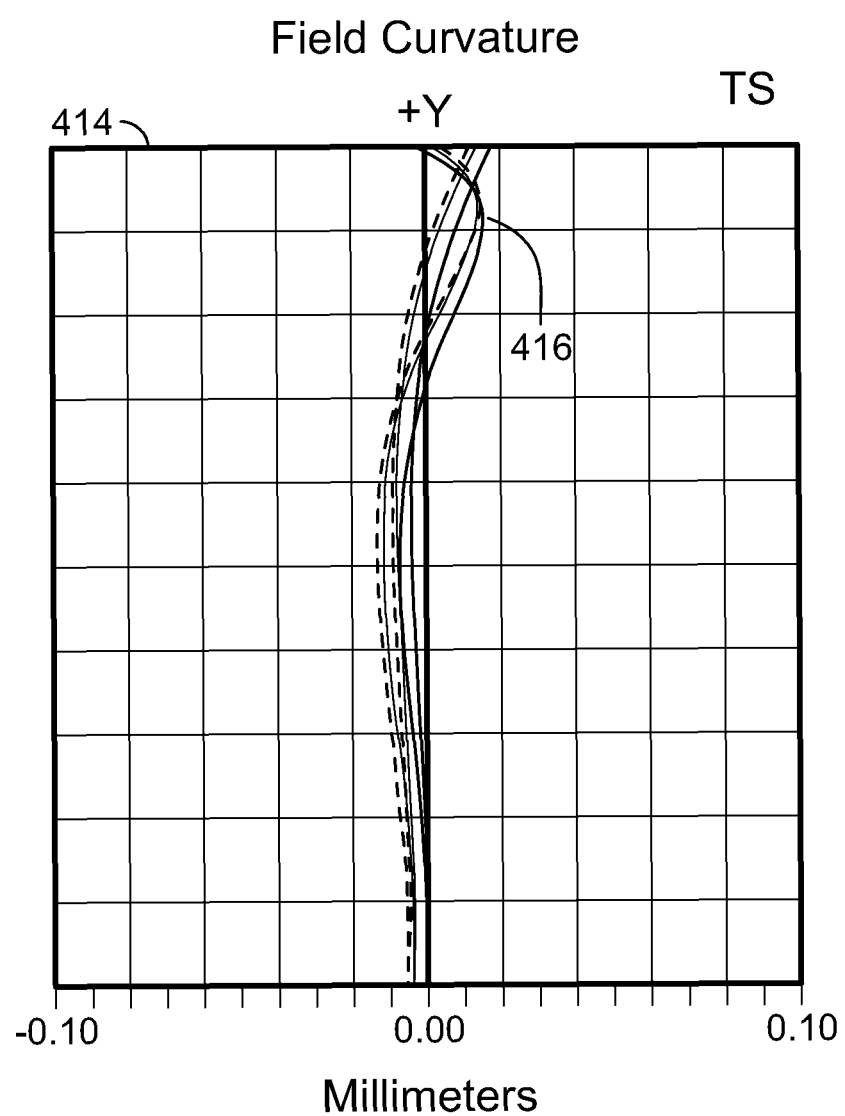
FIG. 21D is a plot of the residual field curvature at the image plane when the dome port and the corrector group of FIG. 20 are combined and the lens is set at best focus.

Referring to FIG. 21B, a graph 400 includes a curve 402 representing the field curvature of the dome port 362 for light rays of three different wavelengths, red, green and blue. Referring to FIG. 21C, a graph 410 includes curves 412 representing the compensating field curvatures of the matched corrector group 364 for light rays of three different wavelengths. The same wavelengths used for calculating data in the graph 400 were used for the graph 410. The image sag, (green light), produced by the dome port at the maximum image height of 35.0 mm (relative to the center of the image sensor) is +0.91 mm, and the compensating image sag (green light) produced by the corrector group 364 at the maximum image height of 35.0 mm (relative to the center of the image sensor) is −0.90 mm. The curves 412 are substantially mirror images of the curve 402. A comparison of the curves 402 and 412 shows that when used with the Rodenstock 28 mm Apo-Sironar lens 392 and the medium format image sensor 394, the corrector group 364 can substantially compensate the field curvature generated by the dome port 362. FIG. 21D is a plot 414 of residual field curvature 416 for the imaging system 290 of FIG. 21A. The maximum residual field curvature at best focus image plane (three colors) is 0.016 mm.

The amount of field curvature generated by the dome port 362 and the amount of field curvature compensation generated by the matched corrector group 364 vary and depend upon the camera lens field of view, camera lens focal length, and the maximum image height at the image sensor.

The overall aberration correction and imaging performance can be quantified by an ensquared energy analysis. The ensquared energy value is the percentage of light rays emanating from a theoretical point source that is collected by a sensor pixel. Values of the ensquared energy account for various aberrations of the imaging system, including the residual aberrations of the corrector group whose primary function is the correction of the dome port field curvature.

Figure 22:
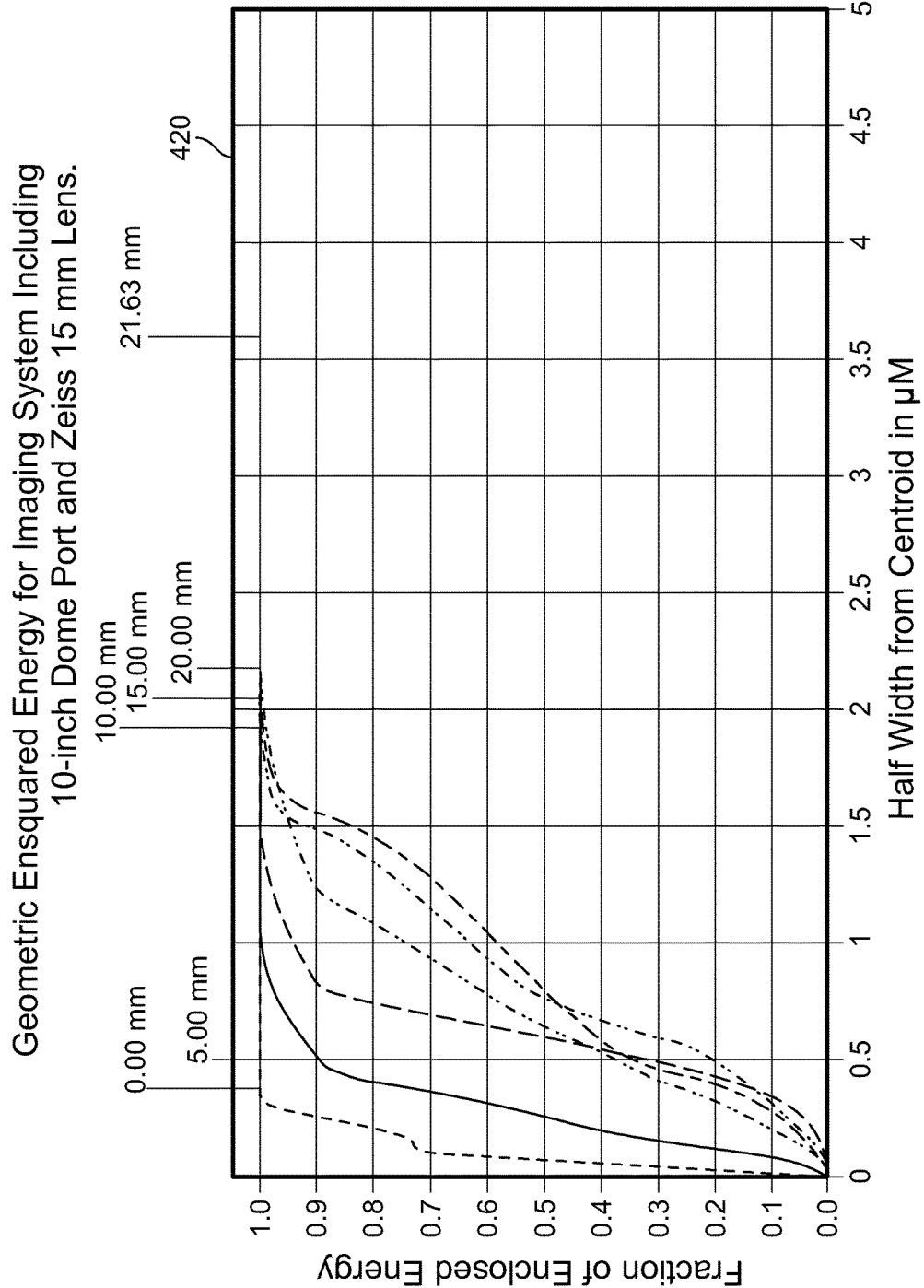
FIGS. 22 and 23 are graphs showing exemplary ensquared energy analyses for the imaging systems of FIGS. 18 and 20, respectively.
Figure 23:
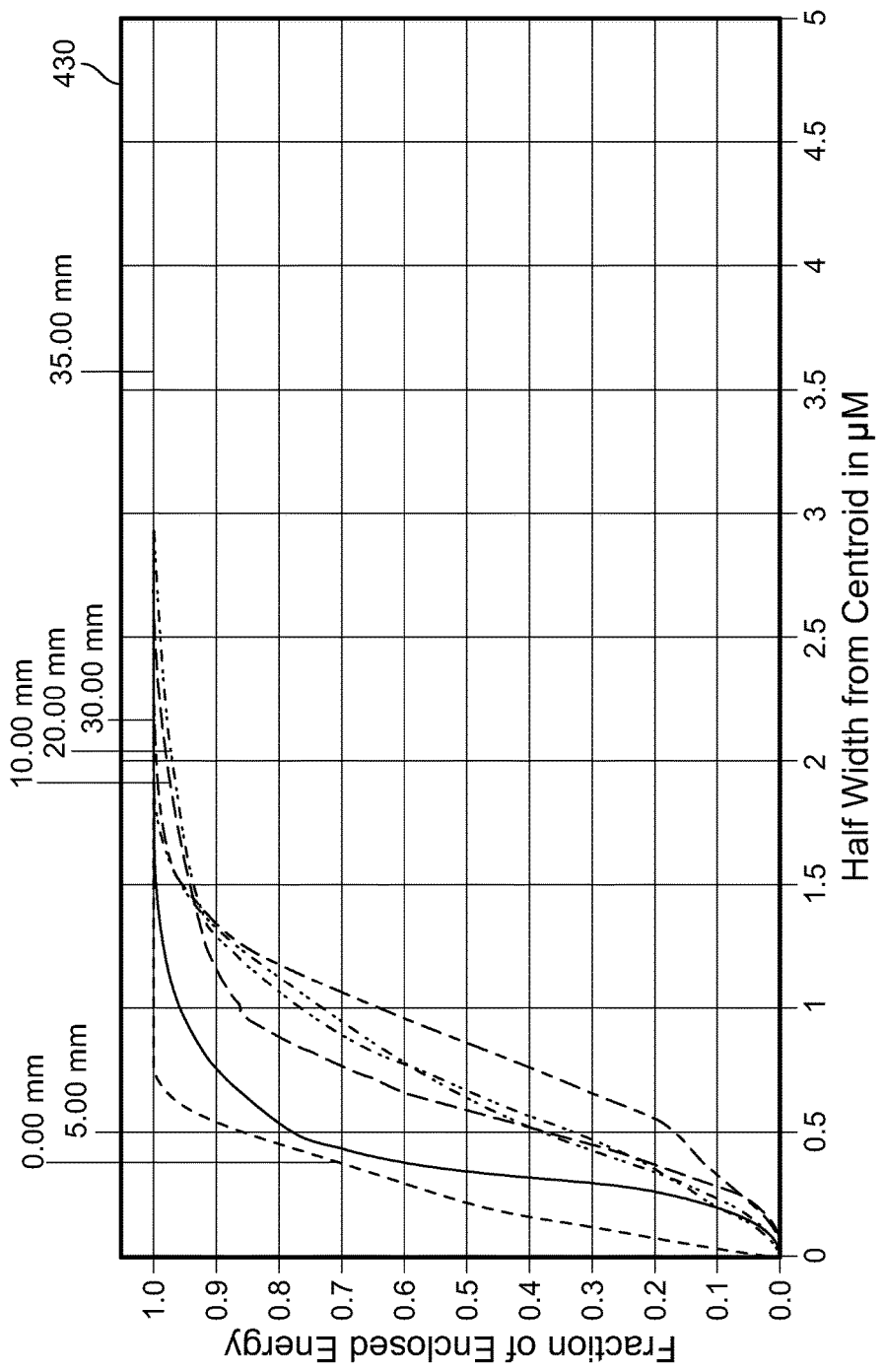
Figure 24:
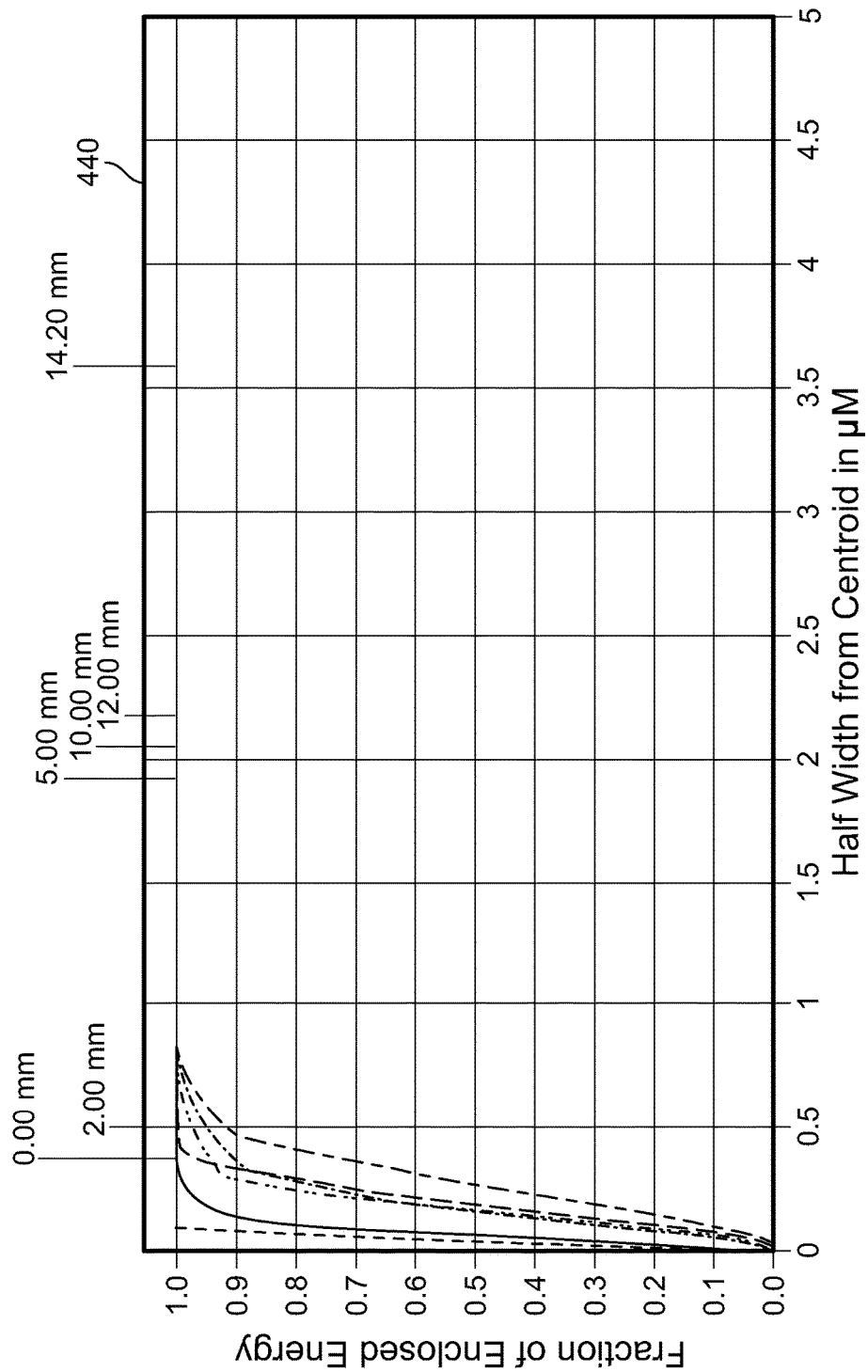
FIG. 24 is a graph showing an exemplary ensquared energy analysis for an imaging system that includes a 10-inch dome port and a Zeiss 12 mm Touit lens.
Figure 25:
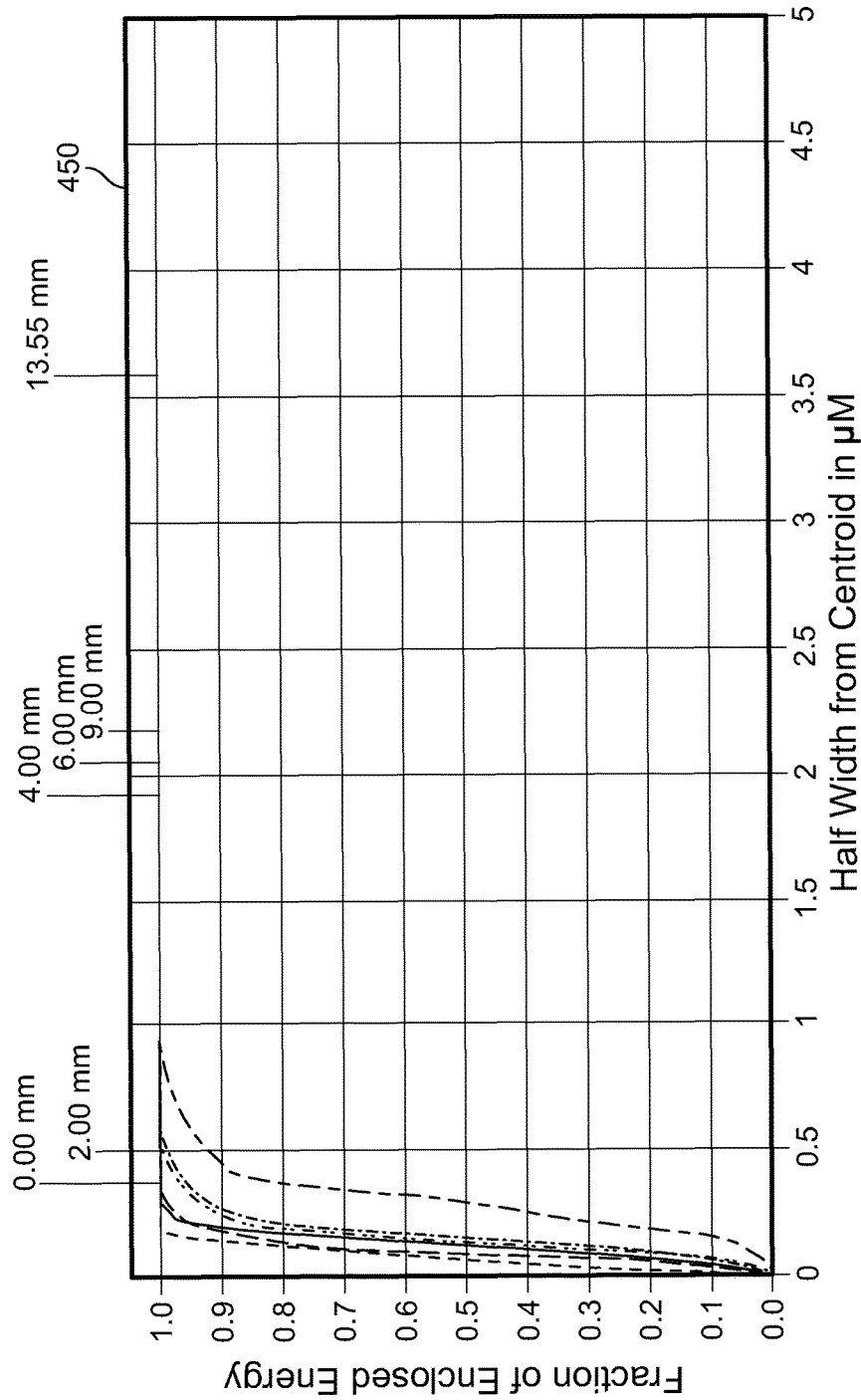
FIG. 25 is a graph showing an exemplary ensquared energy analysis for an imaging system that includes a 10-inch dome port and a Sony 11×15 lens.

FIGS. 22 to 25 show results of ensquared energy analyses for imaging systems each having a 10-inch dome port and one of a variety of camera lenses. The imaging performance is diffraction limited. Referring to FIG. 22, a graph 420 shows the ensquared energy analysis for the imaging system that includes a 10-inch dome port and a Zeiss 15 mm Distagon lens. Referring to FIG. 23, a graph 430 shows the ensquared energy analysis for the imaging system that includes a 10-inch dome port and a Rodenstock 28 mm Apo-Sironar lens. Referring to FIG. 24, a graph 440 shows the ensquared energy analysis for the imaging system that includes a 10-inch dome port and a Zeiss 12 mm Touit lens. Referring to FIG. 25, a graph 450 shows the ensquared energy analysis for the imaging system that includes a 10-inch dome port and a Sony 11×15 lens.

There are two requirements for maintaining the compatibility of the panoramic converter with a variety of camera lens and image sensor combinations. The entrance pupil of the camera lens should be located at the setback distance. The maximum field of view of the camera lens should not exceed the maximum field of view of the panoramic converter.

The following describes an exemplary imaging system that uses a 9-inch diameter dome port. A smaller dome port diameter may require optical surfaces with tighter radii to maintain a large system field of view. In turn, the tighter dome port radii produce more field curvature aberration.

Figure 26:
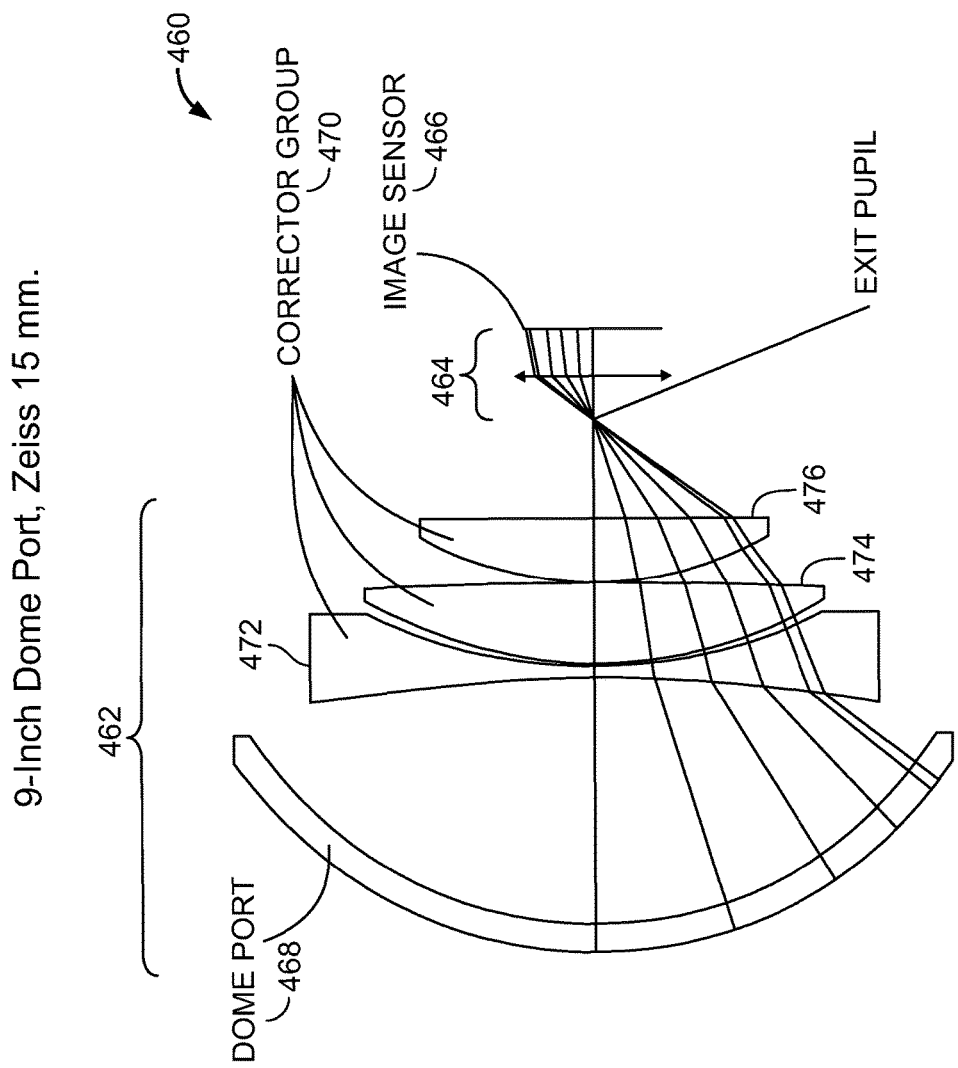
FIG. 26 is a diagram of an exemplary imaging system that includes a panoramic converter having a 9-inch dome port and a Zeiss 15 mm Distagon lens.

Referring to FIG. 26, an imaging system 460 includes a panoramic converter 462, a camera lens 464 (represented by a paraxial model in the figure), and a full frame image sensor 466. The panoramic converter 462 includes a 9-inch dome port lens 468 and a corrector group of lenses 470. The dome port lens 468 has a convex surface with a 137.7 mm radius and a concave surface with a 128.7 mm radius. The corrector group of lenses 470 includes a first lens 472, a second lens 474, and a third lens 476. In this example, the first lens 472 is a bi-concave lens, the second lens 474 is a bi-convex lens, and the third lens 476 is also a bi-convex lens. The camera lens 464 is a Zeiss 15 mm Distagon lens having a 109-degree field of view. The port gap is 78.15 mm, the setback distance is 30.84 mm, and the total axial length is 196.21016 mm.

Table 2 below shows various parameters of the first lens 472, the second lens 474, and the third lens 476. In Table 2, the $1^{st}$, $2^{nd}$, $3^{rd}$, $4^{th}$, $5^{th}$, and $6^{th}$ surfaces refer to the first and second surfaces of the first lens 472, the first and second surfaces of the second lens 474, and the first and second surfaces of the third lens 476, respectively.

TABLE 2

| Surface | Radius | Thickness | Diameter | Glass |
|---|---|---|---|---|
| 1 | −535.6356 | 3.5 | 180 | H-ZLAF55C (dense lanthanum flint) |
| 2 | 163.5609 | 1.00 | | |
| 3 | 142.117 | 25.7 | 146 | H-QF56 (short flint) |
| 4 | −1709.77 | 0.4 | | |
| 5 | 114.68 | 20.9 | 111 | F_SILICA (fused silica) |
| 6 | −2422 | | | |

Figure 27C:
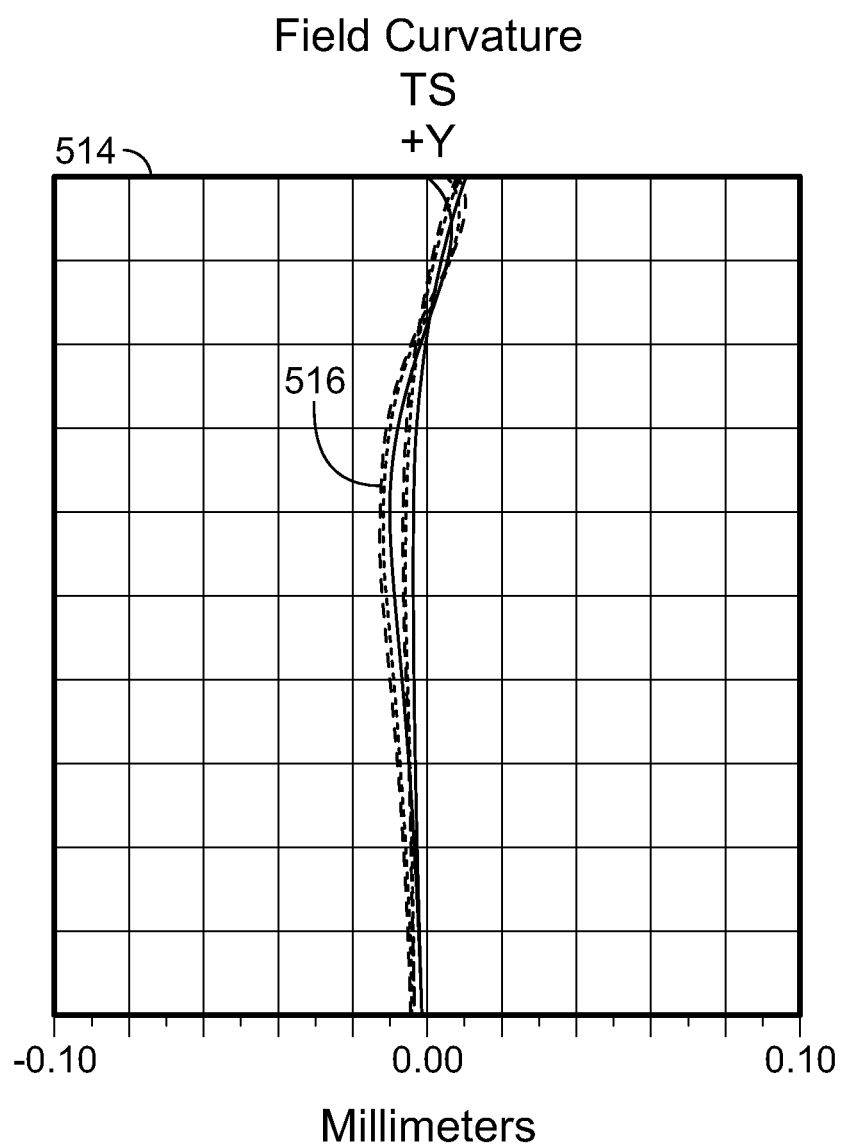
FIG. 27C is a plot of the residual field curvature at the image plane when the dome port and the corrector group of FIG. 26 are combined and the lens is set at best focus.

Referring to FIG. 27A, a graph 500 includes a curve 502 representing the field curvature of the dome port 468 of FIG. 26 on the full frame image sensor 466. Referring to FIG. 27B, a graph 510 includes curves 512 representing the compensating field curvature of the matched corrector group 470 for light rays of three different visible wavelengths. The same wavelengths used for calculating data in the graph 510 were used for the graph 500. The image sag, (green light), produced by the dome port 468 at the maximum image height of 21.63 mm (relative to the center of the image sensor) is +0.348 mm, and the compensating image sag, (green light), produced by the corrector group 470 at the maximum image height of 21.63 mm (relative to the center of the image sensor) is −0.341 mm. The curves 512 are substantially mirror images of the curve 502. A comparison of the curves 502 and 512 shows that when used with the Zeiss 15 mm Distagon lens 464 and the full frame image sensor 466, the corrector group 470 can substantially compensate the field curvature generated by the dome port 468. FIG. 27C is a plot 514 of residual field curvature 516 for the panoramic converter 462 of FIG. 26. The maximum residual field curvature at best focus image plane, (three colors), is 0.013 mm.

Figure 28:
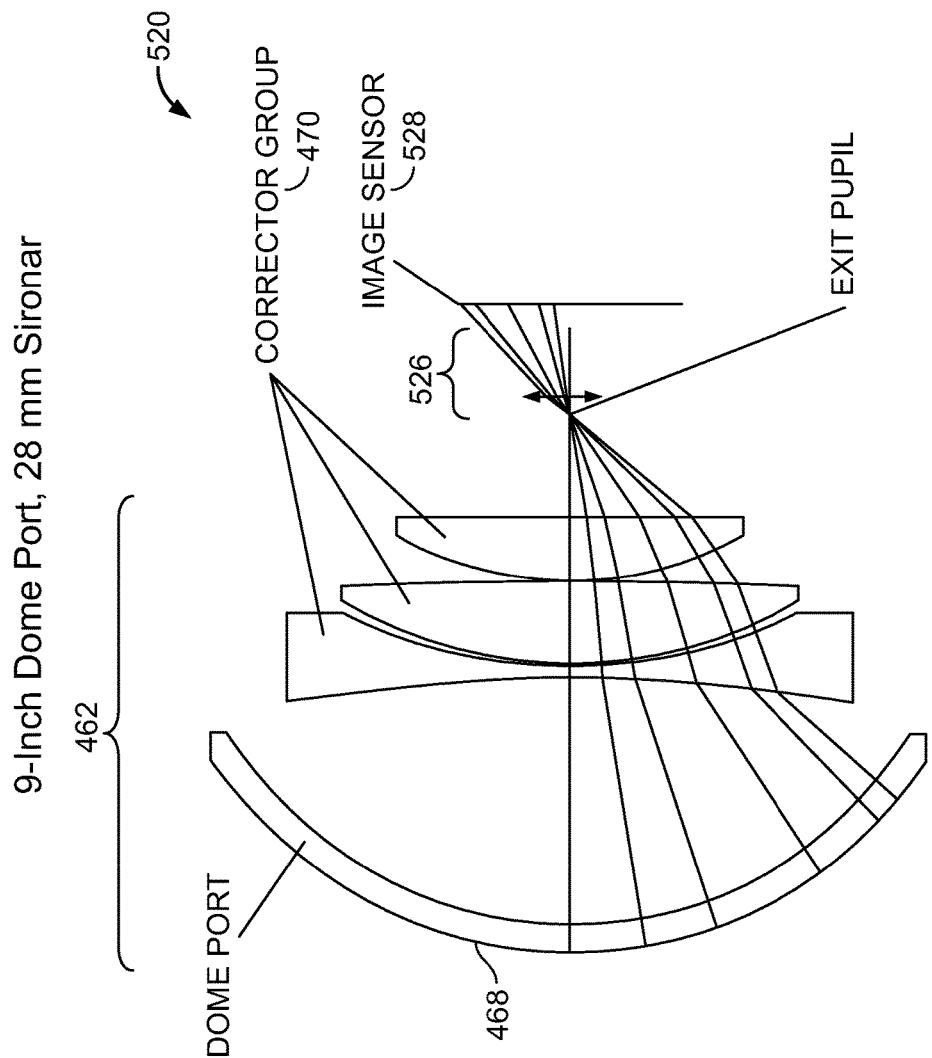
FIG. 28 is a diagram of an exemplary imaging system that includes a panoramic converter having a 9-inch dome port and a Rodenstock 28 mm Apo-Sironar lens.

Referring to FIG. 28, an imaging system 520 includes a panoramic converter 462, a camera lens 526 (represented by a paraxial model in the figure), and a medium format image sensor 528. The panoramic converter 462 in the example of FIG. 28 is the same as that in the example of FIG. 26, which includes a 9-inch dome port 468. In this example, the camera lens 464 is a Rodenstock 28 mm Apo-Sironar lens having a 100-degree field of view. The port gap is 78.15 mm, the setback distance is 32.20 mm, and the total axial length is 205.6 mm.

Figure 29C:
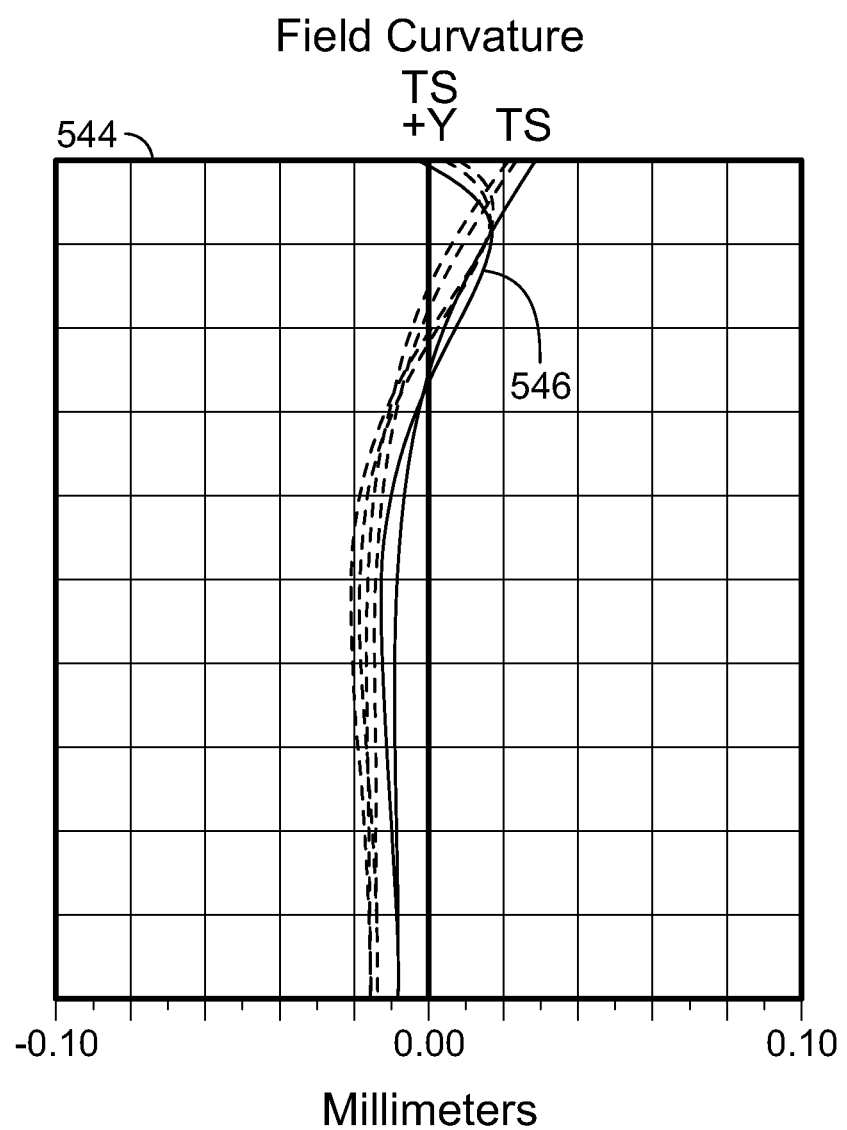
FIG. 29C is a plot of the residual field curvature at the image plane when the dome port and the corrector group of FIG. 28 are combined and the lens is set at best focus.

Referring to FIG. 29A, a graph 530 includes a curve 532 representing the field curvature of the dome port 468 of FIG. 28 on the medium format sensor 528. Referring to FIG. 29B, a graph 540 includes a curve 542 representing the compensating field curvature of the matched corrector group 470. The image sag (green light) produced by the dome port 468 at the maximum image height of 35.0 mm (relative to the center of the image sensor) is +1.00 mm, and the compensating image sag (green light) produced by the corrector group 470 at the maximum image height of 35.0 mm (relative to the center of the image sensor) is −0.92 mm. The curve 542 is a substantially mirror image of the curve 532. A comparison of the curves 532 and 542 shows that when used with the Rodenstock 28 mm Apo-Sironar lens 528 and the medium format image sensor 528, the corrector group 470 can substantially compensate the field curvature generated by the dome port 468. FIG. 29C is a plot 544 of residual field curvature 546 for the imaging system 520 of FIG. 28. The maximum residual field curvature at best focus image plane (three colors) is 0.021 mm.

Figure 30:
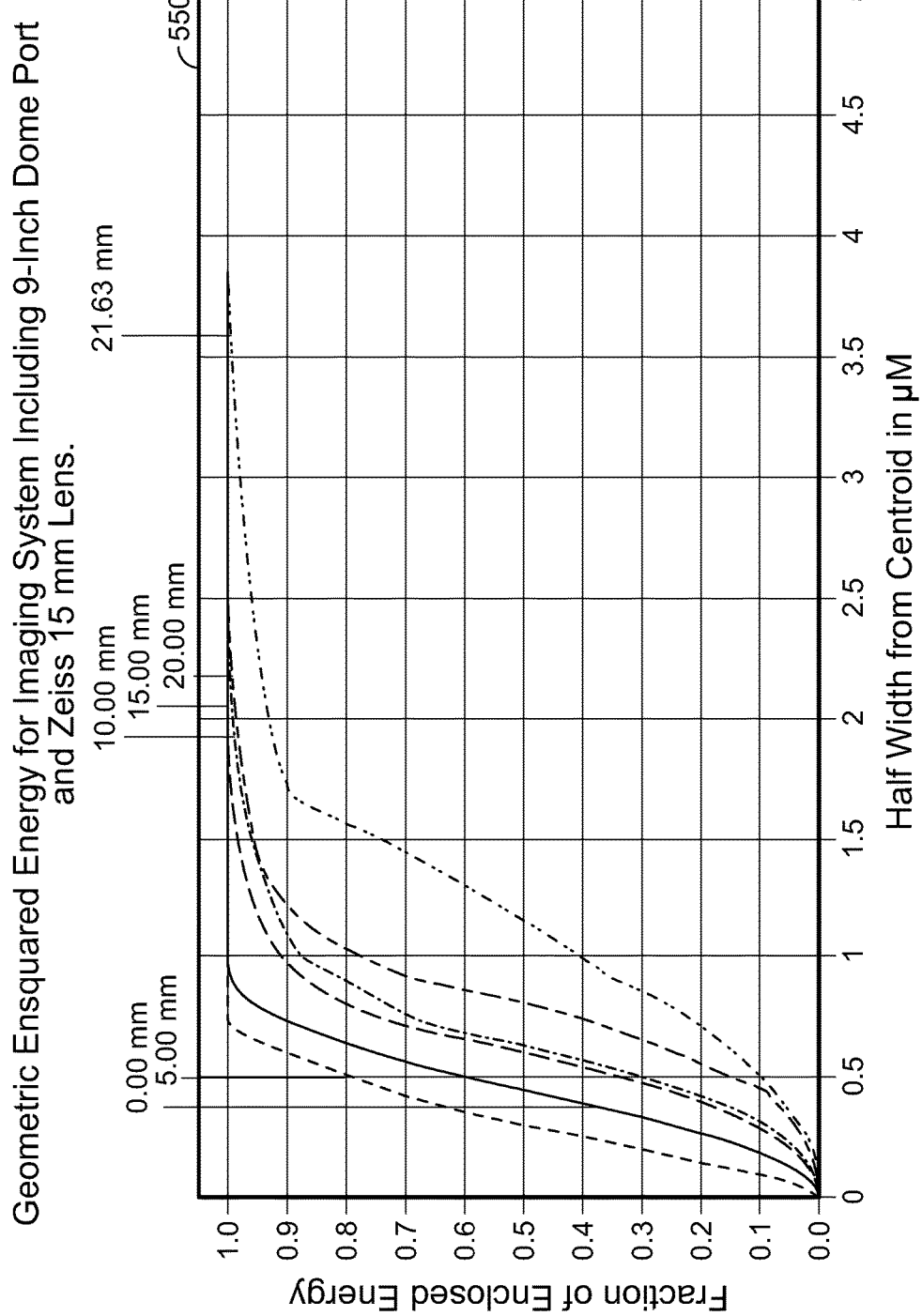
FIG. 30 is a graph showing an exemplary ensquared energy analysis for the imaging system of FIG. 26 that includes a 9-inch dome port and a Zeiss 15 mm lens.
Figure 31:
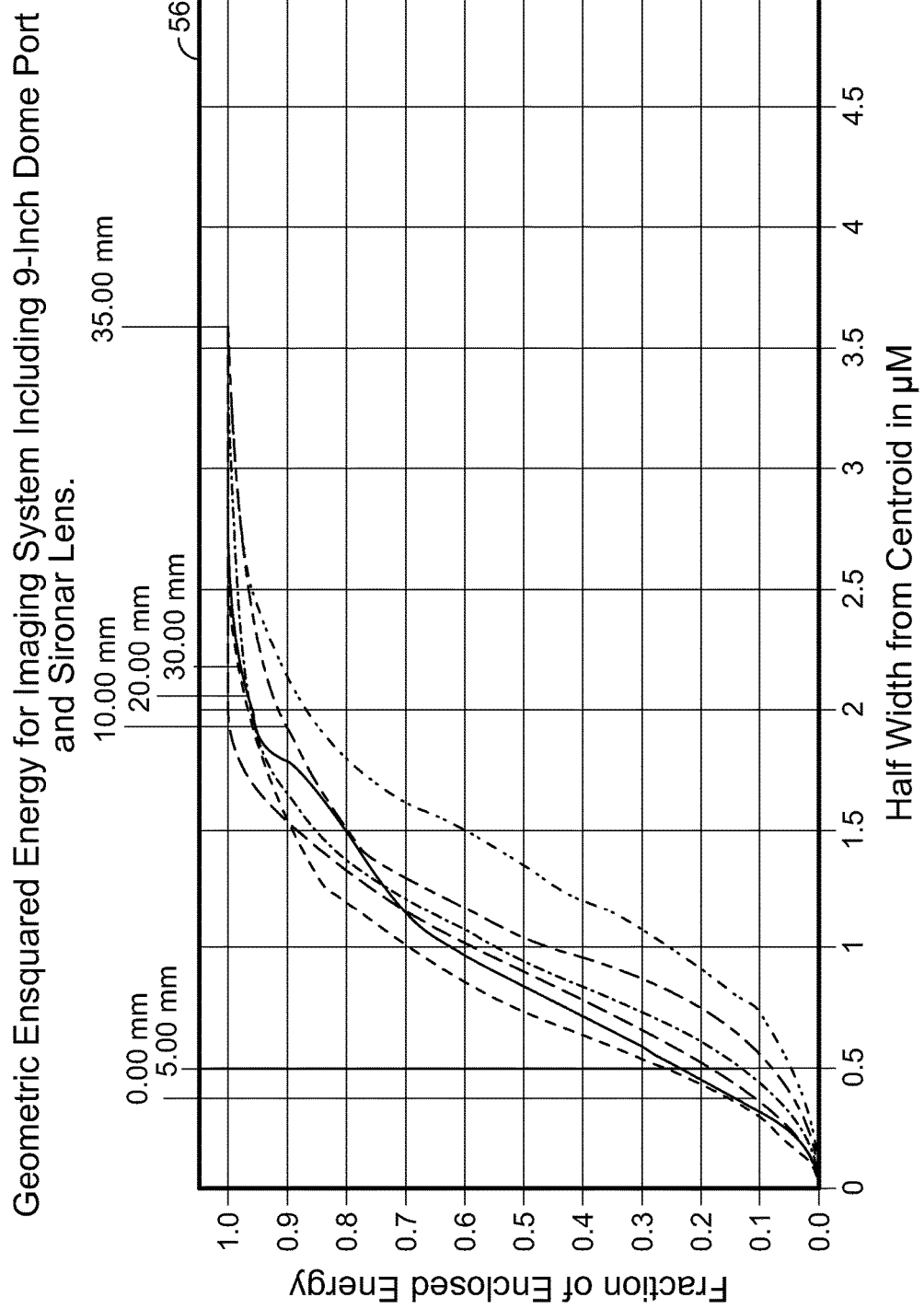
FIG. 31 is a graph showing an exemplary ensquared energy analysis for the imaging system of FIG. 28 that includes a 9-inch dome port and a Rodenstock 28 mm Apo-Sironar lens.

Referring to FIG. 30, a graph 550 shows an ensquared energy analysis for the imaging system 460 of FIG. 26 that includes a 9-inch dome port and a Zeiss 15 mm lens. Referring to FIG. 31, a graph 560 shows an ensquared energy analysis for the imaging system 520 of FIG. 28 that includes a 9-inch dome port and a Rodenstock 28 mm Apo-Sironar lens. FIGS. 30 and 31 show that the imaging systems 460 and 520 can produce high quality underwater images.

A larger field curvature compensation is provided by the corrector group 470 to correct the field curvature produced by the 9-inch dome port 468, which results in small amounts of uncorrected residual aberrations that affect the ensquared energy. When the ensquared energy data for the imaging systems 460 and 520 having a 9-inch dome port are compared to the ensquared energy data for the imaging systems 360 and 390 having a 10-inch dome port, there is a small decrease in the imaging performance. However, the image resolution is still at the diffraction limited level.

Figure 32:
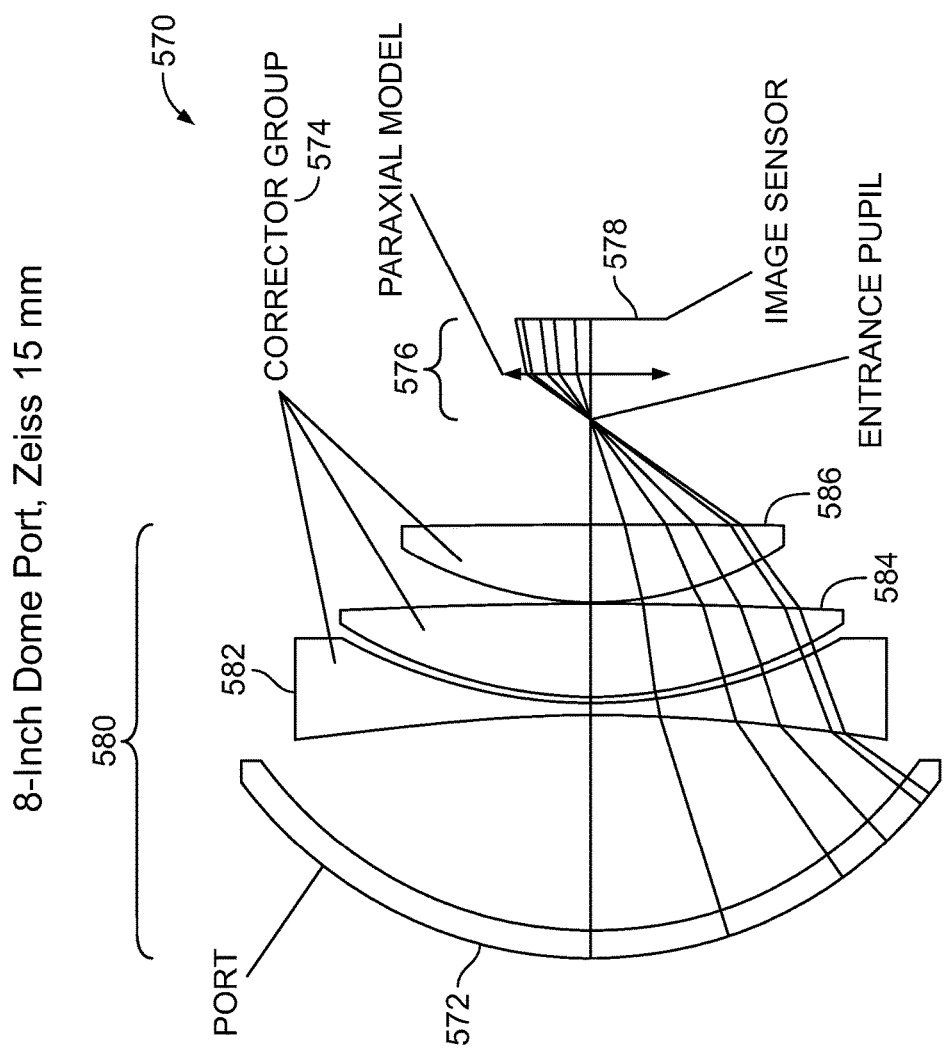
FIG. 32 is a diagram of an exemplary imaging system that includes a panoramic converter having an 8-inch dome port and a Zeiss 15 mm Distagon lens.

Referring to FIG. 32, an imaging system 570 includes a panoramic converter 580, a camera lens 576 (represented by a paraxial model in the figure), and a full frame image sensor 578. The panoramic converter 580 includes an 8-inch dome port lens 572 and a corrector group of lenses 574. The dome port lens 572 has a convex surface with a 126.0 mm radius and a concave surface with a 118.0 mm radius. The corrector group of lenses 574 includes a first lens 582, a second lens 584, and a third lens 586. In this example, the first lens 582 is a bi-concave lens, the second lens 584 is a bi-convex lens, and the third lens 586 is also a bi-convex lens. The camera lens 576 is a Zeiss 15 mm Distagon lens having a 109-degree field of view. The port gap is 62.32 mm, the setback distance is 30.50 mm, and the total axial length is 184.7 mm.

Table 3 below shows various parameters of the first lens 582, the second lens 584, and the third lens 586. In Table 3, the $1^{st}$, $2^{nd}$, $3^{rd}$, $4^{th}$, $5^{th}$, and $6^{th}$ surfaces refer to the first and second surfaces of the first lens 582, the first and second surfaces of the second lens 584, and the first and second surfaces of the third lens 586, respectively.

TABLE 3

| Surface | Radius | Thickness | Diameter | Glass |
|---|---|---|---|---|
| 1 | −520.6 | 3.5 | 172 | H-ZLAF55C (dense lanthanum flint) |
| 2 | 150.7 | 1.96 | | |
| 3 | 137.9 | 26.65 | 146 | H-QF56 (short flint) |
| 4 | −1522.2 | 0.4 | | |
| 5 | 103.35 | 22.7 | 111 | F_SILICA (fused silica) |
| 6 | −2654 | | | |

Figure 33C:
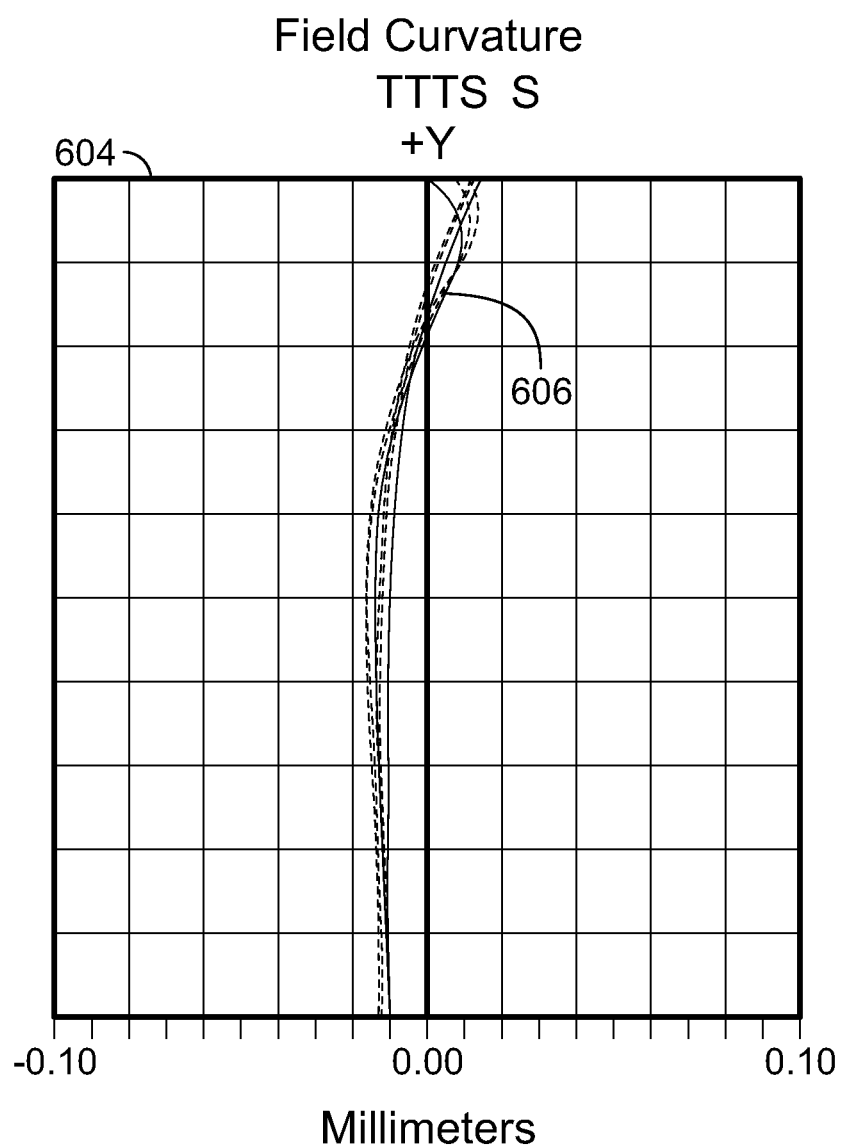
FIG. 33C is a plot of the residual field curvature at the image plane when the dome port and the corrector group of FIG. 32 are combined and the lens is set at best focus.

Referring to FIG. 33A, a graph 590 includes a curve 592 representing the field curvature of the dome port 572 in FIG. 32 on the full frame image sensor 578. Referring to FIG. 33B, a graph 600 includes a curve 602 representing the compensating field curvature of the matched corrector group 574. The image sag (green light) produced by the dome port 572 at the maximum image height of 21.633 mm (relative to the center of the image sensor) is +0.38 mm, and the compensating image sag (green light) produced by the corrector group 574 at the maximum image height of 21.633 mm (relative to the center of the image sensor) is −0.38 mm. The curve 602 is a substantially mirror image of the curve 592. A comparison of curves 592 and 602 shows that when used with the Zeiss 15 mm Distagon lens 576 and the full frame image sensor 578, the corrector group 574 can substantially compensate the field curvature generated by the dome port 572. FIG. 33C is a plot 604 of residual field curvature 606 for the imaging system 570 of FIG. 32. The maximum residual field curvature at best focus image plane (three colors) is 0.016 mm.

Figure 34C:
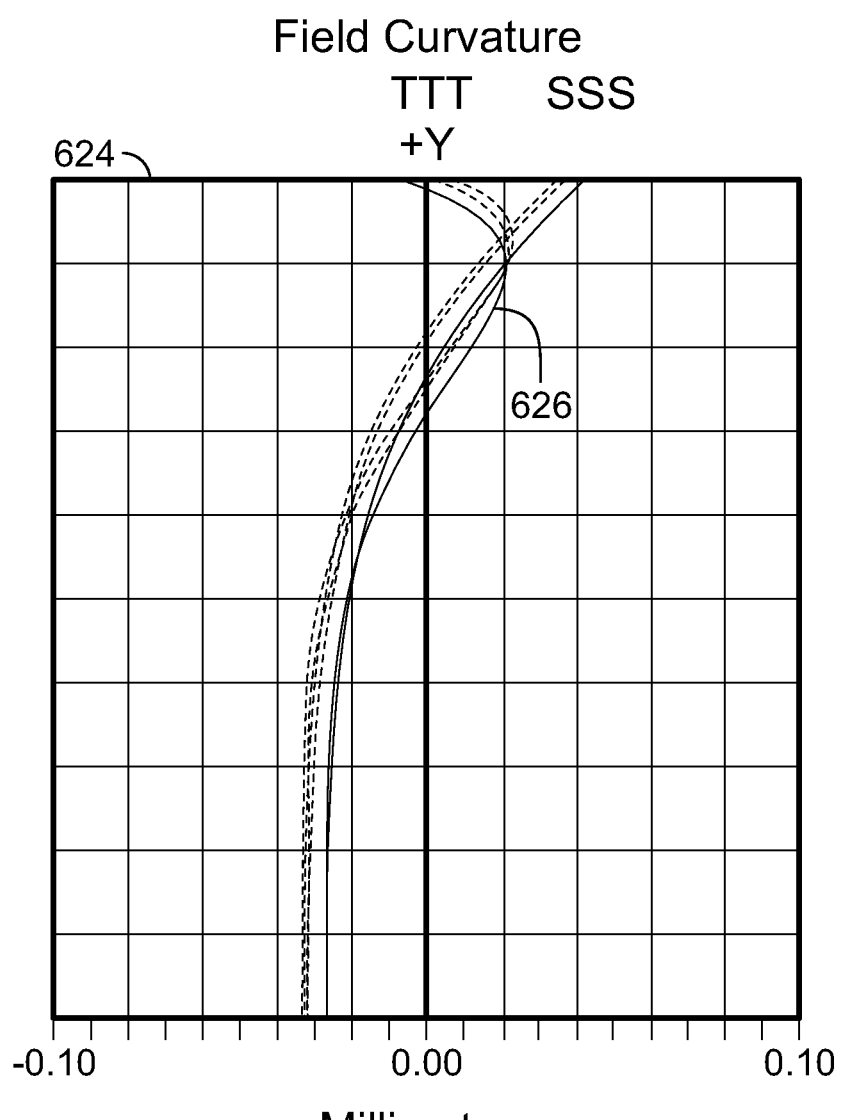
FIG. 34C is a plot of the residual field curvature at the image plane when the dome port and the corrector group of FIG. 32 are combined and is used with the Rodenstock 28 mm Apo-Sironar lens set at best focus.

The panoramic converter 580 of FIG. 32 can be used with a Rodenstock 28 mm Apo-Sironar lens and a medium format sensor. Referring to FIG. 34A, a graph 610 includes a curve 612 representing the field curvature of the dome port 572 of FIG. 32 on the medium format image sensor 578 when a Rodenstock 28 mm Apo-Sironar lens is used. Referring to FIG. 34B, a graph 620 includes a curve 622 representing the compensating field curvature of the matched corrector group 574. The image sag (green light) produced by the dome port 572 at the maximum image height of 35.0 mm (relative to the center of the image sensor) is +1.10 mm, and the compensating image sag (green light) produced by the corrector group 574 at the maximum image height of 35.0 mm (relative to the center of the image sensor) is −1.00 mm. The curve 622 is a substantially mirror image of the curve 612. A comparison of the curves 612 and 622 shows that when used with the Rodenstock 28 mm Apo-Sironar lens and the medium format image sensor, the corrector group 574 can substantially compensate the field curvature generated by the dome port 572. FIG. 34C is a plot 624 of residual field curvature 626 for the panoramic converter 580 of FIG. 32 with the Rodenstock 28 mm Apo-Sironar lens and the medium format sensor. The maximum residual field curvature at best focus image plane (three colors) is 0.041 mm.

Figure 35:
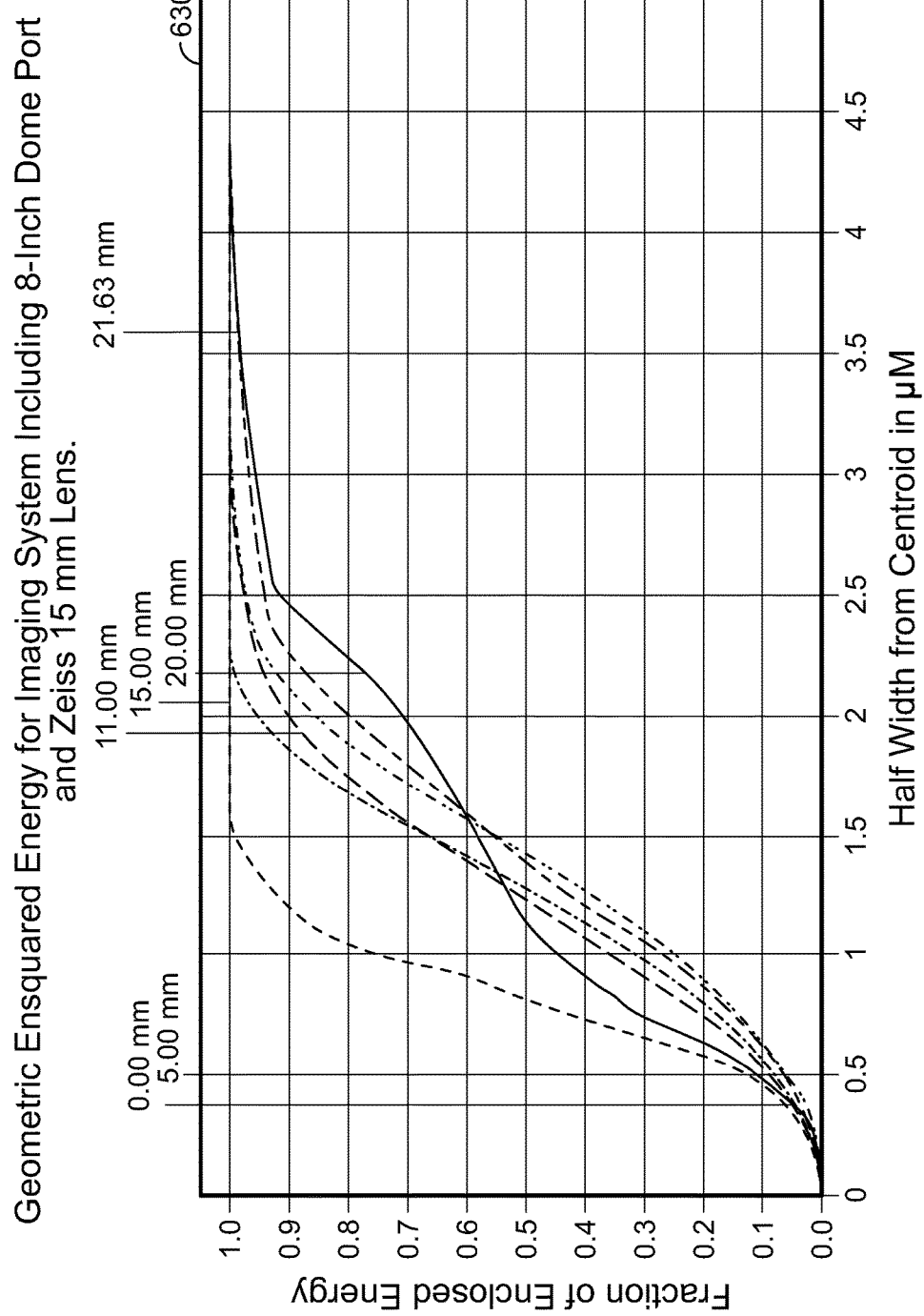
FIG. 35 is a graph showing an exemplary ensquared energy analysis for the imaging system of FIG. 32 that includes the 8-inch dome port and the Zeiss 15 mm Distagon lens.
Figure 36:
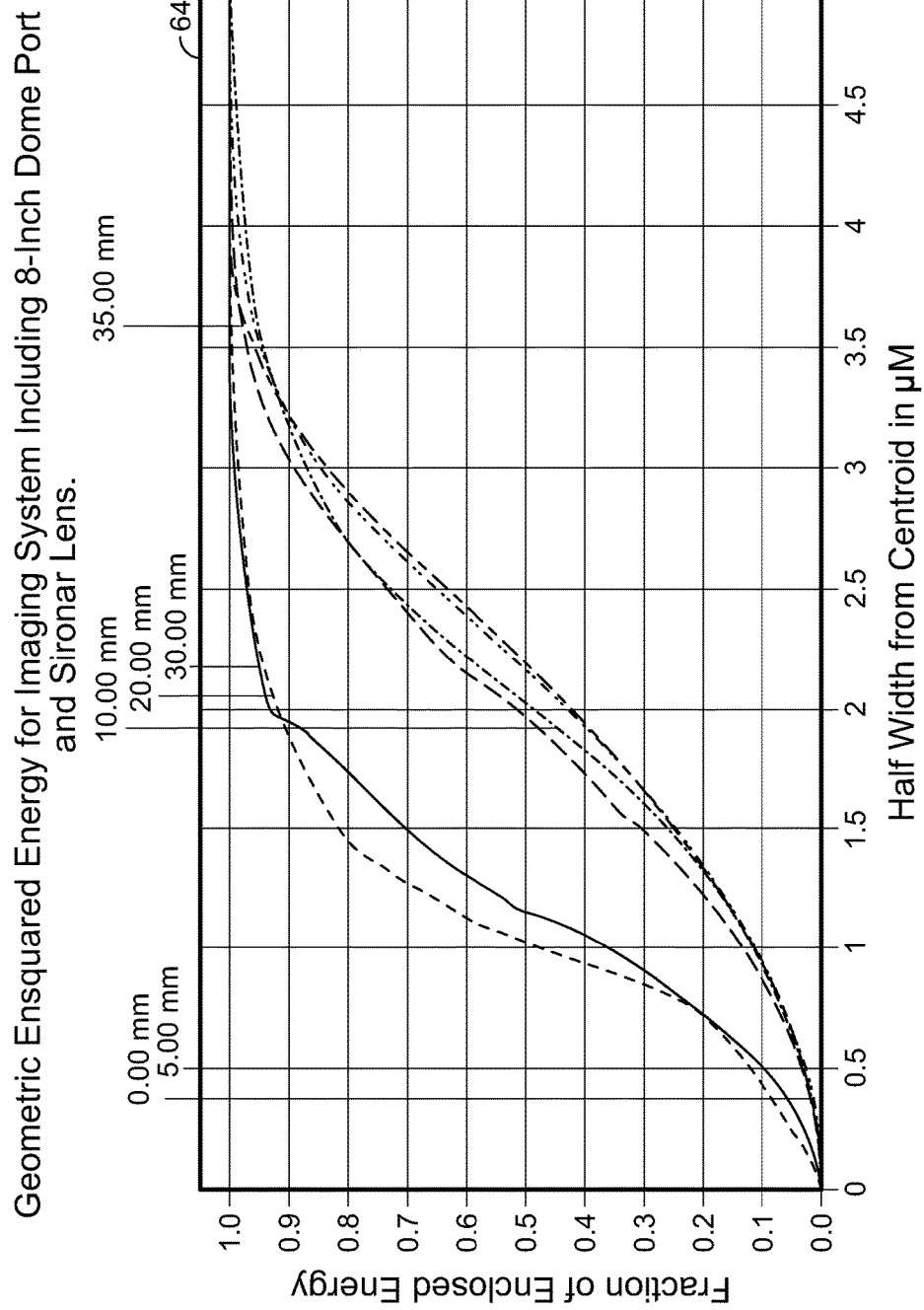
FIG. 36 is a graph showing an exemplary ensquared energy analysis for an imaging system that includes the 8-inch dome port of the imaging system of FIG. 32 and the Rodenstock 28 mm Apo-Sironar lens.

Referring to FIG. 35, a graph 630 shows an ensquared energy analysis for the imaging system 570 of FIG. 32 that includes the 8-inch dome port 572 and the Zeiss 15 mm lens. Referring to FIG. 36, a graph 640 shows an ensquared energy analysis for the imaging system that includes the 8-inch dome port 572 and the Rodenstock 28 mm Apo-Sironar lens.

A larger field curvature compensation is provided by the corrector group 574 to correct the field curvature produced by the 8-inch dome port 572, which results in small amounts of uncorrected residual aberrations that affect the ensquared energy. When the ensquared energy data shown in FIGS. 35 and 36 for the imaging systems using the 8-inch dome port are compared to the ensquared energy data shown in FIGS. 30 and 31 for the imaging systems using the 9-inch dome port, there is a small decrease in the imaging performance. However, the image resolution is still at the diffraction limited level and is good enough for most professional underwater photography and videography.

Figure 37:
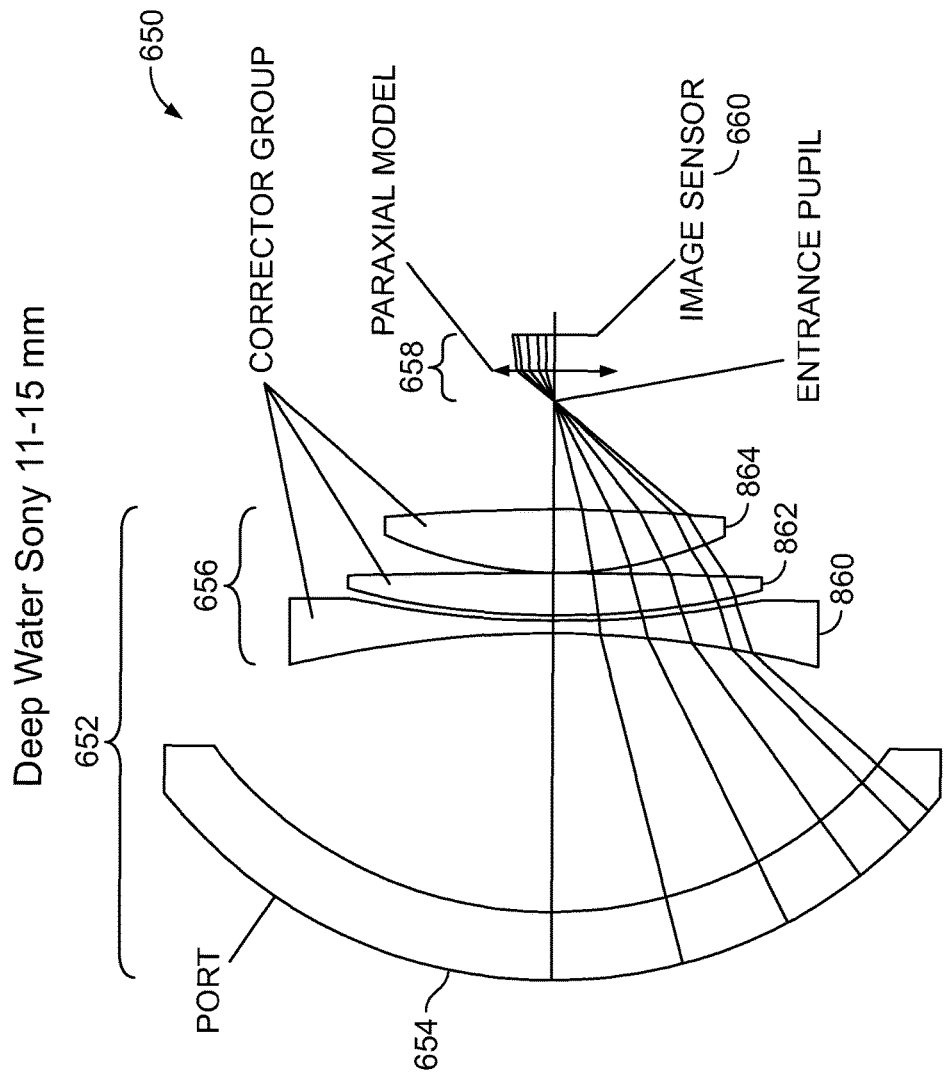
FIG. 37 is a diagram of an exemplary imaging system that includes a panoramic converter having a 10-inch dome port with 22 mm center thickness and a Sony 11-15 mm zoom lens.

The following describes an imaging system for use in deep water photography or videography. Referring to FIG. 37, in some implementations, an imaging system 650 includes a panoramic converter 652 and a Sony F-5 camcorder. The panoramic converter 652 includes a 10-inch dome port 654 and a corrector group 656. The dome port 654 has a 22 mm center thickness, a convex surface with a 162.4 mm radius and a concave surface with a 140.4 mm radius. The Sony F-5 camcorder includes a camera lens 658 (represented by a paraxial model in the figure) and a Super 35 image sensor 660. In this example, the camera lens 658 is a Sony 11-15 mm zoom lens. The imaging system 650 provides a 98-degrees field of view. The total axial length is 208.78878 mm.

The corrector group of lenses 656 includes a first lens 860, a second lens 862, and a third lens 864. In this example, the first lens 860 is a bi-concave lens, the second lens 862 is a bi-convex lens, and the third lens 864 is also a bi-convex lens. Table 4 below shows various parameters of the first lens 860, the second lens 862, and the third lens 864. In Table 4, the $1^{st}$, $2^{nd}$, $3^{rd}$, $4^{th}$, $5^{th}$, and $6^{th}$ surfaces refer to the first and second surfaces of the first lens 860, the first and second surfaces of the second lens 862, and the first and second surfaces of the third lens 864, respectively.

TABLE 4

| Surface | Radius | Thickness | Diameter | Glass |
|---|---|---|---|---|
| 1 | −351.1 | 4.9 | 172 | H-ZLAF5OD (dense |
| 2 | 319.8 | 1.6 | | lanthanum flint) |
| 3 | 268.4 | 13.8 | 134 | H-QF6A (short flint) |
| 4 | −1721.8 | 0.5 | | |
| 5 | 132.5 | 20.3 | 110 | H-QK3L (light |
| 6 | −639.9 | | | crown) |

Figure 38C:
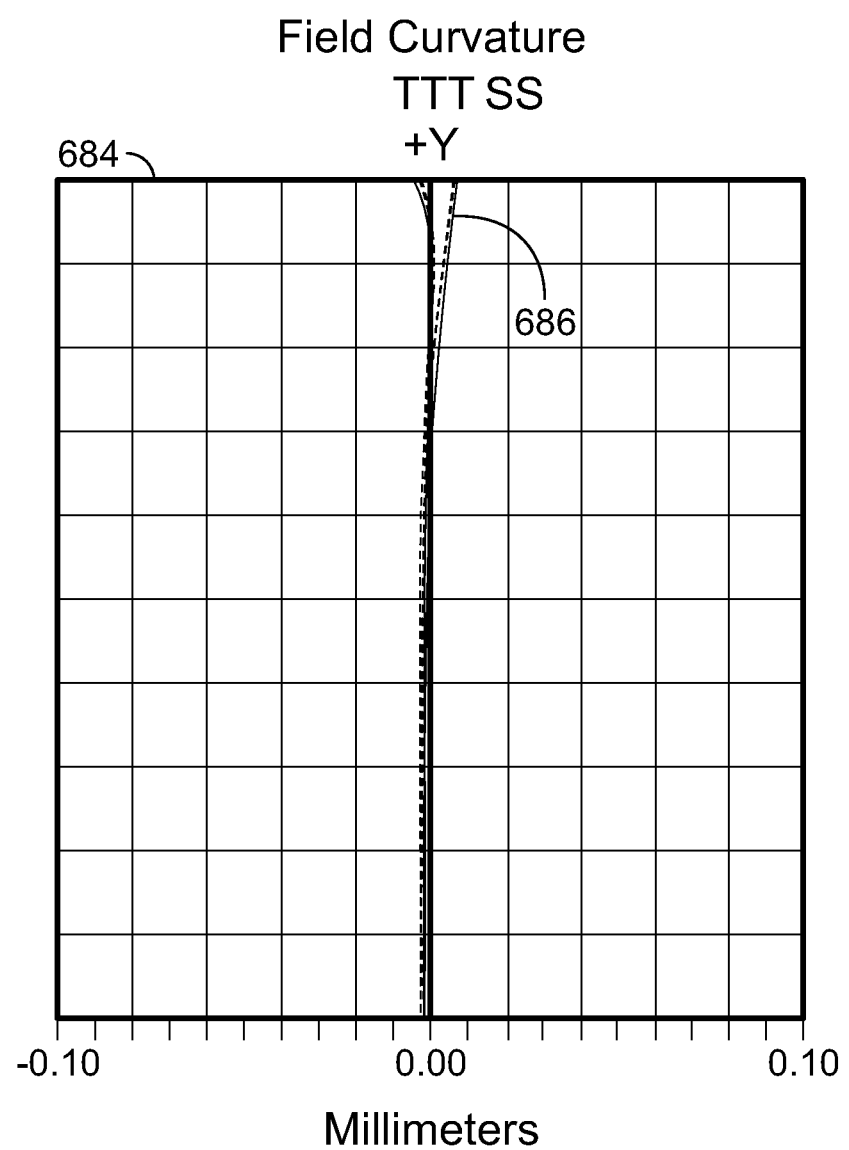
FIG. 38C is a plot of the residual field curvature at the image plane when the dome port and the corrector group of FIG. 37 are combined and used with the Sony 11-15 mm zoom lens set at best focus.

Referring to FIG. 38A, a graph 670 includes a curve 672 representing the field curvature of the dome port 654 of FIG. 37 on the Super 35 image sensor 660. Referring to FIG. 38B, a graph 680 includes a curve 682 representing the compensating field curvature of the matched corrector group 656. The data in FIGS. 38A and 38B were calculated for a Sony lens at 11 mm focal length. The image sag (green light) produced by the dome port 654 at the maximum image height of 13.55 mm (relative to the center of the image sensor) is +0.135 mm, and the compensating image sag (green light) produced by the corrector group 656 at the maximum image height of 13.55 mm (relative to the center of the image sensor) is −0.131 mm. The curve 682 is a substantially mirror image of the curve 672. A comparison of the curves 672 and 682 shows that when used with the Sony 11-15 mm lens 658 (set at 11 mm) and the Super 35 image sensor 660, the corrector group 656 can substantially compensate the field curvature generated by the dome port 654. FIG. 38C is a plot 684 of residual field curvature 686 at image plane for the imaging system 650 of FIG. 37. The maximum residual field curvature at best focus image plane (three colors) is 0.007 mm.

In some examples, the deep water imaging system 650 is configured for capturing images of objects that are at distances less than 2.5 meters from the dome port 654. The imaging system 650 can have an image resolution sufficiently high to capture images of objects having dimensions less than 1 mm.

Figure 39:
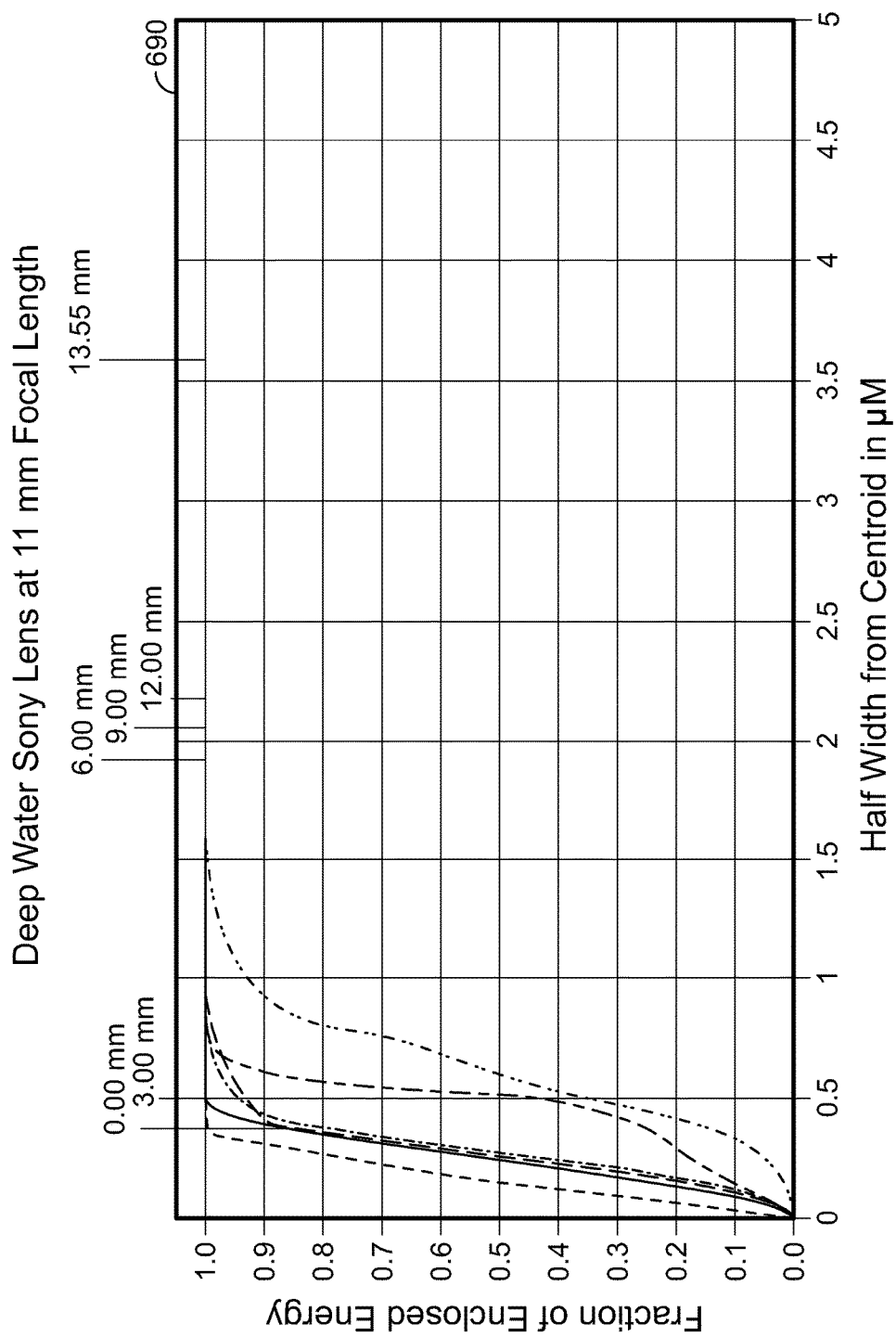
FIG. 39 is a graph showing an exemplary ensquared energy analysis for the imaging system of FIG. 37 that includes a Sony 11-15 mm zoom lens at full wide, 11 mm focal length.
Figure 40:
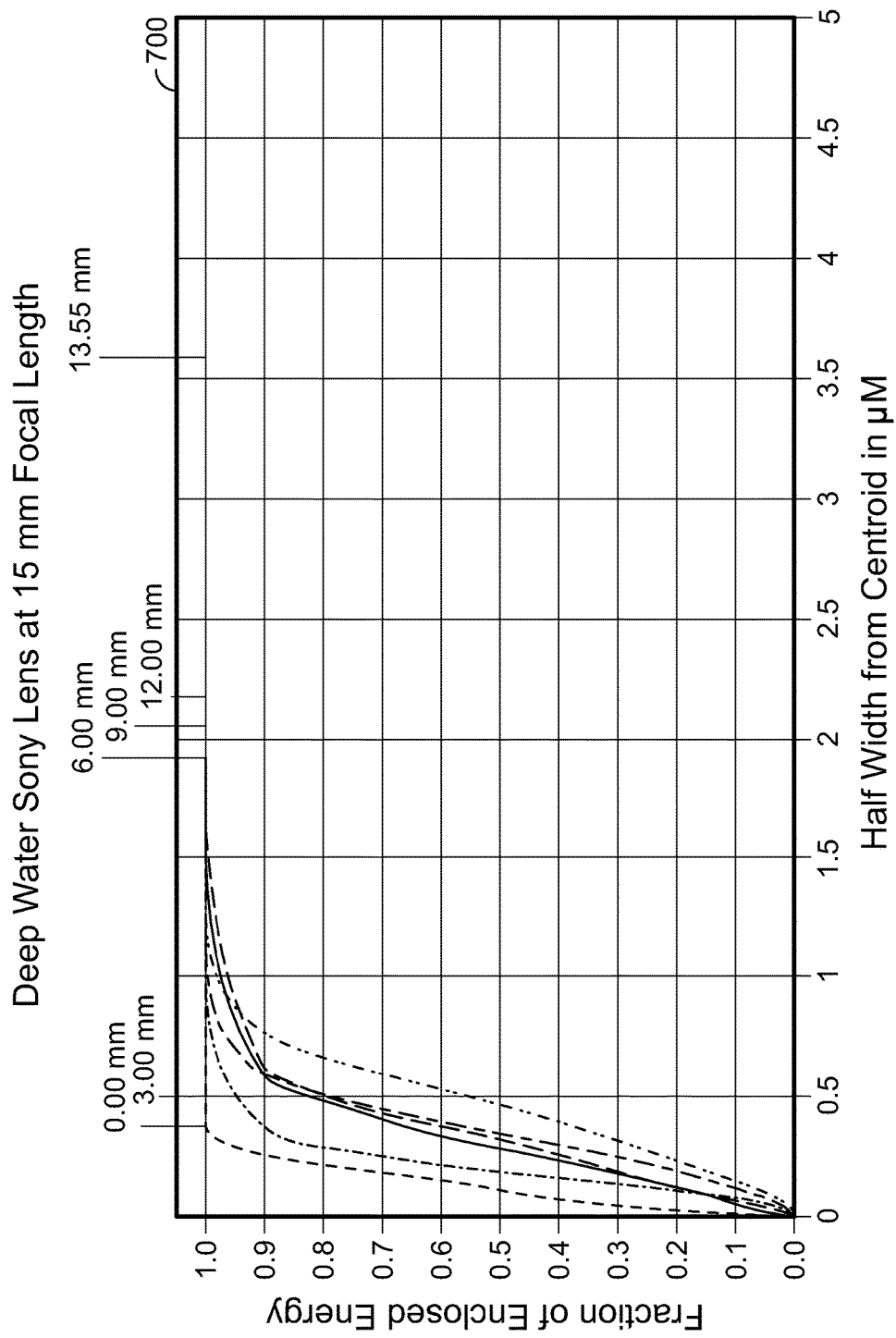
FIG. 40 is a graph showing an exemplary ensquared energy analysis for the imaging system of FIG. 37 that includes the Sony 11-15 mm zoom lens at full zoom, 15 mm focal length.

Referring to FIG. 39, a graph 690 shows an ensquared energy analysis for the imaging system 650 of FIG. 37 that includes the 10-inch dome port 654 and the Sony 11-15 mm zoom lens at full wide, 11 mm focal length. Referring to FIG. 40, a graph 700 shows an ensquared energy analysis for the imaging system 650 of FIG. 37 in which the Sony 11-15 mm zoom lens is at full zoom, 15 mm focal length. FIGS. 39 and 40 show that the imaging performance of the imaging system 650 is excellent at both 11 mm and 15 mm focal lengths, confirming that the panoramic converter 652 is compatible with zoom lenses. The setback distance for a zoom lens is set at the optimum setback distance calculated for the full wide, shortest focal length. In general, for zoom lenses, the axial entrance pupil position and entrance pupil diameter vary with zoom lens focal length. Changes in the axial position of the entrance pupil at zoom focal lengths do not degrade imaging performance of a zoom lens used with Panoramic Converter.

Figure 41:
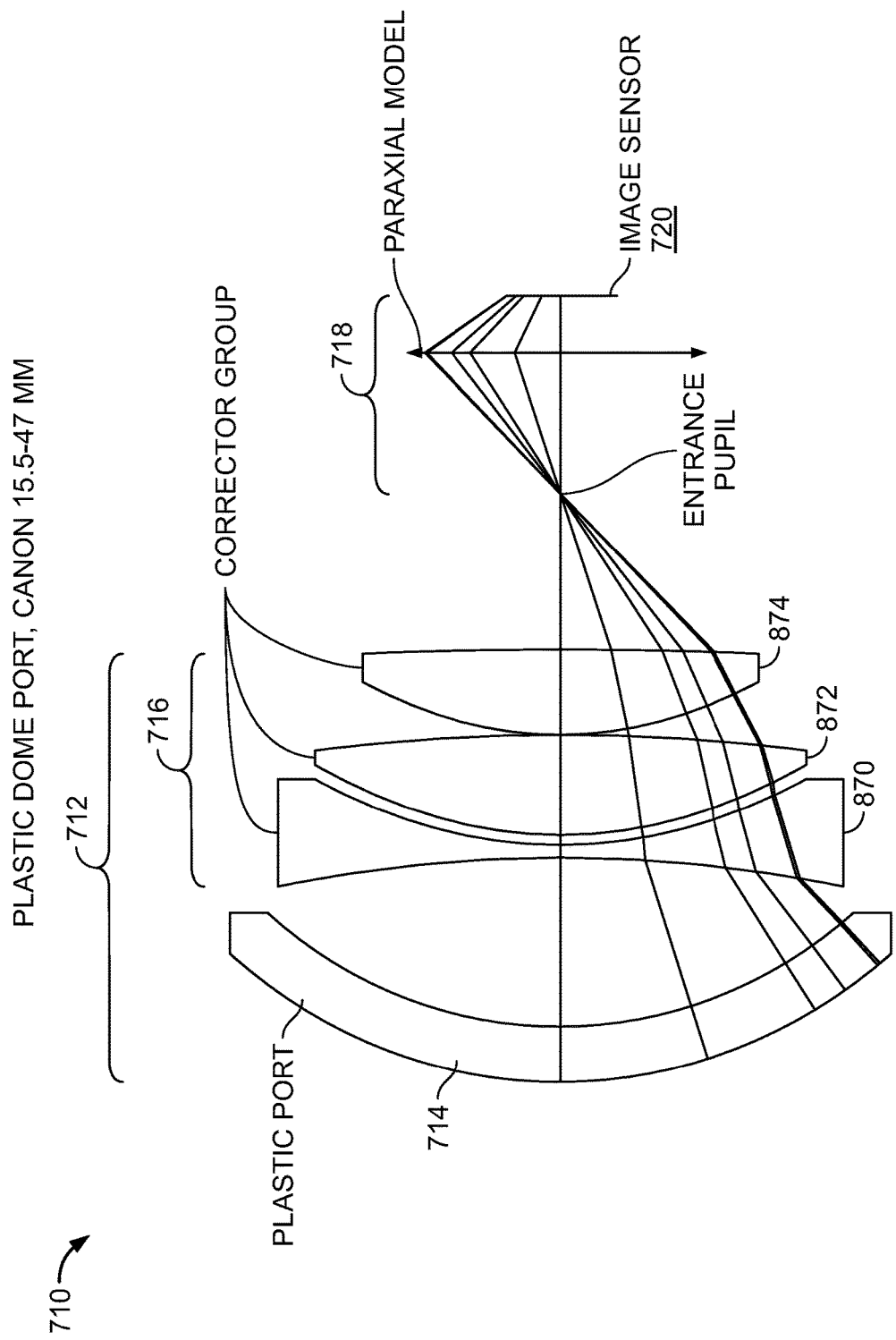
FIG. 41 is a diagram of an exemplary imaging system that includes a panoramic converter that has a 7-inch plastic dome port.

The following describes an imaging system that uses a 7-inch diameter plastic dome port. Referring to FIG. 41, in some implementations, an imaging system 710 includes a panoramic converter 712 and a Canon EOS C500 camcorder. The panoramic converter 712 includes a 7-inch diameter dome port 714 and a corrector group 716. In this example, the dome port 714 is made of polymethylmethacrylate (also referred to as poly(methyl methacrylate), or PMMA), which is a clear plastic acrylic material. The dome port 714 has, e.g., a 15 mm center thickness, a convex surface with a 133.3 mm radius and a concave surface with a 118.3 mm radius. The camcorder includes a Canon 15.5-47 mm camera lens 718 (represented by a paraxial model in the figure) and a Canon Super 35 image sensor 720. The imaging system 710 provides a 87-degree field of view. The total axial length is 214.25838 mm.

The corrector group of lenses 716 includes a first lens 870, a second lens 872, and a third lens 874. In this example, the first lens 870 is a bi-concave lens, the second lens 872 is a bi-convex lens, and the third lens 874 is also a bi-convex lens. Table 5 below shows various parameters of the first lens 870, the second lens 872, and the third lens 874. In Table 5, the $1^{st}$, $2^{nd}$, $3^{rd}$, $4^{th}$, $5^{th}$, and $6^{th}$ surfaces refer to the first and second surfaces of the first lens 870, the first and second surfaces of the second lens 872, and the first and second surfaces of the third lens 874, respectively.

TABLE 5

| Surface | Radius | Thickness | Diameter | Glass |
| --- | --- | --- | --- | --- |
| 1 | −377.7 | 3.5 | 154 | H-ZLAF50D (dense |
| 2 | 134.5 | 2.85 | | lanthanum flint) |
| 3 | 127.5 | 27 | 134 | QF6 (short flint) |
| 4 | −566.7 | 0.5 | | |
| 5 | 110.2 | 23 | 108 | H-QK3L (light crown) |
| 6 | −1289.4 | | | |

Figures 42A, 42B:
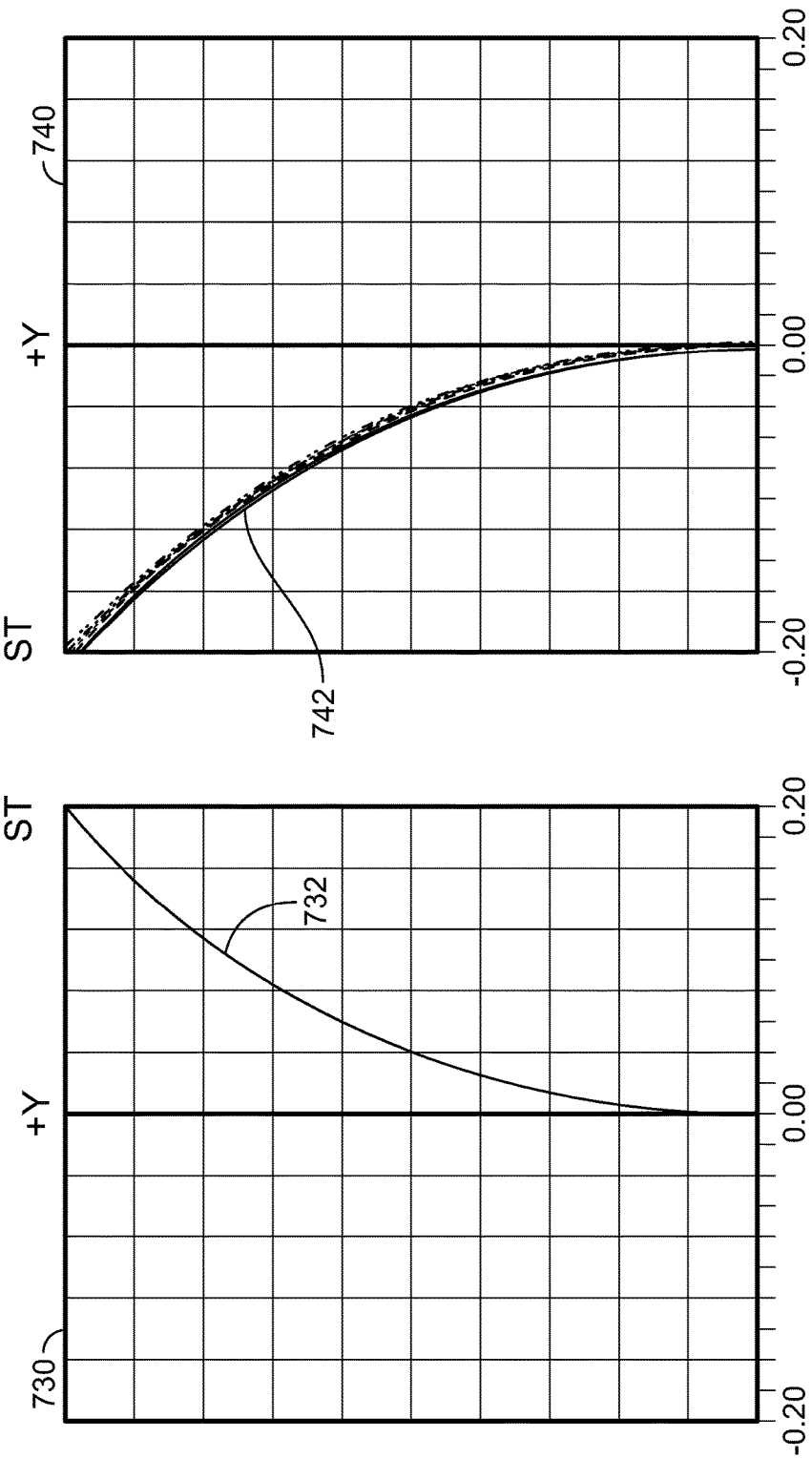
FIG. 42A is a graph showing exemplary field curvatures of the dome port of the imaging system of FIG. 41.
FIG. 42B is a graph showing exemplary compensating field curvatures of the corrector group of the imaging system of FIG. 41.
Figure 42C:
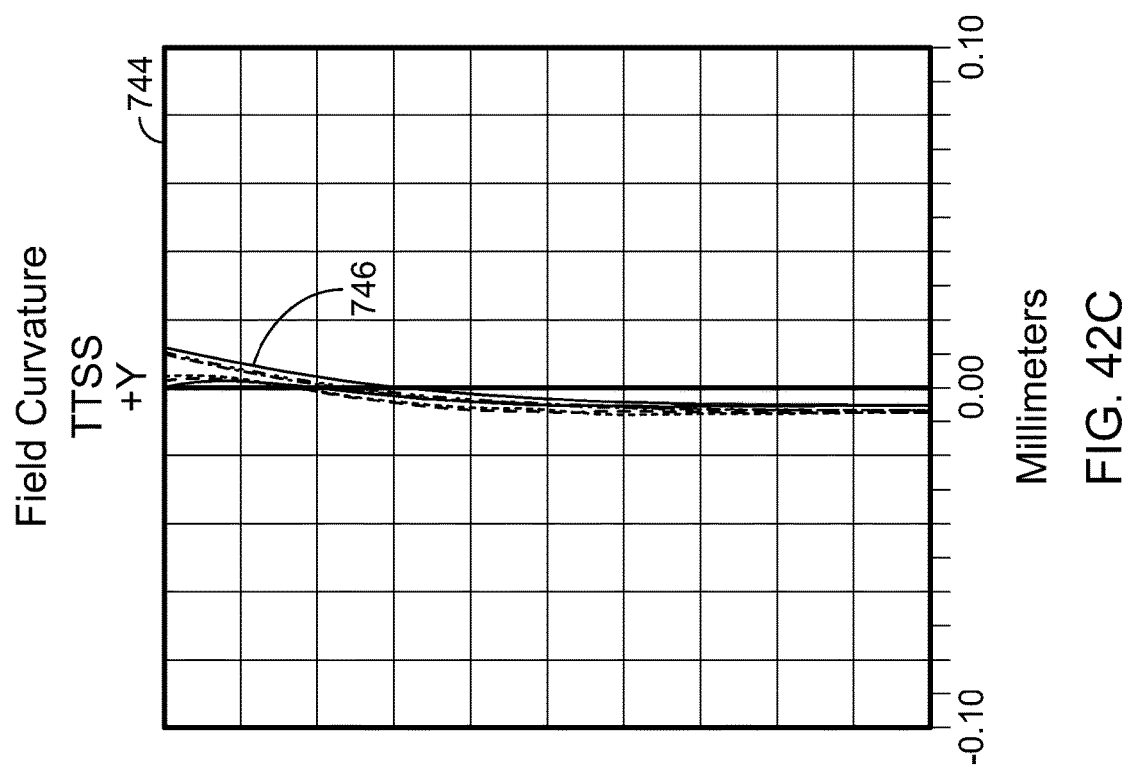
FIG. 42C is a plot of the residual field curvature at the image plane when the dome port and the corrector group of FIG. 41 are combined and used with a Canon 15.5-47 mm zoom lens set at best focus.

Referring to FIG. 42A, a graph 730 includes a curve 732 representing the field curvature of the dome port 714 of FIG. 41 on the Super 35 image sensor 720. Referring to FIG. 42B, a graph 740 includes a curve 742 representing the compensating field curvature of the matched corrector group 716. The image sag (green light) produced by the dome port 714 at the maximum image height of 14.8 mm (relative to the center of the image sensor) is +0.204 mm, and the compensating image sag (green light) produced by the corrector group 716 at the maximum image height of 14.8 mm (relative to the center of the image sensor) is −0.210 mm. The curve 742 is a substantially mirror image of the curve 732. A comparison of the curves 732 and 742 shows that when used with the Canon 15.5-47 mm lens 718 and the Canon Super 35 image sensor 720, the corrector group 716 can substantially compensate the field curvature generated by the PMMA dome port 714. FIG. 42C is a plot 744 of residual field curvature 746 at the image plane for the imaging system 710 of FIG. 41. The maximum residual field curvature at best image plane (three colors) is 0.012 mm.

The 7-inch dome port 714 is thicker than the 10-inch dome port 654 (FIG. 37) because plastic is not as strong as glass. The glass types used to fabricate the lenses used in the corrector group 716 can be the same as those used in the other corrector groups, e.g., 656 (FIG. 37) and 582 (FIG. 32). Slight changes in the prescription of the corrector group optics can accommodate the increased aberrations caused by the thicker PMMA dome port 714 and the optical dispersion of plastic (as compared to glass).

Figure 43:
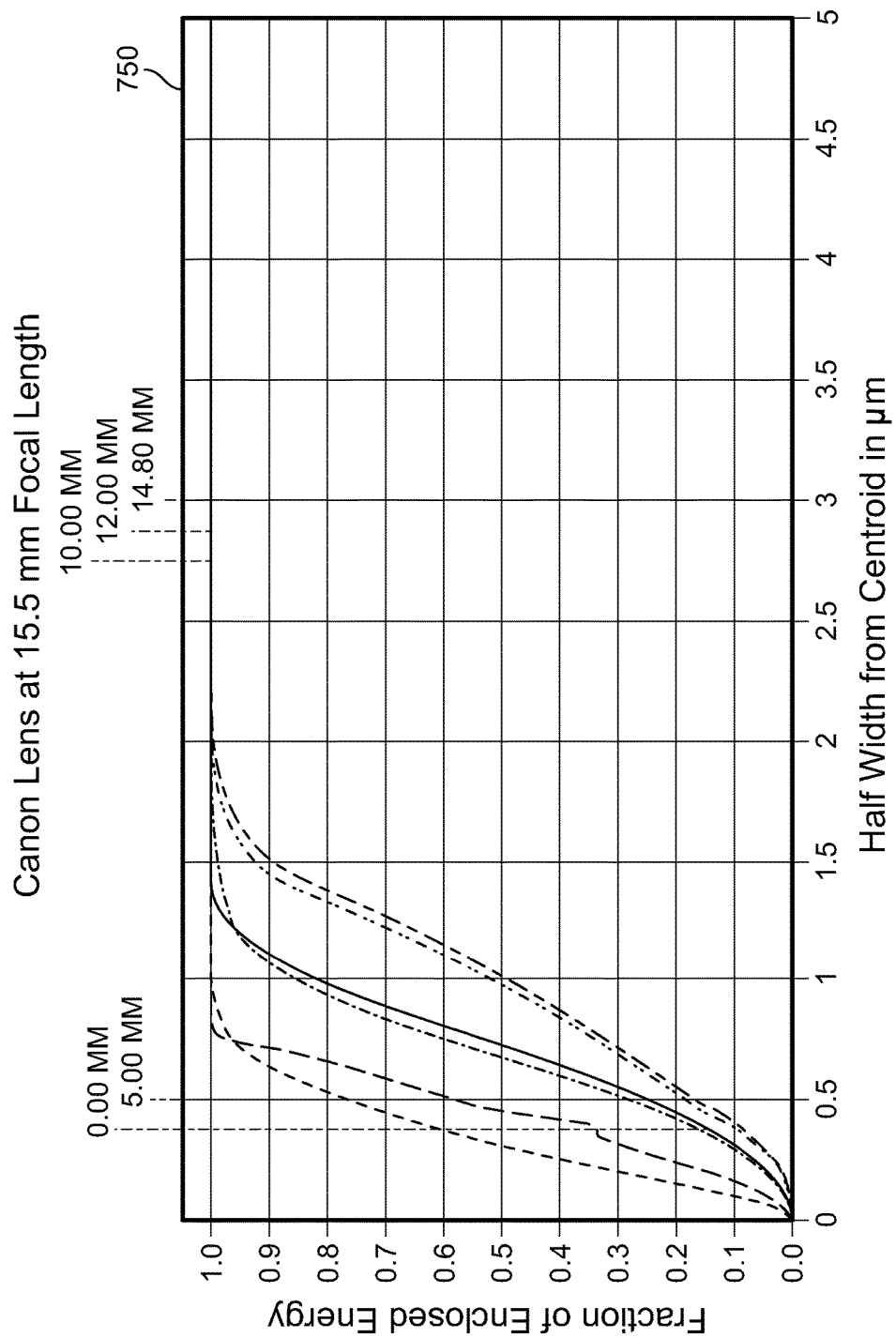
FIG. 43 is a graph that shows an exemplary ensquared energy analysis for the imaging system of FIG. 41 that includes a Canon 15.5-47 mm zoom lens at full wide, 15.5 mm focal length.
Figure 44:
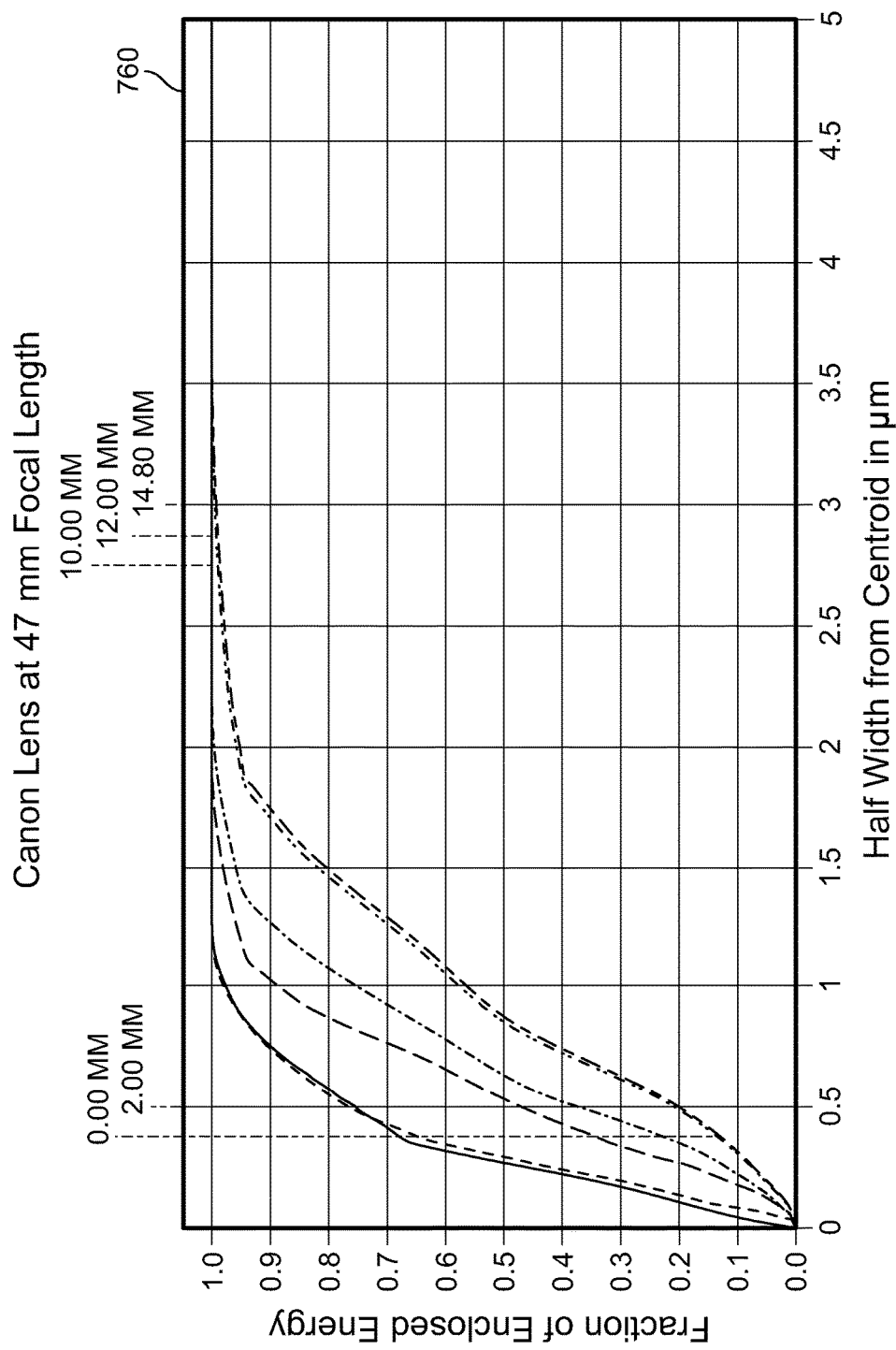
FIG. 44 is a graph that shows an exemplary ensquared energy analysis for the imaging system of FIG. 41 that includes the Canon 15.5-47 mm zoom lens at full zoom, 47 mm focal length.

Referring to FIG. 43, a graph 750 shows an ensquared energy analysis for the imaging system 710 of FIG. 41 that includes the 7-inch plastic dome port 714 and the Canon 15.5-47 mm zoom lens 718 at full wide, 15.5 mm focal length. Referring to FIG. 44, a graph 760 shows an ensquared energy analysis for the imaging system 710 of FIG. 41 in which the Canon 15.5-47 mm zoom lens is at full zoom, 47 mm focal length. The ensquared energy analyses shown in graphs 750 and 760 indicate that the imaging system 710 has excellent imaging performance that is diffraction limited at both 15.5 mm and 47 mm focal lengths. This indicates that the panoramic converter 712 using a plastic dome port is compatible with zoom lenses.

Figure 45:
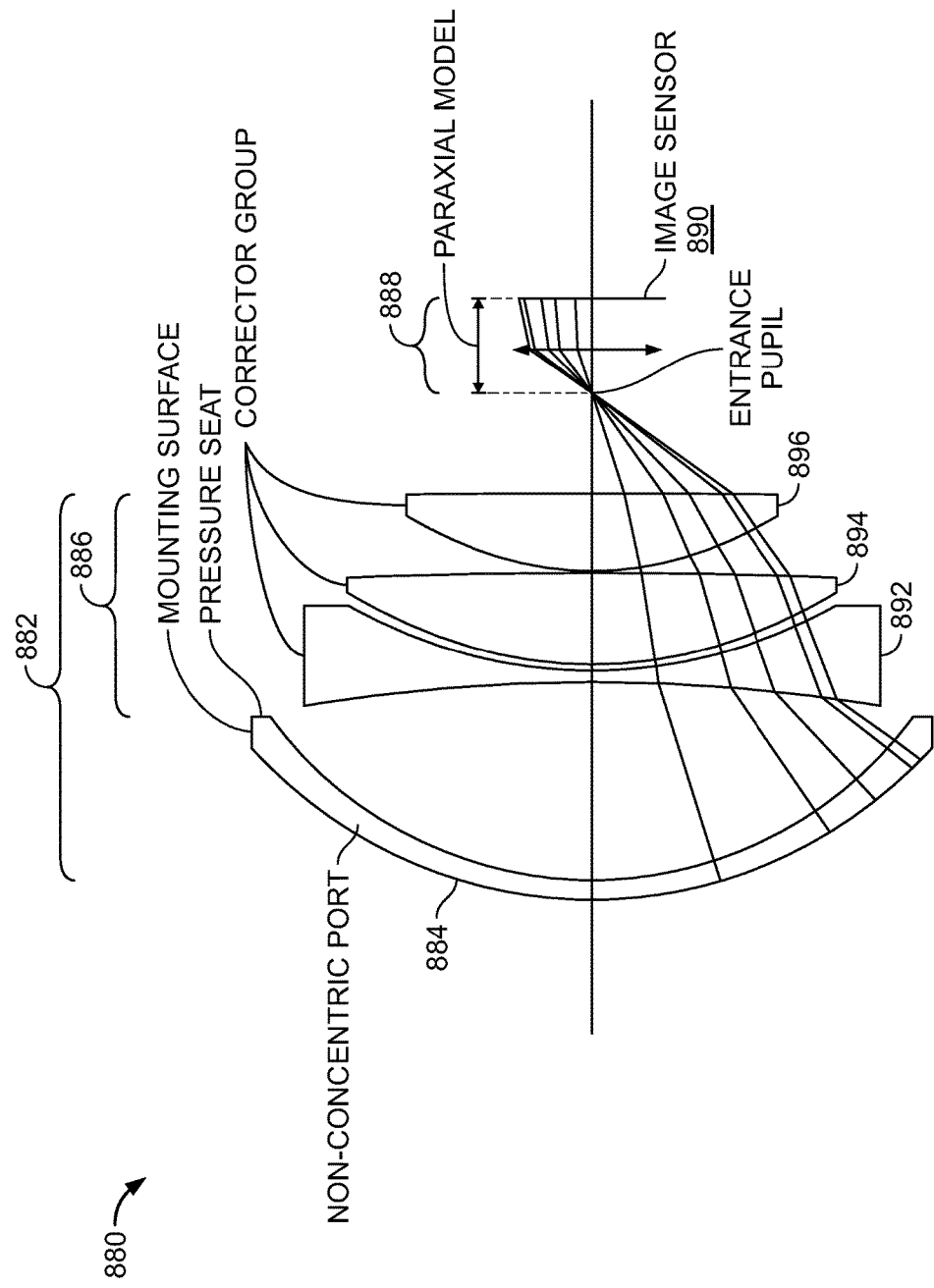
FIG. 45 is a diagram of an exemplary imaging system that includes a panoramic converter having an 8-inch diameter non-concentric dome port and a Zeiss 15 mm Distagon lens.

The following describes an imaging system that uses an 8-inch diameter non-concentric dome port. Referring to FIG. 45, in some implementations, an imaging system 880 includes a panoramic converter 882, a camera lens 888, and an image sensor 890. The panoramic converter 882 includes an 8-inch diameter non-concentric dome port 884 and a corrector group 886. The dome port 884 has a 6 mm center thickness, a convex surface with a 136.0 mm radius and a concave surface with a 119.1 mm radius. In this example, the camera lens 888 is a Zeiss 15 mm Distagon lens, and the sensor 890 is a full frame sensor. The imaging system 880 provides a 109-degree field of view. The port gap is 59.0 mm, the setback distance is 29.69 mm, and the total axial length is 180.04281 mm.

The corrector group of lenses 886 includes a first lens 892, a second lens 894, and a third lens 896. In this example, the first lens 892 is a bi-concave lens, the second lens 894 is a bi-convex lens, and the third lens 896 is also a bi-convex lens. Table 6 below shows various parameters of the first lens 892, the second lens 894, and the third lens 896. In Table 6, the $1^{st}$, $2^{nd}$, $3^{rd}$, $4^{th}$, $5^{th}$, and $6^{th}$ surfaces refer to the first and second surfaces of the first lens 892, the first and second surfaces of the second lens 894, and the first and second surfaces of the third lens 896, respectively.

TABLE 6

| Surface | Radius | Thickness | Diameter | Glass |
| --- | --- | --- | --- | --- |
| 1 | −523.92 | 3.5 | 172 | H-ZLAF55C (dense |
| 2 | 145.73 | 2.05 | | lanthanum flint) |
| 3 | 134.39 | 27.4 | 146 | H-QF56 (short flint) |
| 4 | −1548 | 0.4 | | |
| 5 | 110.28 | 23.3 | 111 | F-SILICA (fused silica) |
| 6 | −3172 | | | |

Figure 46B:
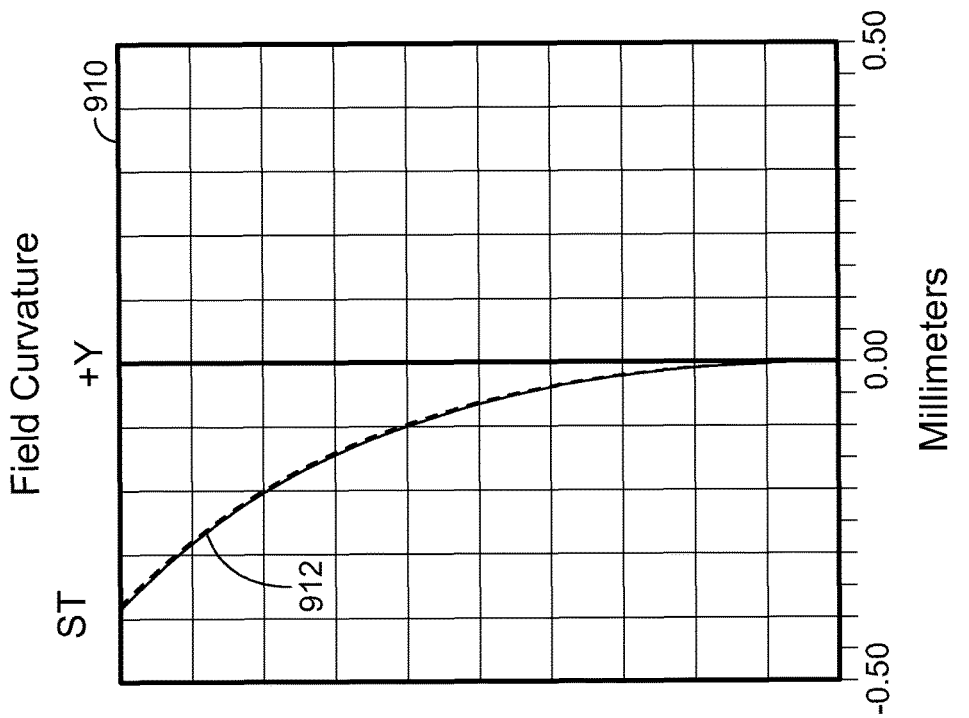
FIG. 46B is a graph showing exemplary compensating field curvature of the corrector group of FIG. 45.
Figure 46A:
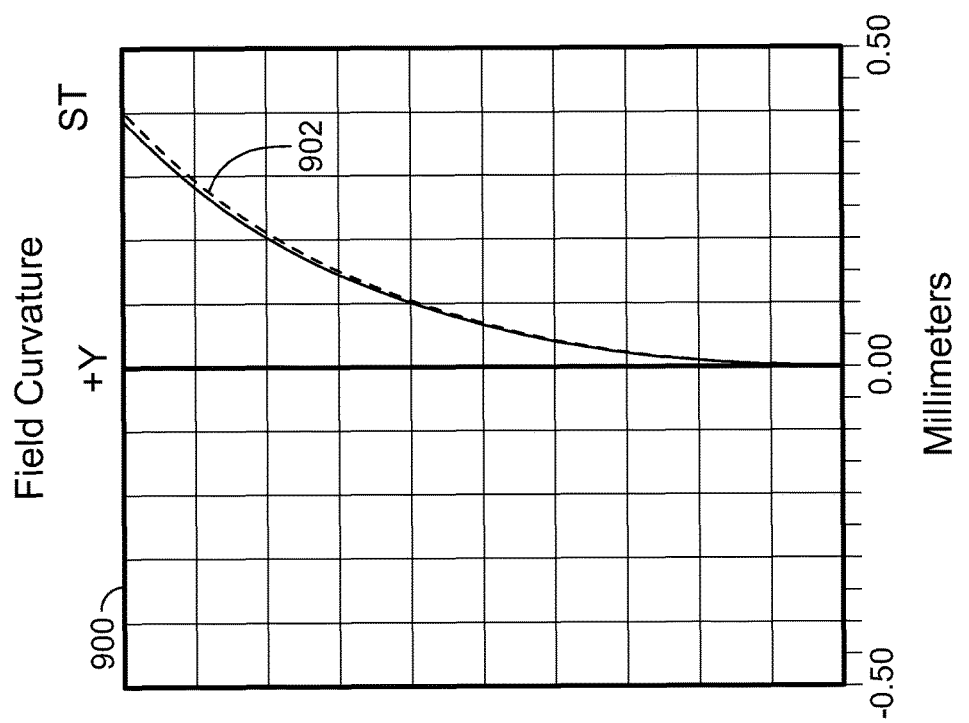
FIG. 46A is a graph showing exemplary field curvature of the dome port of FIG. 45.
Figure 46C:
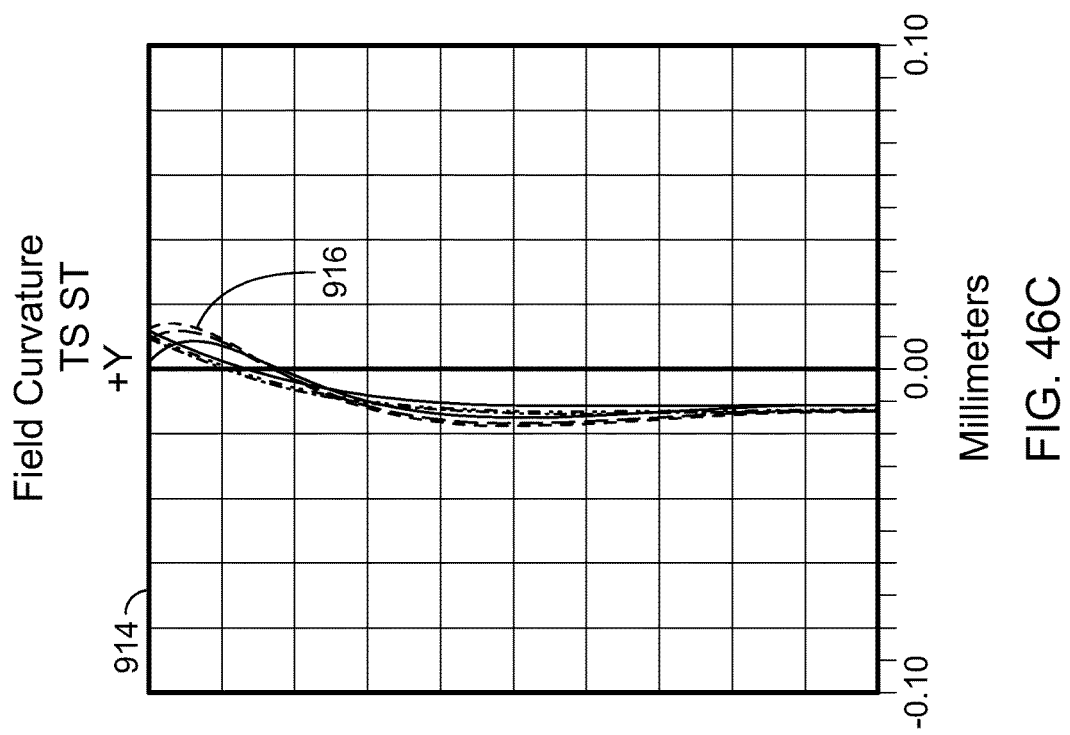
FIG. 46C is a plot of the residual field curvature at the image plane when the dome port and the corrector group of FIG. 45 are combined and the lens is set at best focus.

Referring to FIG. 46A, a graph 900 includes a curve 902 representing the field curvature of the dome port 884 of FIG. 45 on the full frame image sensor 890. Whereas a concentric port has zero or very little distortion, the non-concentric port generates some (e.g., approximately 4%) distortion. Referring to FIG. 46B, a graph 910 includes a curve 912 representing the compensating field curvature of the matched corrector group 886. The image sag (green light) produced by the non-concentric dome port 884 at the maximum image height of 21.633 mm (relative to the center of the image sensor) is +0.397 mm, tangential and +0.387 mm, sagittal. The compensating image sag (green light) produced by the corrector group 886 is −0.379 mm, tangential and −0.387 mm, sagittal. A very small amount of residual field curvature remains uncorrected. FIG. 46C is a plot 914 of residual field curvature 916 at the image plane for the imaging system 880 of FIG. 45. The maximum residual field curvature at best image plane (three colors) is 0.017 mm.

Figure 47:
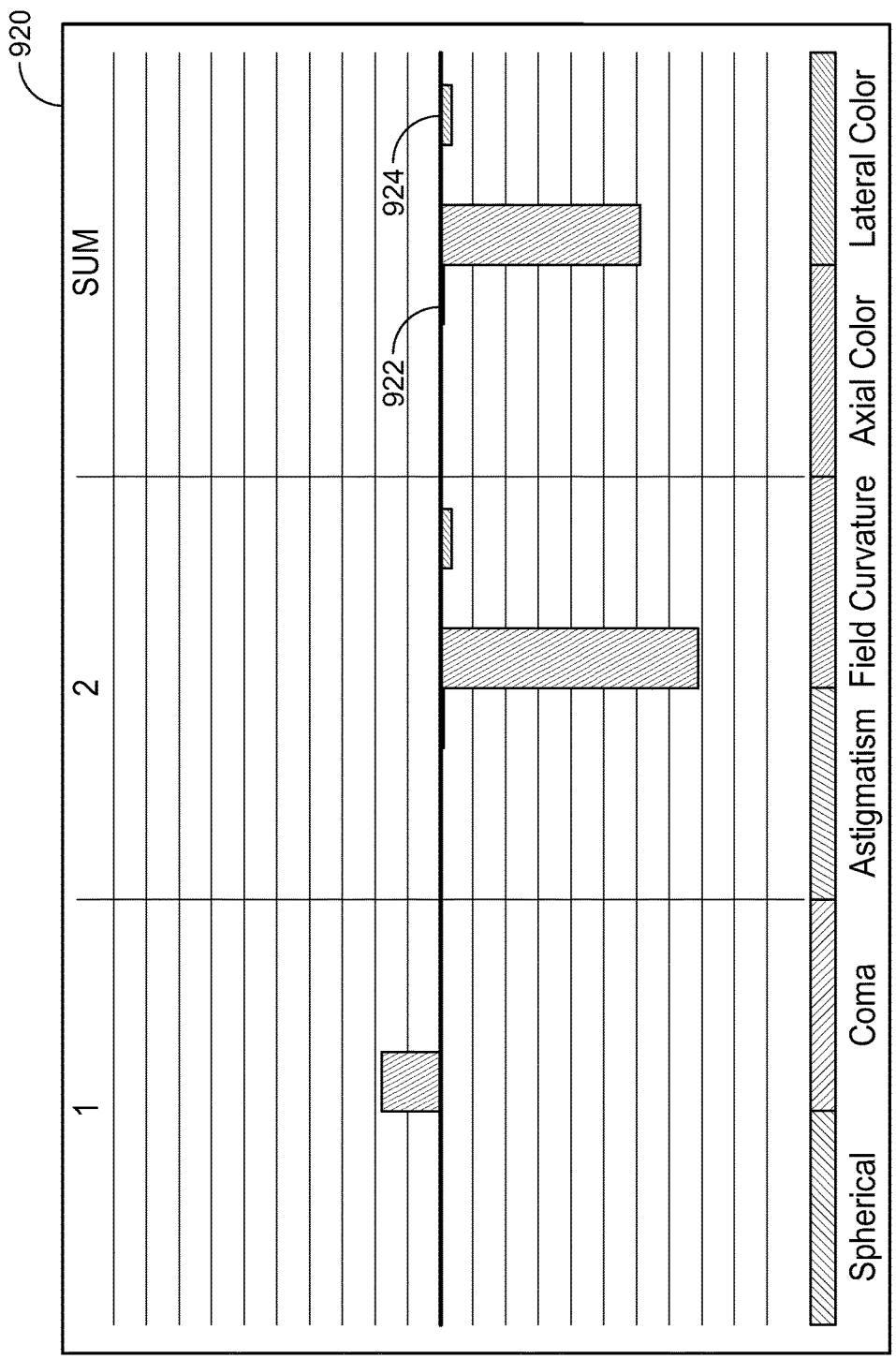
FIG. 47 shows a Seidel diagram for the two surfaces of the exemplary non-concentric dome port of FIG. 45.

Referring to FIG. 47, a Seidel diagram 920 for the two surfaces of the non-concentric dome port 884 shows that the non-concentric dome port 884 generates a small amount of astigmatism (bar 922) and a small amount of lateral color (bar 924). Lateral color causes "color fringing" at the edges of subjects within an image.

Figure 48:
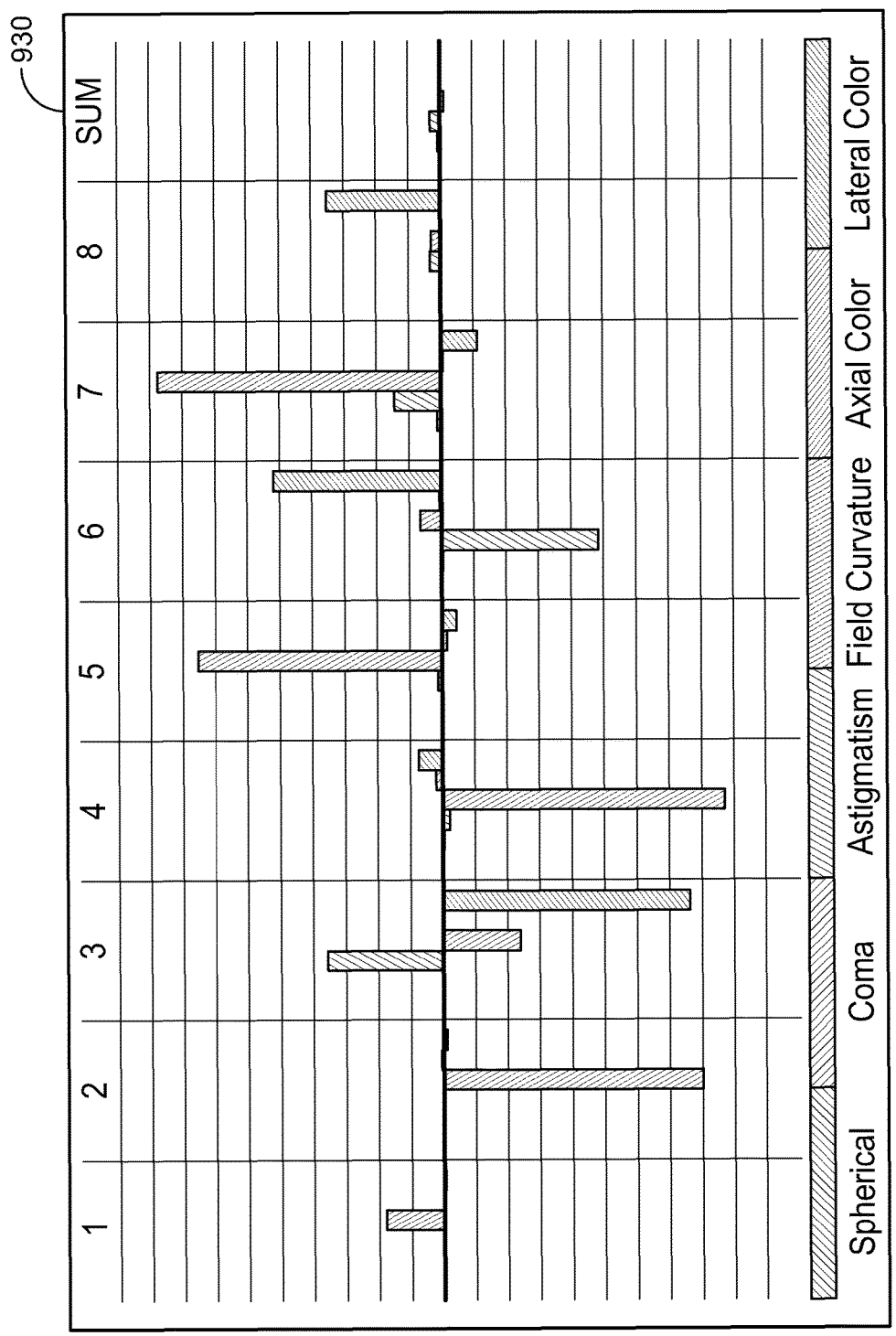
FIG. 48 shows a Seidel diagram for the exemplary panoramic converter of FIG. 45.

Referring to FIG. 48, a Seidel diagram 930 for the panoramic converter 882 shows that the corrector group 886 compensates the aberrations of the non-concentric dome port 884 to eliminate the lateral color. The overall correction leaves a very small amount of residual astigmatism.

Figure 49A:
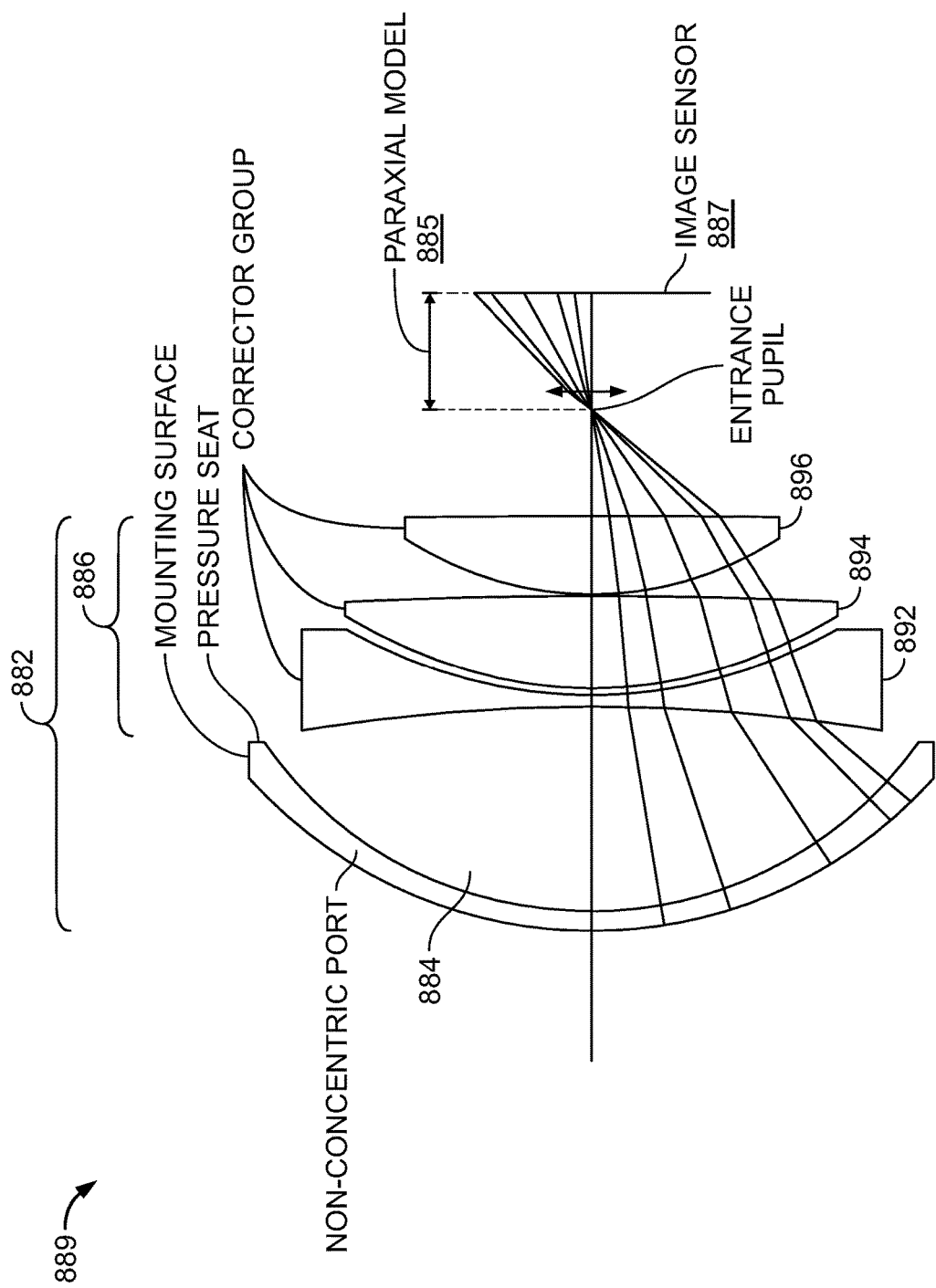
FIG. 49A is a diagram of an exemplary imaging system that includes a panoramic converter having an 8-inch diameter non-concentric dome port and a 28 mm Apo-Sironar lens.
Figure 49C:
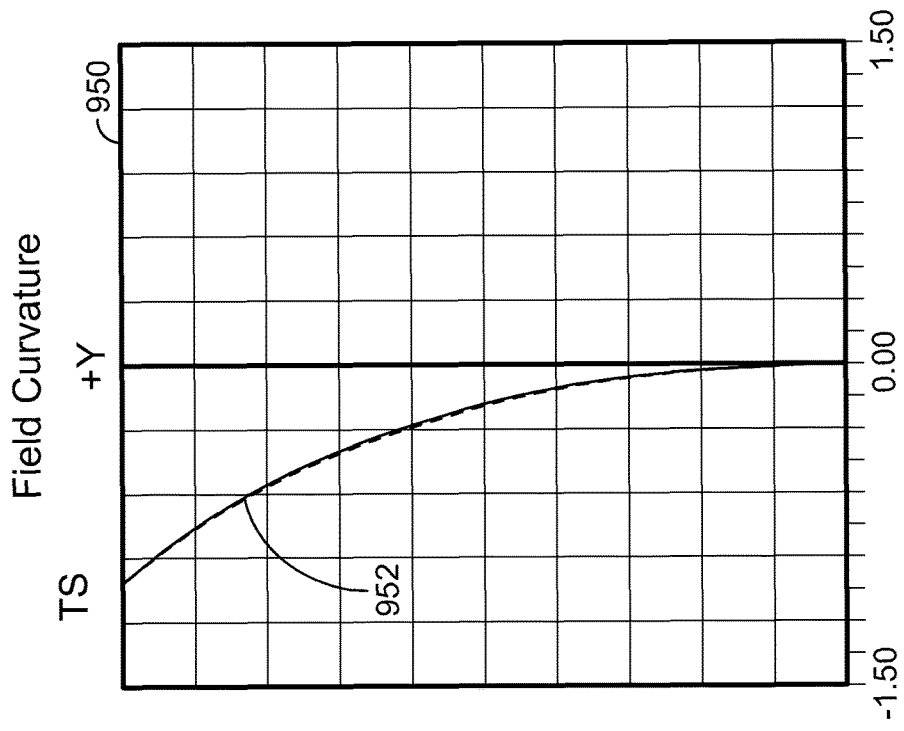
FIGS. 49B and 49C are graphs showing field curvatures of the exemplary non-concentric dome port and compensating field curvatures of the exemplary corrector group, respectively, of FIG. 49A.
Figure 49B:
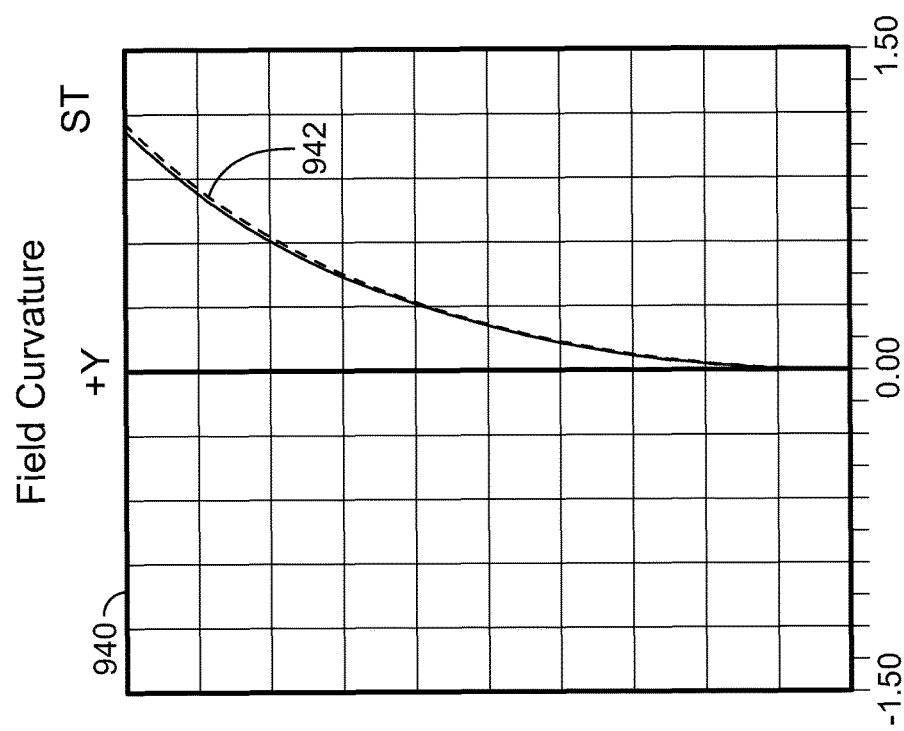

FIG. 49A shows the 8-inch diameter, 6 mm center thickness non-concentric dome port 884 used with a Rodenstock 28 mm Apo-Sironar lens 885 and a medium format image sensor 887. Referring to FIG. 49B, a graph 940 includes a curve 942 representing the field curvature of the non-concentric dome port 884 on the medium format sensor. Referring to FIG. 49C, a graph 950 includes a curve 952 representing the compensating field curvature of the matched corrector group 886. The image sag (green light) produced by the non-concentric dome port 884 at the maximum image height of 35.0 mm relative to the center of the image sensor is +1.154 mm, tangential and +1.121 mm, sagittal. The compensating image sag (green light) generated by corrector group 886 at the maximum image height of 35.0 mm relative to the center of the image sensor is −1.025 mm, tangential and −1.019 mm, sagittal. With large format sensors, the corrector group compensation for the non-concentric dome port results in a small amount of residual field curvature that varies slightly for sagittal and tangential ran fans. FIG. 49D is a plot 954 of residual field curvature 956 at the image plane for the imaging system 889 of FIG. 49A. The maximum residual field curvature at best image plane (three colors) is 0.036 mm.

Figure 50:
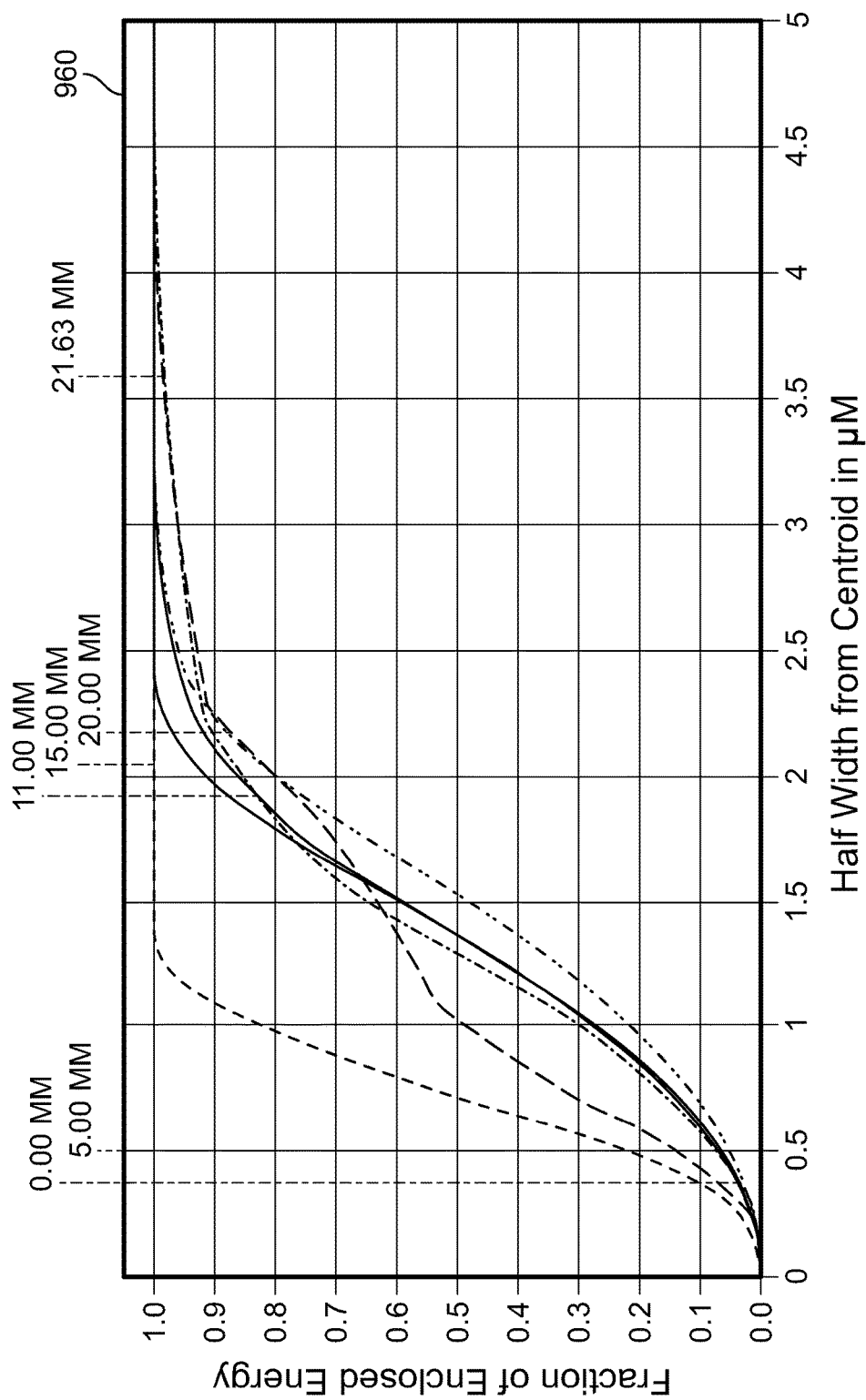
FIG. 50 is a graph showing an ensquared energy analysis for an exemplary imaging system that includes the non-concentric dome port of FIG. 45 and a Zeiss 15 mm Distagon lens.
Figure 51:
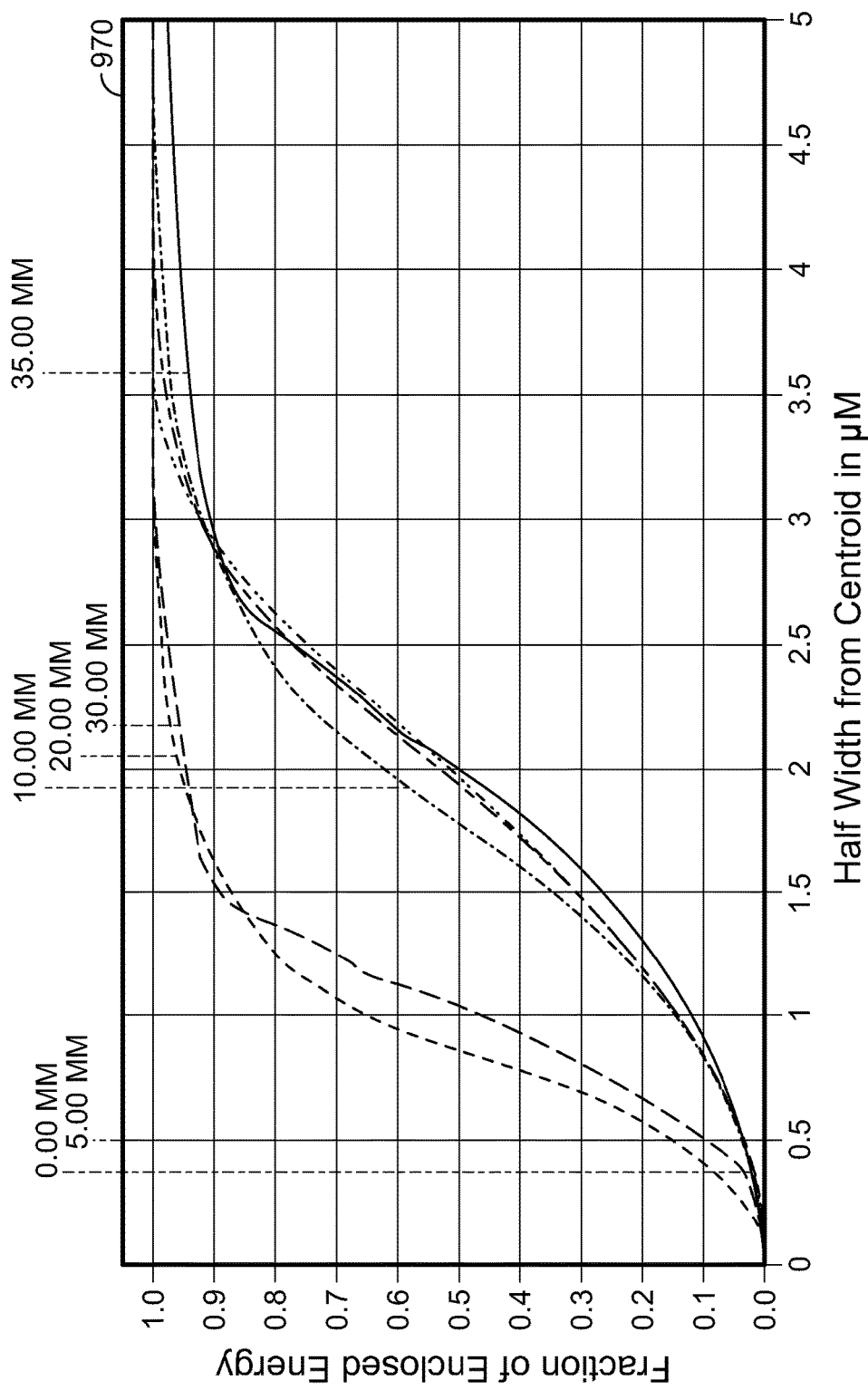
FIG. 51 is a graph showing an ensquared energy analyses for an exemplary imaging system that includes the non-concentric dome port of FIG. 49A and a Rodenstock 28 mm Apo-Sironar lens.

Referring to FIG. 50, a graph 960 shows an ensquared energy analysis for the imaging system 880 of FIG. 45 that includes the non-concentric dome port 884 and the Zeiss 15 mm lens 888. Referring to FIG. 51, a graph 970 shows an ensquared energy analysis for the imaging system that includes the non-concentric dome port 884 and the Rodenstock 28 mm Apo-Sironar lens. Additional aberrations generated by the non-concentric dome port 884 result in small amounts of uncorrected residual aberrations that affect the ensquared energy. A comparison of the ensquared energy data for the panoramic converter 580 (which includes the 8-inch diameter, 8 mm center thickness, concentric dome port 572 shown in FIG. 32) and panoramic converter 882 (which includes the 8 inch diameter, 6 mm center thickness, non-concentric dome port 884 shown in FIG. 45) shows a small decrease in the imaging performance for the non-concentric dome port 884. However, image resolution remains near a "diffraction limited" level so that overall image quality is still high.

An imaging system that has a non-concentric dome port can provide an advantage for shallow water applications where a smaller port center thickness can be used. A short edge thickness on a port having a small center thickness may pose problems for water tight mounting when a radial double O-ring seal is used. The non-concentric dome port has a steeper concave surface and can be used to provide a larger edge thickness (or mounting surface) and/or a wider pressure seat, which is the non-optical dome surface perpendicular to the optical axis that transfers hydrostatic forces to the housing (see FIG. 52). The following is a comparison of the 8-inch diameter concentric dome port (572 of FIG. 32) and the 8-inch diameter non-concentric dome port (884 of FIG. 45) with a pressure seat width equal to 5.5 mm. For the concentric dome port having an 8 mm center thickness, the edge thickness is 6.04 mm, and the mass is 805 grams. For the non-concentric dome port having a 6 mm center thickness, the edge thickness is 9.13 mm, and the mass is 799 grams.

If an imaging system is specified with a small maximum field of view, the port diameter can be decreased accordingly. However, the edge thickness of a concentric dome port decreases with decreasing port diameter. The slightly non-concentric form can be used in such situations to provide a mechanically convenient dimension for the port seat and the mounting surface. When the axial locations of the dome port centers of curvature differ by less than three times the dome port center thickness, the residual aberrations of an imaging system having a non-concentric port are compatible with "near diffraction limited" performance. The port radii of the imaging system 880 (FIG. 45) having the 8-inch diameter non-concentric dome port 884 are 136.0 mm and 119.1 mm. With a dome port center thickness of 6 mm, the axial separation of the centers of curvature is 10.9 mm or 1.82 times the center thickness.

Figure 52:
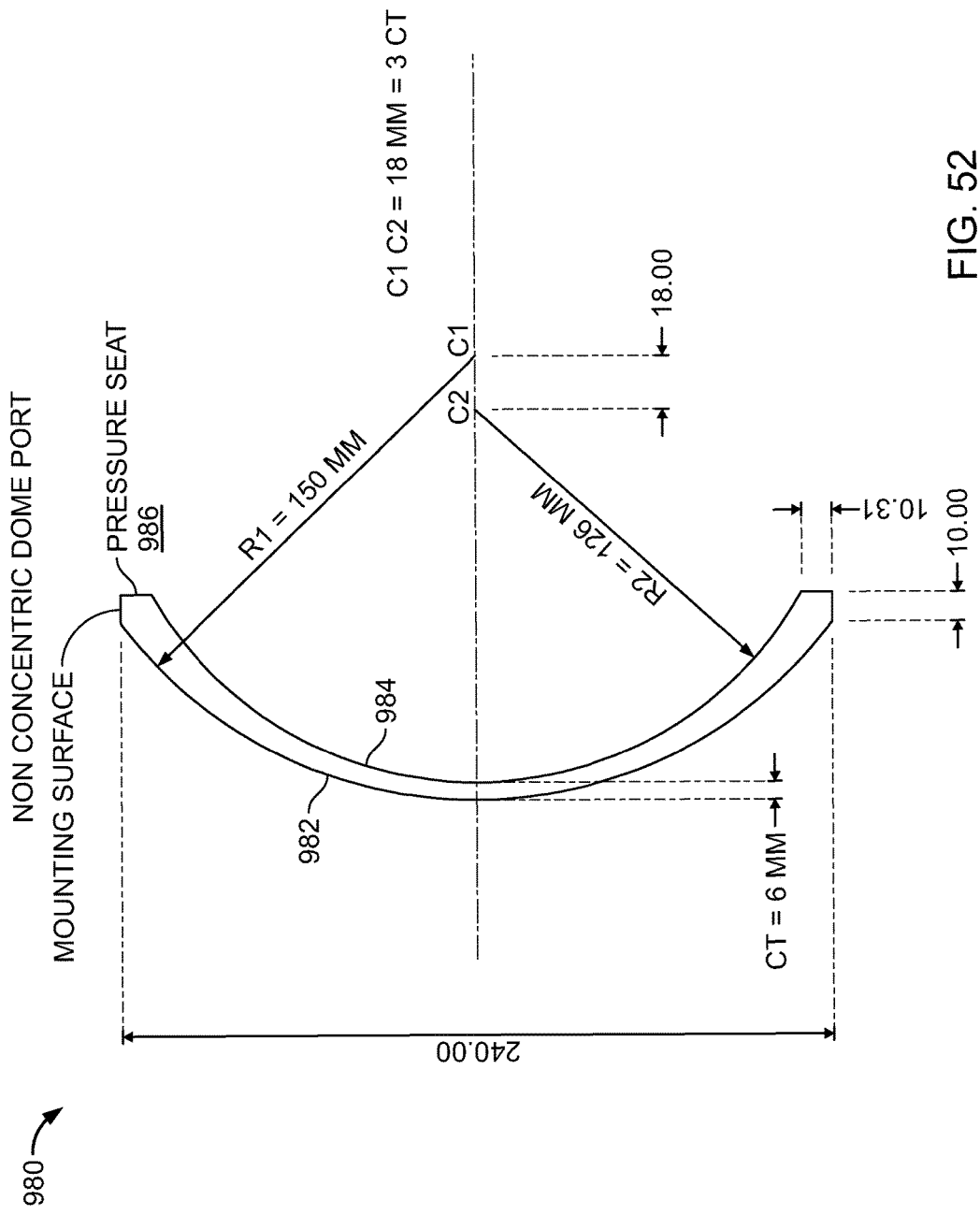
FIG. 52 is a diagram of an exemplary non-concentric dome port.

FIG. 52 is a diagram showing a dome port 980 with the axial locations of the dome port centers of curvature and the dome port center thickness. In the figure, c1 represents the axial location of the convex surface 982, c2 represents the axial location of the concave surface 984, and CT represents the center thickness of the dome port 980. In this example, the axial separation of the centers of curvature (i.e., distance between c1 and c2) is 18 mm, and the center thickness of the dome port is 6 mm. Thus, the axial locations of the dome port centers of curvature differ by an amount equal to three times the dome port center thickness. The diagram also shows the location of the pressure seat 986.

In each of the examples of imaging systems shown in FIGS. 1, 9, 18A, 20, 26, 28, 32, 37, 41, and 45, the corrector group optics (e.g., 108, 364, 470, 574, 656, 716, and 886) are matched to the specific dome port (e.g., 102, 362, 468, 572, 654, 714, 774, and 884) for aberration correction. The dome port diameter and center of curvature associated with dome port optical surfaces define the maximum field of view for the underwater imaging system. The aberration correction provided by a panoramic converter is uniformly accurate, "smooth," over the entire region defined by the panoramic converter maximum field of view. As a result of the smooth aberration correction over the entire field of view, panoramic converters are compatible with a wide variety of camera lenses. The panoramic converters are compatible with a wide variety of lenses having field of views equal to or less than the maximum field of view defined by the panoramic converters. Because the panoramic converter eliminates the aberrations of "water to air" interface encountered in underwater imaging, the compatibility of third party camera lenses with a wide variety of image sensors is explicitly transferred to the panoramic converter. "In air" imaging performance of each camera lens/image sensor combination is transferred without degradation to image formation of objects submerged in water.

The imaging systems having panoramic converters can be used in a wide variety of environments, including shallow fresh water, deep fresh water, shallow salt water, and deep salt water environments. The dome port can be made of either glass or plastic. The panoramic converters can be designed to match specific cameras or camcorders. The panoramic converters can be used with fixed focal length lenses and variable focal length (zoom) lenses.

The imaging systems described above can be used for photography and videography. In some examples, a panoramic converter for videography may have a smaller diameter port lens that defines a maximum field of view that is less than 100 degrees. In some examples, a panoramic converter for photography may have a larger diameter port lens that defines a maximum field of view that is greater than 110 degrees.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Thus, particular embodiments of the subject matter have been described. Other embodiments are within the scope of the following claims. In some cases, the actions recited in the claims can be performed in a different order and still achieve desirable results.

What is claimed is:

1. An apparatus for photography or videography in a liquid, the apparatus comprising:
a panoramic converter comprising:
a first meniscus lens having a first field of view, the first meniscus lens having a convex surface being distal to a camera lens and a concave surface being proximal to the camera lens when the panoramic converter is used to project light rays toward the camera lens, the camera lens having a second field of view; and
a corrector group of lenses comprising three or more lenses configured to correct aberrations caused by the first meniscus lens when the panoramic converter is placed in a liquid having a refractive index greater than 1 in which the convex surface of the first meniscus lens is in contact with the liquid, and the corrector group of lenses is disposed between the first meniscus lens and the camera lens,
wherein the corrector group of lenses comprises a first optical element, a second optical element, and a third optical element, the first optical element includes a negative lens, each of the second and third optical elements has at least one convex surface, and surfaces of the first optical element, the second optical element, and the third optical element have shapes that are configured to compensate a field curvature produced by the first meniscus lens while preserving angles of propagation paths of light rays entering the first meniscus lens for light rays that have propagation paths within the second field of view of the camera lens, in which the angles are measured relative to an optical axis of the panoramic converter,
wherein the angle of the propagation path of a light ray in the liquid prior to entering the first meniscus lens is approximately the same as the angle of the propagation path of the light ray propagating toward the camera lens after exiting the corrector group of lenses, in which the angles are measured relative to the optical axis.

2. The apparatus of claim 1 in which the camera lens comprises at least one of a photography lens or a videography lens.

3. The apparatus of claim 1 in which the first meniscus lens causes a first field of curvature in which if an image of an on-axis object is projected by the first meniscus lens to form on a surface of an image sensor disposed behind the camera lens, an image of an off-axis object is projected by the first meniscus lens to form behind the surface of the image sensor.

4. The apparatus of claim 3 in which the corrector group of lenses are configured to cause a second field of curvature such that if an image of an on-axis object is projected by the corrector group of lenses to form on the surface of the image sensor, an image of an off-axis object is projected by the corrector group of lenses to form in front of the surface of the image sensor, the second field of curvature offsetting the first field of curvature.

5. The apparatus of claim 1 in which the panoramic converter is configured to operate in cooperation with a full-frame image sensor that is used to capture an image produced by the light rays focused by the camera lens, wherein the panoramic converter is configured such that a maximum image sag produced by the first meniscus lens at maximum image height relative to the center of the image sensor has an absolute value greater than 0.25 mm, and the corrector group of lenses corrects the field curvature in which, after correction, the maximum image sag at any point on the image sensor has an absolute value less than 0.010 mm.

6. The apparatus of claim 1 in which the panoramic converter is configured to operate in cooperation with a full-frame image sensor such that a maximum image sag produced by the first meniscus lens at maximum image height relative to the center of the image sensor has an absolute value greater than 0.35 mm, and the corrector group of lenses corrects the field curvature in which, after correction, the maximum image sag at any point on the image sensor has an absolute value less than 0.020 mm.

7. The apparatus of claim 1 in which the panoramic converter is configured to operate in cooperation with a medium format image sensor such that a maximum image sag produced by the first meniscus lens at maximum image height relative to the center of the image sensor has an absolute value greater than 0.80 mm, and the corrector group of lenses corrects the field curvature in which, after correction, the maximum image sag at any point on the image sensor has an absolute value less than 0.020 mm.

8. The apparatus of claim 1 in which the panoramic converter is configured to operate in cooperation with a medium format image sensor such that a maximum image sag produced by the first meniscus lens at maximum image height relative to the center of the image sensor has an absolute value greater than 1 mm, and the corrector group of lenses corrects the field curvature in which, after correction, the maximum image sag at any point on the image sensor has an absolute value less than 0.045 mm.

9. The apparatus of claim 1 in which the panoramic converter is configured to operate in cooperation with an image sensor larger than a medium format sensor such that a maximum image sag produced by the first meniscus lens at the maximum image height relative to the center of the image sensor has an absolute value greater than 1.2 mm, and the corrector group of lenses corrects the field curvature in which, after correction, the maximum image sag at any point on the image sensor has an absolute value less than 5% of the maximum image sag produced by the first meniscus lens at the maximum image height.

10. The apparatus of claim 1 in which the first meniscus lens produces a negative field of curvature, the negative lens comprises a double concave lens having a first concave surface and a second concave surface, and the first and second concave surfaces both are configured to produce negative field of curvatures.

11. The apparatus of claim 10 in which the second and third optical elements both are configured to produce positive field of curvatures, in which the positive field of curvatures of the second and third optical elements compensate the negative field of curvatures of the first meniscus lens and the first optical element.

12. The apparatus of claim 1 in which the negative lens includes a double concave lens having a first concave surface and a second concave surface, each of the second and third optical elements having at least one convex surface,
the first concave surface of the first optical element is configured to contribute a positive astigmatism, the second concave surface of the first optical element is configured to contribute a negative astigmatism, the second surface of the second optical element is configured to contribute a negative astigmatism, the first surface of the third optical element is configured to contribute a positive astigmatism to image formation,
the negative astigmatism of the second convex surface of the second optical element and the positive astigmatism of the first convex surface of the third optical element compensate the positive astigmatism of the first concave surface of the first optical element and the negative astigmatism of the second concave surface of the first optical element.

13. The apparatus of claim 1 in which the negative lens includes a double concave lens having a first concave surface and a second concave surface,
the first concave surface of the first optical element is configured to contribute a negative lateral chromatic aberration, the second concave surface of the first optical element is configured to contribute a positive lateral chromatic aberration, the first convex surface of the second optical element is configured to contribute a negative lateral chromatic aberration, the second convex surface of the second optical element is configured to contribute a positive chromatic aberration, the first convex surface of the third optical element is configured to contribute a negative chromatic aberration, and the second convex surface of the third optical element is configured to contribute a positive chromatic aberration to image formation, and
the chromatic aberrations of the second and third optical elements compensate the chromatic aberrations of the first optical element.

14. The apparatus of claim 1 in which the first optical element, the second optical element, and the third optical element are positioned in sequence, the first optical element being closer to the first meniscus lens, and the second and third optical elements are configured to compensate astigmatism caused by the first optical element.

15. The apparatus of claim 1 in which the first optical element, the second optical element, and the third optical element are positioned in sequence, the first optical element being closer to the first meniscus lens, and the second and third optical elements are configured to compensate chromatic aberrations caused by the first optical element.

16. The apparatus of claim 1 in which a first center of curvature of the convex surface of the first meniscus lens coincides with a second center of curvature of the concave surface of the first meniscus lens.

17. The apparatus of claim 1 in which the first field of view of the first meniscus lens is larger than the second field of view of the camera lens.

18. The apparatus of claim 1 in which the second field of view is at least 90°.

19. The apparatus of claim 1 in which the second field of view is at least 100°.

20. The apparatus of claim 1 in which the second field of view is at least 110°.

21. The apparatus of claim 1 in which the negative lens comprises a double concave lens.

22. The apparatus of claim 21 in which the double concave lens is positioned closest to the first meniscus lens among the corrector group of lenses.

23. The apparatus of claim 21 in which the double concave lens comprises dense lanthanum flint glass.

24. The apparatus of claim 1 in which the second optical element comprises a second lens, the third optical element comprises a third lens, and each of the second and third lenses has a convex surface.

25. The apparatus of claim 1 in which each of the second and third optical element comprises a double convex lens.

26. The apparatus of claim 1 in which the second optical element comprises a second meniscus lens and the third optical element comprises a double convex lens.

27. The apparatus of claim 1 in which the second optical element comprises light flint glass.

28. The apparatus of claim 1 in which the third optical element comprises at least one of fused silica or light crown glass.

29. The apparatus of claim 1 in which the corrector group of lenses consists of three lenses.

30. The apparatus of claim 1 in which the first meniscus lens has a diameter of at least 6 inches.

31. The apparatus of claim 1 in which the first meniscus lens comprises a non-concentric dome port lens.

32. The apparatus of claim 31 in which the axial locations of the centers of curvature of the surfaces of the first meniscus lens differ by less than twice the center thickness of the first meniscus lens.

33. The apparatus of claim 31 in which the axial locations of the centers of curvature of the surfaces of the first meniscus lens differ by less than three times the center thickness of the first meniscus lens.

34. The apparatus of claim 1 in which the first meniscus lens comprises a glass lens.

35. The apparatus of claim 1 in which the first meniscus lens comprises a plastic lens.

36. The apparatus of claim 34 in which the camera lens has a filter thread, and the corrector group of lenses is attached to the camera lens through the filter thread.

37. The apparatus of claim 34 in which the panoramic converter is configured to operate in cooperation with an image sensor larger than a medium format sensor such that a maximum image sag produced by the first meniscus lens at the maximum image height relative to the center of the image sensor has an absolute value greater than 1.2 mm, and the corrector group of lenses corrects the field curvature in which, after correction, the maximum image sag at any point on the image sensor has an absolute value less than 5% of the maximum image sag produced by the first meniscus lens at the maximum image height.

38. The apparatus of claim 1 in which the first optical element, the second optical element, and the third optical element are aligned along an optical axis, the negative lens includes a double concave lens having a first concave surface and a second concave surface, the convex surface of the second optical element faces the second concave surface of the first optical element, wherein the first optical element and the second optical element are positioned such that an air gap is provided between the first and second optical elements, and a distance between the second concave surface of the first optical element and the convex surface of the second optical element is smaller than a thickness of the first optical element along the optical axis.

39. The apparatus of claim 1 in which the first optical element, the second optical element, and the third optical element are aligned along an optical axis, the negative lens includes a double concave lens having a first concave surface and a second concave surface, the convex surface of the second optical element faces the second concave surface of the first optical element, wherein the first optical element and the second optical element are positioned such that an air gap is provided between the first and second optical elements, and a distance between an edge of the second concave surface of the first optical element and an edge of the convex surface of the second optical element is smaller than a thickness of the first optical element along the optical axis.

40. The apparatus of claim 1 in which the field curvature causes an image focused by the camera lens to focus onto a curved surface, and the corrector group of lens is configured to cause the image to focus onto a flatter surface.

41. The apparatus of claim 1 in which the corrector group of lenses is configured to correct the field curvature in which, after correction, the maximum image sag at any point on the image sensor has an absolute value less than 40% of the maximum image sag produced by the first meniscus lens at the maximum image height.

42. The apparatus of claim 1 in which the corrector group of lenses is configured to correct the field curvature in which, after correction, the maximum image sag at any point on the image sensor has an absolute value less than 20% of the maximum image sag produced by the first meniscus lens at the maximum image height.

43. The apparatus of claim 1 in which the corrector group of lenses is configured to correct the field curvature in which, after correction, the maximum image sag at any point on the image sensor has an absolute value less than 10% of the maximum image sag produced by the first meniscus lens at the maximum image height.

44. The apparatus of claim 1 in which the corrector group of lenses is configured to correct the field curvature in which, after correction, the maximum image sag at any point on the image sensor has an absolute value less than 5% of the maximum image sag produced by the first meniscus lens at the maximum image height.

45. The apparatus of claim 1 in which the panoramic converter is configured to operate in cooperation with a Super 35 image sensor that is used to capture an image produced by the light rays focused by the camera lens, wherein the panoramic converter is configured such that the corrector group of lenses corrects the field curvature in which, after correction, the maximum image sag at any point on the image sensor has an absolute value less than 20% of the maximum image sag produced by the first meniscus lens at the maximum image height.

46. The apparatus of claim 1 in which the panoramic converter is configured to operate in cooperation with a Super 35 image sensor that is used to capture an image produced by the light rays focused by the camera lens, wherein the panoramic converter is configured such that the corrector group of lenses corrects the field curvature in which, after correction, the maximum image sag at any point on the image sensor has an absolute value less than 5% of the maximum image sag produced by the first meniscus lens at the maximum image height.

47. The apparatus of claim 44 in which the panoramic converter is configured to operate in cooperation with an image sensor that is used to capture an image produced by the light rays focused by the camera lens, wherein the image sensor has a maximum image height larger than 10 mm, and the panoramic converter is configured such that the corrector group of lenses corrects the field curvature in which, after correction, the maximum image sag at any point on the image sensor has an absolute value less than 5% of the maximum image sag produced by the first meniscus lens at the maximum image height.

48. The apparatus of claim 44 in which the panoramic converter is configured to operate in cooperation with an image sensor that is used to capture an image produced by the light rays focused by the camera lens, wherein the image sensor has a maximum image height equal to or smaller than 10 mm, and the panoramic converter is configured such that the corrector group of lenses corrects the field curvature in which, after correction, the maximum image sag at any point on the image sensor has an absolute value less than 5% of the maximum image sag produced by the first meniscus lens at the maximum image height.

49. the apparatus of claim 1 in which the liquid comprises water.

50. An apparatus for photography or videography in a liquid, the apparatus comprising:

a housing to provide an enclosure for a camera or camcorder; and a panoramic converter comprising:

a first meniscus lens having a first field of view, the first meniscus lens having a convex surface being distal to a camera lens and a concave surface being proximal to the camera lens when the panoramic converter is used to project light rays toward the camera lens, the camera lens having a second field of view; and a corrector group of lenses comprising three or more lenses configured to correct aberrations caused by the first meniscus lens when the panoramic converter is placed in a liquid having a refractive index greater than 1 in which the convex surface of the first meniscus lens is in contact with the liquid, and the corrector group of lenses is disposed between the first meniscus lens and the camera lens, wherein the corrector group of lenses comprises a first optical element, a second optical element, and a third optical element, the first optical element includes a negative lens, each of the second and third optical elements has at least one convex surface, and surfaces of the first optical element, the second optical element, and the third optical element have shapes that are configured to compensate a field curvature caused by the first meniscus lens while preserving angles of propagation paths of light rays that propagate from the liquid to the camera lens through the panoramic converter, in which the angle of the propagation path of a light ray in the liquid prior to entering the first the meniscus lens is substantially the same as the angle of the propagation path of the light ray propagating toward the camera lens after passing the corrector group of lenses, in which the angles are measured relative to an optical axis of the panoramic converter;

wherein at least one of the first meniscus lens or the corrector group of lenses is attached to the housing.

51. The apparatus of claim 50 in which the camera lens comprises at least one of a photography lens or a videography lens.

52. The apparatus of claim 50 in which the first meniscus lens is mounted to the housing.

53. The apparatus of claim 50, comprising a port ring that is attached to the housing, in which the corrector group of lenses is coupled to the housing through a mounting flange, and the first meniscus lens is coupled to the port ring.

54. The apparatus of claim 53 in which the port ring is configured to receive a lens shade.

55. The apparatus of claim 50 in which the first meniscus lens and the corrector group of lenses are assembled to form a vacuum sealed lens cell that is attached to the housing.

56. The apparatus of claim 50 in which the first meniscus lens causes a first field of curvature in which if an image of an on-axis object is projected by the first meniscus lens to form on a surface of an image sensor disposed behind the camera lens, an image of an off-axis object is projected by the first meniscus lens to form behind the surface of the image sensor.

57. The apparatus of claim 56 in which the corrector group of lenses causes a second field of curvature such that if an image of an on-axis object is projected by corrector group of lenses to form on the surface of the image sensor, an image of an off-axis object is projected by the corrector group of lenses to form in front of the surface of the sensor, the second field of curvature offsetting the first field of curvature.

58. The apparatus of claim 50 in which the panoramic converter is configured to operate in cooperation with a full-frame image sensor such that a maximum image sag produced by the first meniscus lens at maximum image height relative to a center of the image sensor has an absolute value greater than 0.25 mm, and the corrector group of lenses corrects the field curvature in which, after correction, the maximum image sag at any point on the image sensor has an absolute value less than 0.010 mm.

59. The apparatus of claim 50 in which the panoramic converter is configured to operate in cooperation with a full-frame image sensor such that a maximum image sag produced by the first meniscus lens at maximum image height relative to a center of the image sensor has an absolute value greater than 0.35 mm, and the corrector group of lenses corrects the field curvature in which, after correction, the maximum image sag at any point on the image sensor has an absolute value less than 0.020 mm.

60. The apparatus of claim 50 in which the panoramic converter is configured to operate in cooperation with a medium format image sensor such that a maximum image sag produced by the first meniscus lens at maximum image height relative to a center of the image sensor has an absolute value greater than 0.80 mm, and the corrector group of lenses corrects the field curvature in which, after correction, the maximum image sag at any point on the image sensor has an absolute value less than 0.020 mm.

61. The apparatus of claim 50 in which the panoramic converter is configured to operate in cooperation with a medium format image sensor such that a maximum image sag produced by the first meniscus lens at maximum image height relative to a center of the image sensor has an absolute value greater than 1.0 mm, and the corrector group of lenses corrects the field curvature in which, after correction, the maximum image sag at any point on the image sensor has an absolute value less than 0.045 mm.

62. The apparatus of claim 50 in which the first meniscus lens produces a negative field of curvature, the negative lens includes a double concave lens having a first concave surface and a second concave surface, and the first and second concave surfaces both are configured to produce negative field of curvatures.

63. The apparatus of claim 62 in which the second and the third lenses both are configured to produce positive field of curvatures, in which the positive field of curvatures of the second and third lenses compensate the negative field of curvatures of the first meniscus lens and the double concave lens.

64. The apparatus of claim 50 in which the negative lens includes a double concave lens having a first concave surface and a second concave surface, the first concave surface of the double concave lens is configured to contribute a positive astigmatism, the second concave surface of the double concave lens is configured to contribute a negative astigmatism, the second surface of the second optical element is configured to contribute a negative astigmatism, the first surface of the third optical element is configured to contribute a positive astigmatism to image formation, the negative astigmatism of the second surface of the second optical element and the positive astigmatism of the first surface of the third optical element compensate the positive astigmatism of the first concave surface of the double concave lens and the negative astigmatism of the second concave surface of the double concave lens.

65. The apparatus of claim 50 in which the negative lens includes a double concave lens having a first concave surface and a second concave surface, the first concave surface of the double concave lens is configured to contribute a negative lateral chromatic aberration, the second concave surface of the double concave lens is configured to contribute a positive lateral chromatic aberration, the first surface of the second optical element is configured to contribute a negative lateral chromatic aberration, the second surface of the second optical element is configured to contribute a positive chromatic aberration, the first surface of the third optical element is configured to contribute a negative chromatic aberration, and the second surface of the third optical element is configured to contribute a positive chromatic aberration to image formation, and the chromatic aberrations caused by the second and third optical elements compensate the chromatic aberrations caused by the double concave lens.

66. The apparatus of claim 50 in which the first optical element, the second optical element, and the third optical element are positioned in sequence, the first optical element being closer to the first meniscus lens, and the second and third optical elements are configured to compensate astigmatism caused by the first optical element.

67. The apparatus of claim 50 in which the first optical element, the second optical element, and the third optical element are positioned in sequence, the first optical element being closer to the first meniscus lens, and the second and third optical element are configured to compensate chromatic aberrations caused by the first optical element.

68. The apparatus of claim 50 in which a first center of curvature of the convex surface of the first meniscus lens coincides with a second center of curvature of the concave surface of the first meniscus lens.

69. The apparatus of claim 50 in which the first field of view of the first meniscus lens is larger than the second field of view of the camera lens.

70. The apparatus of claim 50 in which the second field of view is at least 90°.

71. The apparatus of claim 50 in which the second field of view is at least 100°.

72. The apparatus of claim 50 in which the second field of view is at least 110°.

73. The apparatus of claim 50 in which the negative lens comprises a double concave lens.

74. The apparatus of claim 73 in which the double concave lens is positioned closest to the first meniscus lens among the corrector group of lenses.

75. The apparatus of claim 73 in which the double concave lens comprises dense lanthanum flint glass.

76. The apparatus of claim 50 in which the second and third optical elements comprise at least two lenses each having at least one convex surface.

77. The apparatus of claim 50 in which each of the second and third optical elements comprises a double convex lens.

78. The apparatus of claim 50 in which one of the second and third optical elements comprises light flint glass.

79. The apparatus of claim 78 in which a second one of the second and third optical elements comprises at least one of fused silica or light crown glass.

80. The apparatus of claim 50 in which the corrector group of lenses consists of three lenses.

81. The apparatus of claim 50 in which the field curvature causes an image focused by the camera lens to focus onto a curved surface, and the corrector group of lens is configured to cause the image to focus onto a flatter surface.

82. The apparatus of claim 50 in which the liquid comprises water.

83. A method for photography or videography, the method comprising:
   capturing an image of one or more objects in a liquid having a refractive index greater than 1, comprising
      passing light rays from the liquid through a first meniscus lens having a first field of view, the first meniscus lens having a convex surface being distal to a camera lens and a concave surface being proximal to the camera lens when the panoramic converter is used with the camera lens, the convex surface of the first meniscus lens being in contact with the liquid;
      passing the light rays through a corrector group of lenses comprising three or more lenses, wherein the corrector group of lenses comprises a first optical element, a second optical element, and a third optical element, the first optical element includes a negative lens, each of the second and third optical elements has at least one convex surface;
      passing the light rays through the camera lens having a second field of view;
      focusing, using the camera lens, the light rays onto an image sensor; and
      compensating, using the corrector group of lenses, a field curvature caused by the first meniscus lens while preserving angles of light rays passing the first meniscus lens and the corrector group of lenses for light rays that have propagation paths within the second field of view of the camera lens, in which the angles are measured relative to an optical axis of the camera lens,
   wherein the angle of a light ray in the liquid prior to entering the first meniscus lens is substantially the same as the angle of the light ray when the light ray propagates toward the camera lens after passing the collector group of lenses, in which the angles are measured relative to the optical axis of the camera lens.

84. The method of claim 83, comprising producing, using the first meniscus lens, a first field of curvature in which if an image of an on-axis object is projected by the first meniscus lens and focused on a surface of the image sensor, an image of an off-axis object is focused behind the surface of the image sensor.

85. The method of claim 84, comprising producing, using the corrector group of lenses, a second field of curvature such that if the image of the on-axis object is projected by the corrector group of lenses and focused on the surface of the image sensor, the image of the off-axis object is focused in front of the surface of the image sensor, and the second field of curvature offsets the first field of curvature.

86. The method of claim 83 in which the liquid comprises water.

\* \* \* \* \*